(12) United States Patent
Zimmel et al.

(10) Patent No.: US 10,591,680 B2
(45) Date of Patent: Mar. 17, 2020

(54) OPTICAL FIBER CONNECTOR FOR MULTI-FIBER CABLE

(71) Applicant: CommScope Technologies LLC, Hickory, NC (US)

(72) Inventors: Steven C. Zimmel, Minneapolis, MN (US); Yu Lu, Eden Prairie, MN (US); Gregory J. Schaible, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/207,886

(22) Filed: Dec. 3, 2018

(65) Prior Publication Data

US 2019/0179088 A1     Jun. 13, 2019

Related U.S. Application Data

(63) Continuation of application No. 15/376,009, filed on Dec. 12, 2016, now Pat. No. 10,146,015, which is a
(Continued)

(51) Int. Cl.
*G02B 6/38*     (2006.01)
*G02B 6/44*     (2006.01)

(52) U.S. Cl.
CPC ......... *G02B 6/3885* (2013.01); *G02B 6/3823* (2013.01); *G02B 6/3849* (2013.01);
(Continued)

(58) Field of Classification Search
CPC .. G02B 6/3885; G02B 6/3823; G02B 6/3849; G02B 6/3859; G02B 6/3871;
(Continued)

(56) References Cited

U.S. PATENT DOCUMENTS

| 4,478,487 A | 10/1984 | Obeissart |
| 5,048,917 A | 9/1991 | Komatsu |

(Continued)

FOREIGN PATENT DOCUMENTS

| EP | 1 273 944 A1 | 1/2003 |
| WO | WO 2012/125836 A2 | 9/2012 |
| WO | WO 2013/077969 | 5/2013 |

OTHER PUBLICATIONS

Extended European Search Report for Application No. 15815522.6 dated Jan. 18, 2018.
(Continued)

*Primary Examiner* — Jerry M Blevins
(74) *Attorney, Agent, or Firm* — Merchant & Gould P.C.

(57) ABSTRACT

Optical connector arrangements terminate at least seventy-two optical fibers. The optical connector arrangements include multiple optical ferrules that each terminates multiple optical fibers. Some example optical connectors can terminate about 144 optical fibers. Each optical connector includes a fiber take-up arrangement and a flange extending outwardly from a connector housing arrangement. The fiber take-up arrangement manages excess length of the optical fibers. A threadable coupling nut can be disposed on the connector housing arrangement to engage the outwardly extending flange. Certain types of optical connector arrangements include furcation cables spacing the connector housing arrangement form the fiber take-up arrangement.

20 Claims, 54 Drawing Sheets

Related U.S. Application Data continuation of application No. 14/790,607, filed on Jul. 2, 2015, now Pat. No. 9,519,114.

(60) Provisional application No. 62/020,829, filed on Jul. 3, 2014, provisional application No. 62/085,884, filed on Dec. 1, 2014, provisional application No. 62/150,575, filed on Apr. 21, 2015.

(52) U.S. Cl.
CPC ......... *G02B 6/3859* (2013.01); *G02B 6/3871* (2013.01); *G02B 6/3879* (2013.01); *G02B 6/3887* (2013.01); *G02B 6/3894* (2013.01); *G02B 6/4471* (2013.01)

(58) Field of Classification Search
CPC .. G02B 6/3879; G02B 6/3887; G02B 6/3894; G02B 6/4471
USPC .......................................................... 385/59
See application file for complete search history.

(56) References Cited

U.S. PATENT DOCUMENTS

| | | | |
|---|---|---|---|
| 5,344,333 A * | 9/1994 | Haag | H01R 13/639 439/106 |
| 5,689,598 A | 11/1997 | Dean, Jr. et al. | |
| 5,796,896 A | 8/1998 | Lee | |
| 6,062,740 A | 5/2000 | Ohtsuka et al. | |
| 6,146,023 A * | 11/2000 | Weigel | G02B 6/3879 385/139 |
| 6,259,856 B1 | 7/2001 | Shahid | |
| 6,325,547 B1 | 12/2001 | Cammons et al. | |
| 6,364,539 B1 | 4/2002 | Shahid | |
| 6,409,394 B1 | 6/2002 | Ueda et al. | |
| 6,565,265 B2 | 5/2003 | Ohtsuka et al. | |
| 7,645,162 B2 | 1/2010 | Kadar-Kallen et al. | |
| 7,758,389 B2 | 7/2010 | Kadar-Kallen et al. | |
| 9,519,114 B2 | 12/2016 | Zimmel et al. | |
| 10,146,015 B2 | 12/2018 | Zimmel et al. | |
| 2005/0281509 A1 | 12/2005 | Cox et al. | |
| 2006/0133758 A1 | 6/2006 | Mullaney et al. | |
| 2007/0196053 A1 * | 8/2007 | Kewitsch | G02B 6/3825 385/74 |
| 2008/0131056 A1 | 6/2008 | Isenhour et al. | |
| 2009/0074369 A1 | 3/2009 | Bolton et al. | |
| 2010/0202736 A1 | 8/2010 | Roth | |
| 2011/0229083 A1 | 9/2011 | Dainese Junior et al. | |
| 2011/0249943 A1 | 10/2011 | Case et al. | |
| 2012/0237168 A1 | 9/2012 | Aoki et al. | |
| 2013/0084045 A1 | 4/2013 | Aoki et al. | |
| 2013/0183005 A1 * | 7/2013 | Lu | G02B 6/3887 385/78 |
| 2013/0209041 A1 | 8/2013 | Szilagyi et al. | |
| 2013/0216186 A1 | 8/2013 | Ott | |
| 2014/0072265 A1 | 3/2014 | Ott | |
| 2014/0241670 A1 * | 8/2014 | Barnette, Jr. | G02B 6/3887 385/77 |
| 2017/0322386 A1 * | 11/2017 | Morris | G02B 6/4471 |

OTHER PUBLICATIONS

Fujitsu Laboratories and Furukawa Electric Develop Low-Cost Multi-Fiber Optical Connector, Feb. 3, 2014, 3 pages.

Ohtsuka et al., Non-fixed Fiber-Portion-Compressed Type Multi-fiber PC Optical Connector, admitted as prior art as of Jul. 2, 2014; 5 pages.

Written Opinion of the International Searching Authority, dated Sep. 25, 2015, 6 pages.

* cited by examiner

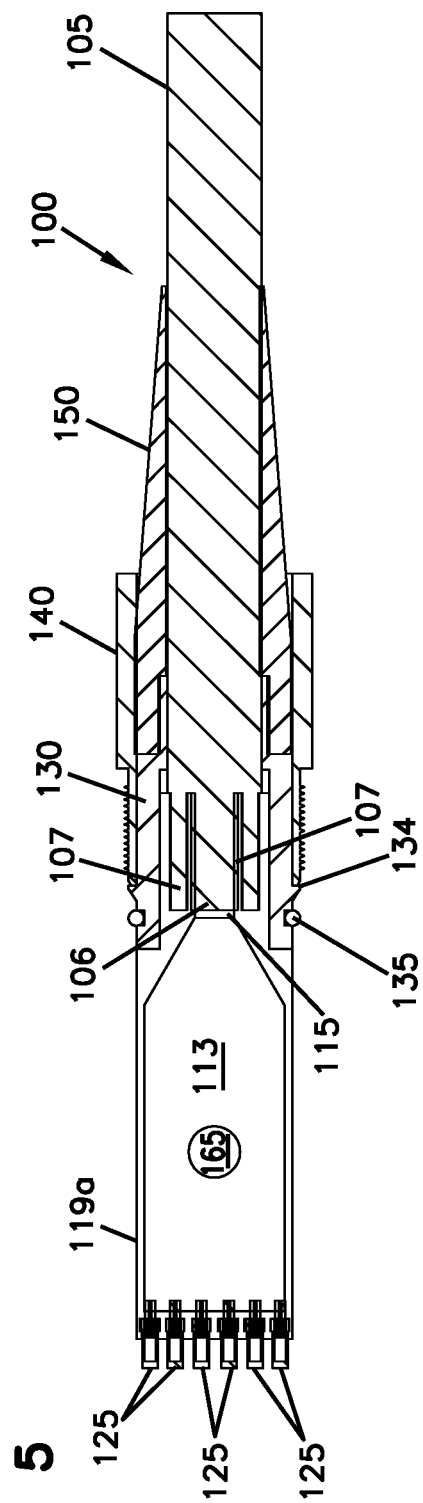
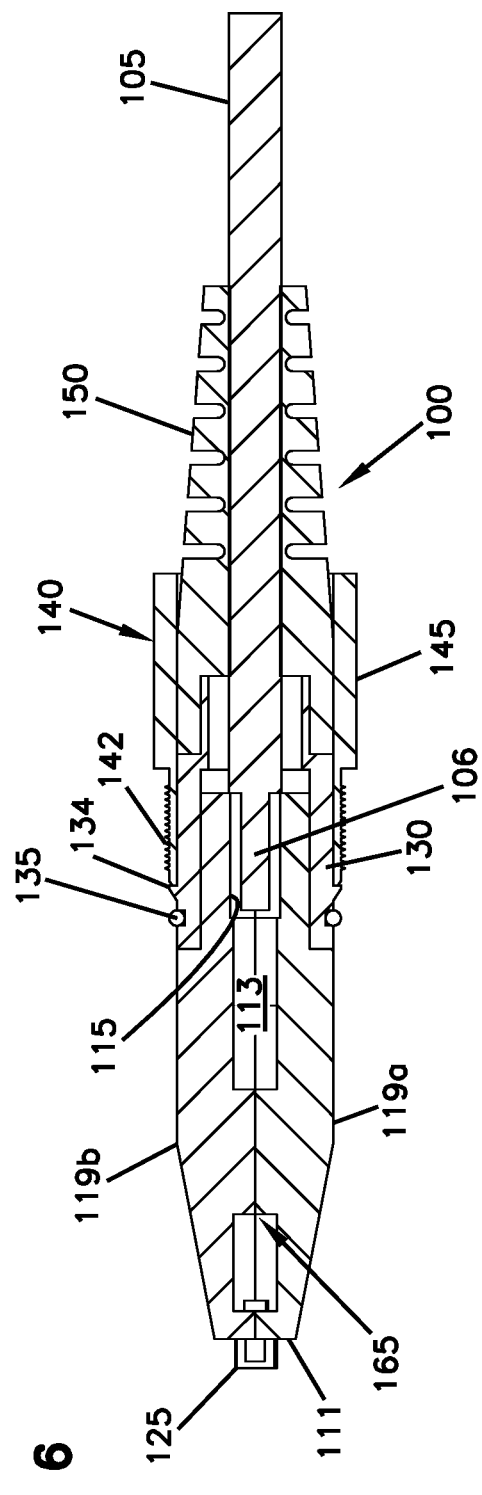

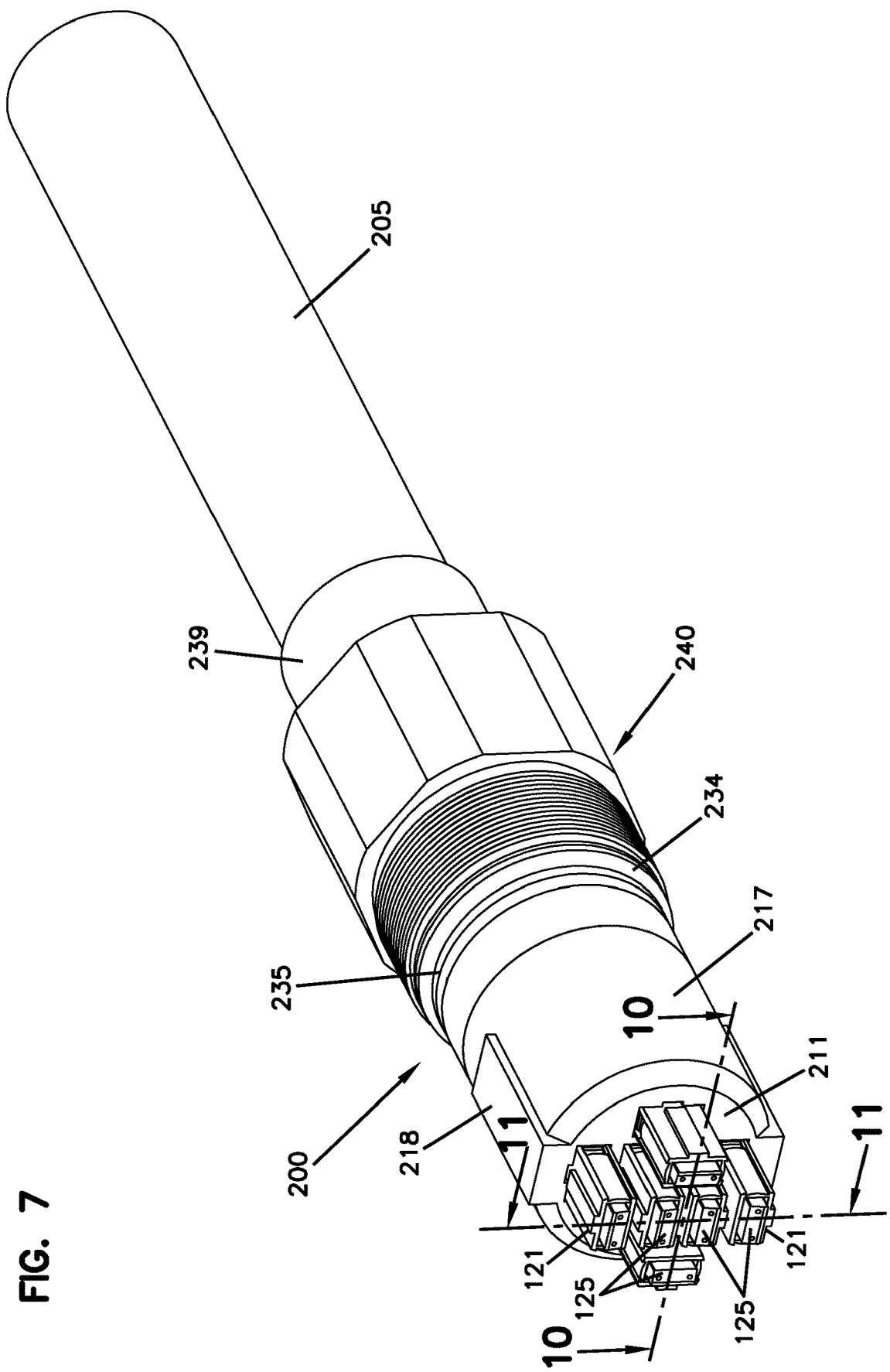

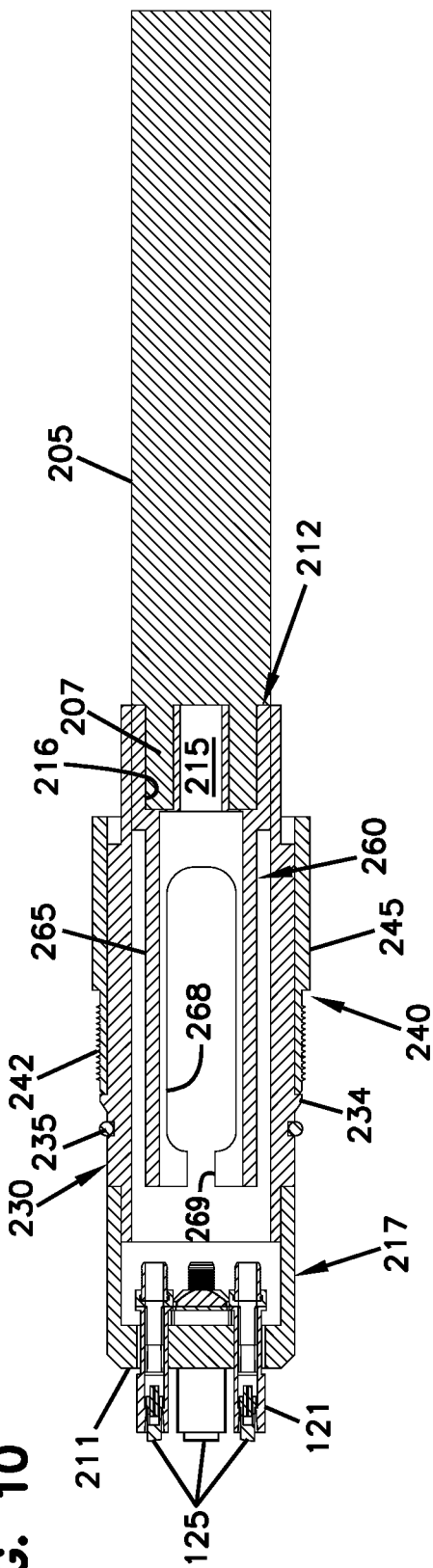

OPTICAL FIBER CONNECTOR FOR MULTI-FIBER CABLE

CROSS-REFERENCE TO RELATED APPLICATIONS

This application is a continuation of application Ser. No. 15/376,009, filed Dec. 12, 2016, now U.S. Pat. No. 10,146,015, which is a continuation of application Ser. No. 14/790,607, filed Jul. 2, 2015, now U.S. Pat. No. 9,519,114, which application claims the benefit of U.S. Provisional Application No. 62/020,829, filed Jul. 3, 2014; U.S. Provisional Application No. 62/085,884, filed Dec. 1, 2014; and U.S. Provisional Application No. 62/150,575, filed Apr. 21, 2015, which applications are incorporated herein by reference in their entirety.

BACKGROUND

Optical networks are becoming prevalent in part because service providers want to deliver high bandwidth communication capabilities to customers. Such networks employ optical fiber cables that carry multiple optical fibers. The optical fibers can be transitioned out of the cables at various network nodes and routed to various communications components.

In general, optical fibers are connected to other optical fibers by splicing or by aligning optical connectors that terminate the ends of the optical fibers. Some optical connectors terminate only a single optical fiber each. Other optical connectors (e.g., an MPO connector) can terminate up to about twenty-four optical fibers.

Improvements are desired.

SUMMARY

In accordance with some aspects of the disclosure, a multi-fiber cable assembly includes a multi-fiber cable including a plurality of optical fibers, a strength member, and an outer jacket; a plurality of multi-fiber optical ferrules that each receive optical signals carried by some of the plurality of optical fibers; a fiber take-up arrangement at which excess length of the optical fibers is stored; an anchor section configured to secure the strength member of the multi-fiber cable; a connector housing arrangement including an outwardly extending flange; and a twist-to-lock fastener that mounts around the connector housing arrangement. The anchor section also defines a fiber passage through which the optical fibers extend towards the optical ferrules. The fiber take-up arrangement is structured to enable the optical fibers to be wrapped around the fiber take-up arrangement to manage excess length of the optical fibers. The twist-to-lock fastener has engagement structure that enables the twist-to-lock fastener to couple to a component. The twist-to-lock fastener also has an interior abutment surface that aligns with the outwardly extending flange of the connector housing to secure the connector housing to the component.

In certain implementations, the fiber take-up arrangement is disposed at the connector housing arrangement.

In certain implementations, the anchor section is disposed at the connector housing arrangement.

In certain implementations, a furcation cable extends between the fiber take-up arrangement and the connector housing arrangement. The furcation cable is more flexible than the multi-fiber cable.

In certain examples, the fiber take-up arrangement includes the anchor section. In examples, the anchor section includes a cavity at which an anchor boot attached to the strength member of the multi-fiber cable is inserted. In examples, the anchor section is a first anchor section. The fiber take-up arrangement also includes a second anchor section configured to receive a strength member of the furcation cable. In an example, the connector housing arrangement includes a third anchor section configured to receive the strength member of the furcation cable.

In certain examples, the fiber take-up arrangement includes a mandrel arrangement configured to hold the excess length of the optical fibers and a sealing arrangement providing an environmentally seal between the multi-fiber cable and the furcation cable. In examples, the mandrel arrangement includes a first anchor body separated from a second anchor body by a drum. The anchor bodies define cavities to receive strength members of the multi-fiber cable and the furcation cable. In examples, the sealing arrangement includes a closure member configured to surround the mandrel arrangement, first and second end members that attach to opposite ends of the closure member, and heat recoverable sleeves that attach to the first and second end members.

In certain examples, the connector housing arrangement holds the multi-fiber optical ferrules. In examples, the connector housing arrangement includes a front housing and a coupling sleeve. The front housing defines a connection end face at which the multi-fiber optical ferrules are accessible. The coupling sleeve is configured to extend around the front housing over a majority of the length of the front housing.

In examples, the front housing defines an anchor end at which a strength member of the furcation cable can be retained. In an example, the front housing includes a transition region disposed between the connection end face and the anchor end.

In examples, the front housing includes a first housing section and a second housing section that cooperate to hold the multi-fiber optical ferrules therebetween. The coupling sleeve retains the first and second housing sections together.

In examples, the coupling sleeve defines the outwardly extending flange. In an example, the coupling sleeve carries an external gasket.

In certain examples, the front housing includes a first housing section, a second housing section, and a third housing section. The connection end face is defined by the first housing section.

In examples, the first housing section defines a retention arrangement that temporarily holds the optical ferrules at the first housing section until the second and third housing sections are coupled to the first housing section.

In certain implementations, flanges extend forwardly of the multi-fiber optical ferrules to form an interrupted wall.

In certain implementations, an optical adapter connected to the connector housing arrangement. In certain examples, the optical adapter carries a plurality of second multi-fiber ferrules terminating second optical fibers. The second multi-fiber ferrules carried by the optical adapter align with the plurality of multi-fiber optical ferrules so that the optical fibers of the multi-fiber cable are optically coupled to the second optical fibers. In examples, the optical adapter includes a first housing and a second housing that sandwich a ferrule plug arrangement therebetween.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 5 is an axial cross-sectional view of the cable and optical connector of FIG. 1 taken along the 5-5 line of FIG. 1;

FIG. 6 is an axial cross-sectional view of the cable and optical connector of FIG. 1 taken along the 6-6 line of FIG. 1;

FIG. 7 is a front perspective view of another example multi-fiber cable terminated by an optical connector configured in accordance with the principles of the present disclosure;

FIG. 10 is an axial cross-sectional view of the cable and optical connector of FIG. 7 taken along the 10-10 line of FIG. 7;

FIG. 11 is an axial cross-sectional view of the cable and optical connector of FIG. 7 taken along the 11-11 line of FIG. 7;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 33:
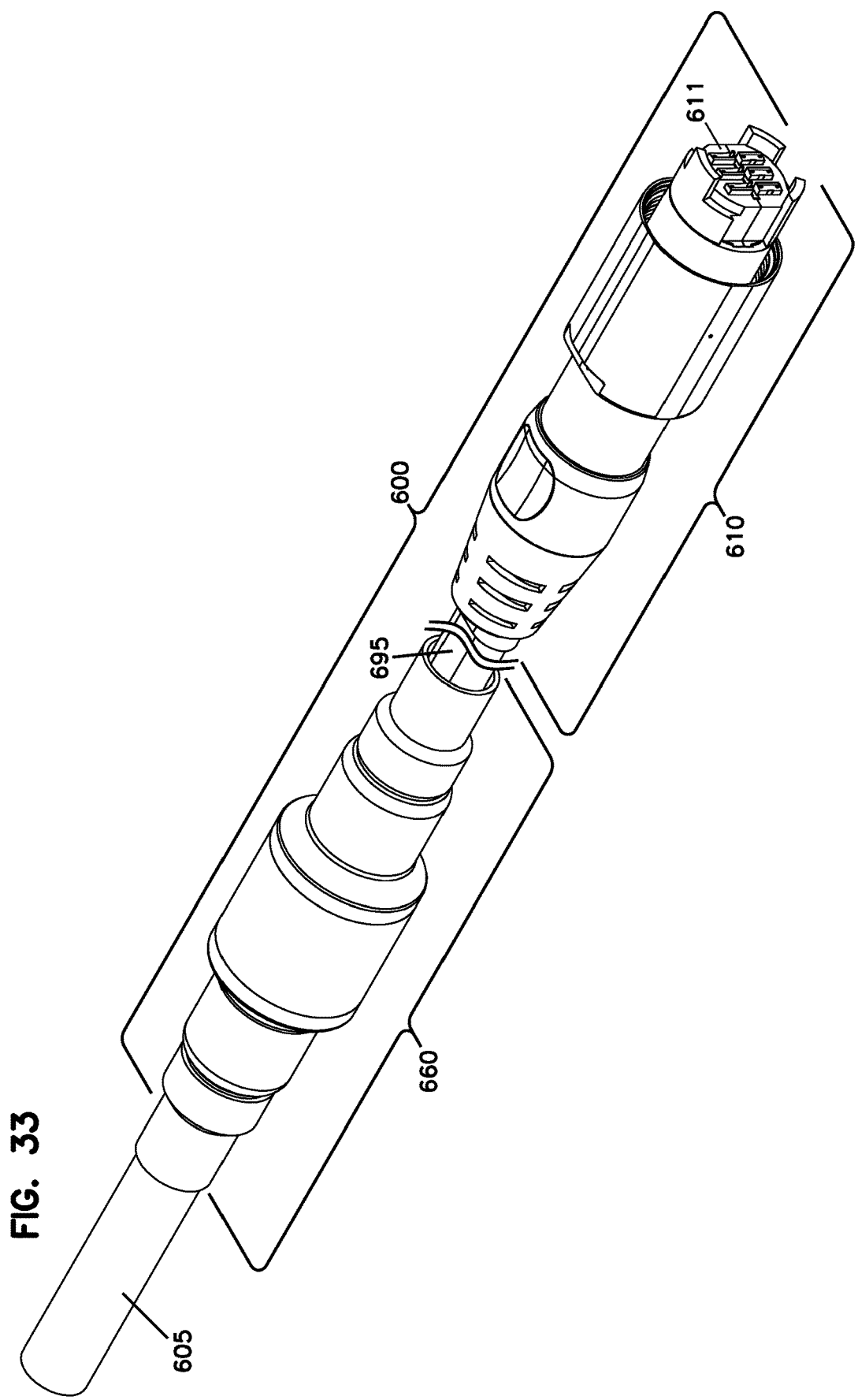
FIG. 33 is a front perspective view of another example multi-fiber cable terminated by an optical connector arrangement configured in accordance with the principles of the present disclosure, the optical connector arrangement including a connector housing arrangement and a fiber take-up arrangement.
Figure 34:
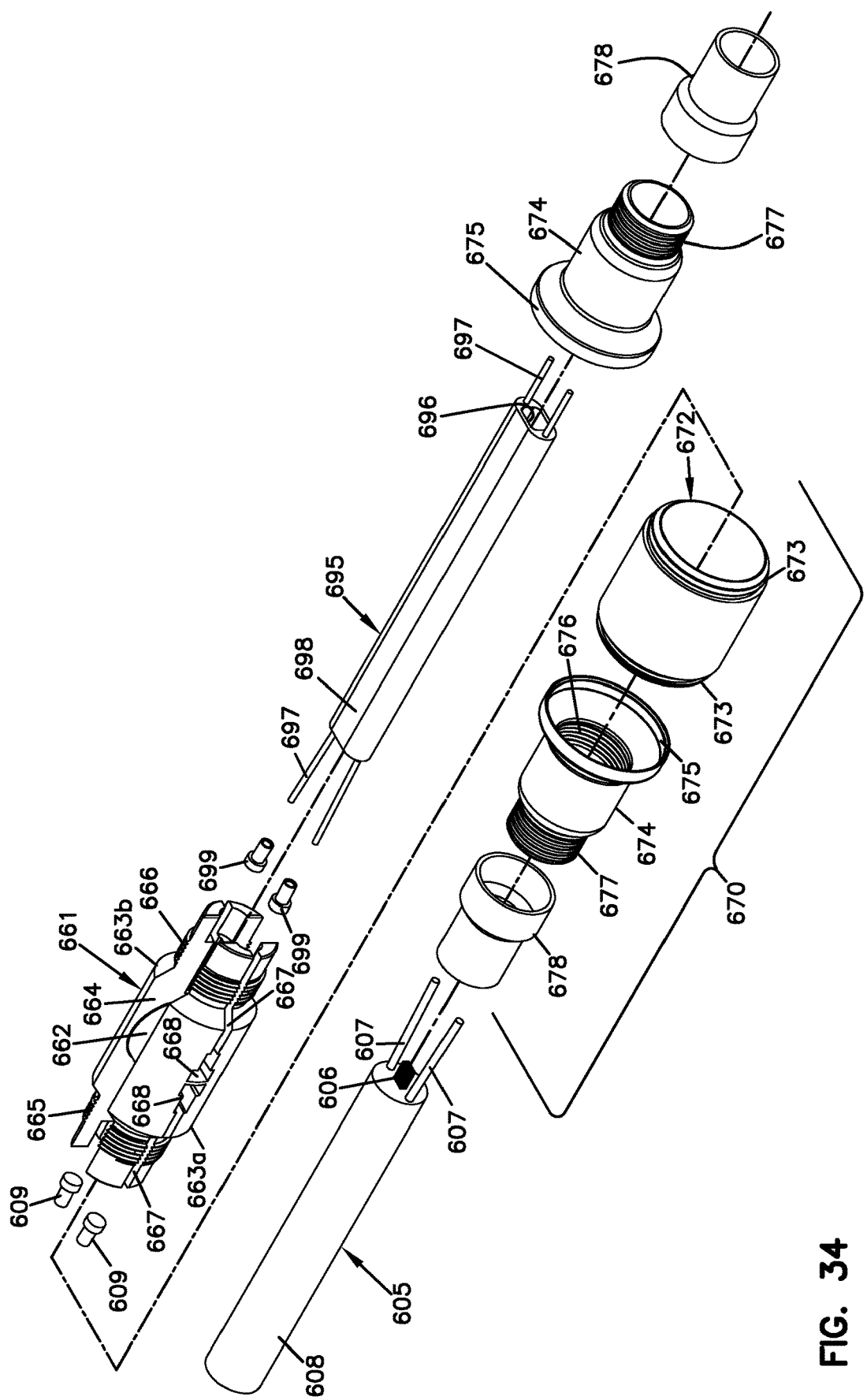
FIG. 34 is an exploded view of the fiber take-up arrangement of FIG. 33.
Figure 35:
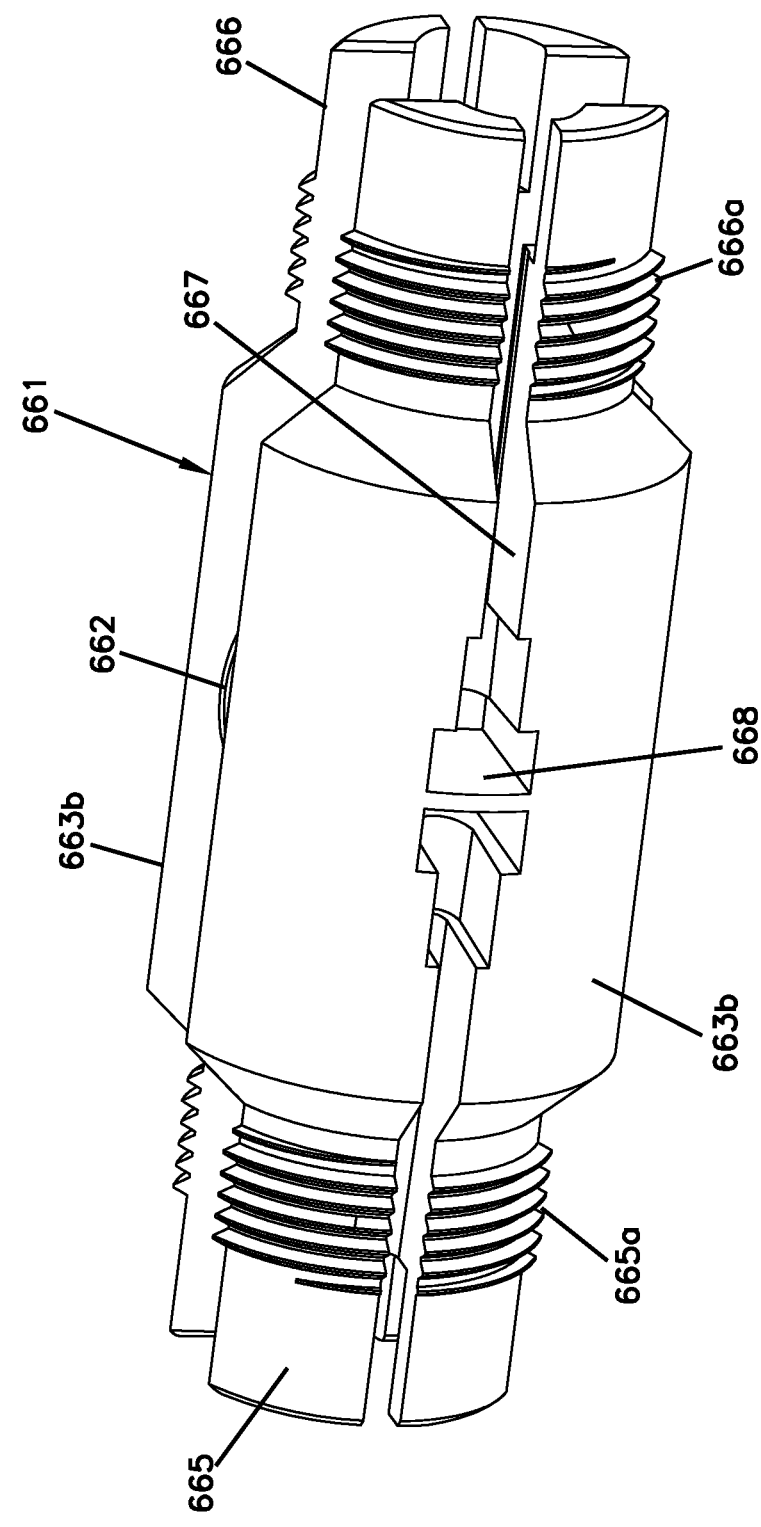
FIG. 35 is a perspective view of a mandrel arrangement of the fiber take-up arrangement of FIG. 34.
Figure 36:
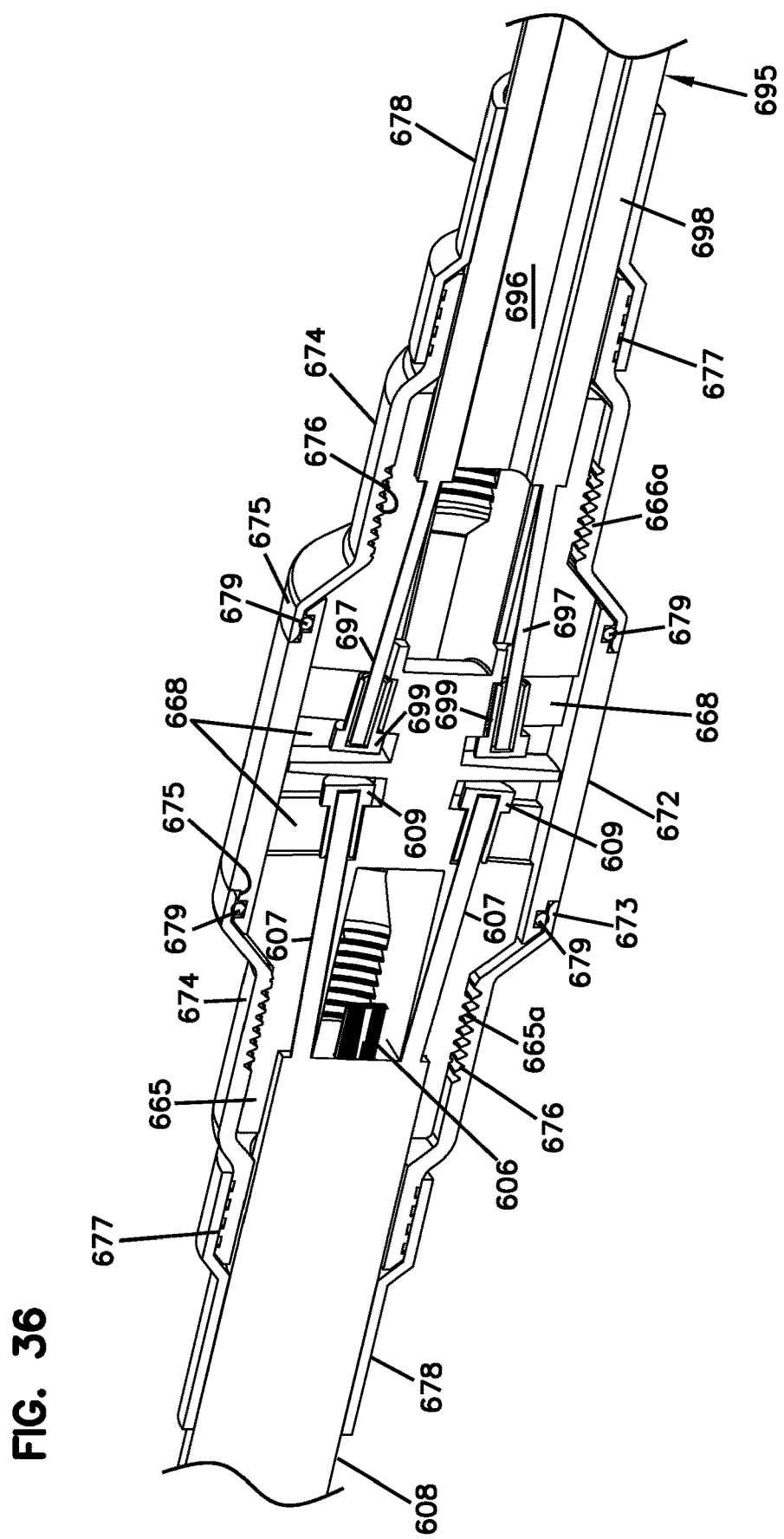
FIG. 36 is an axial cross-sectional view of the fiber take-up arrangement of FIG. 33.
Figure 37:
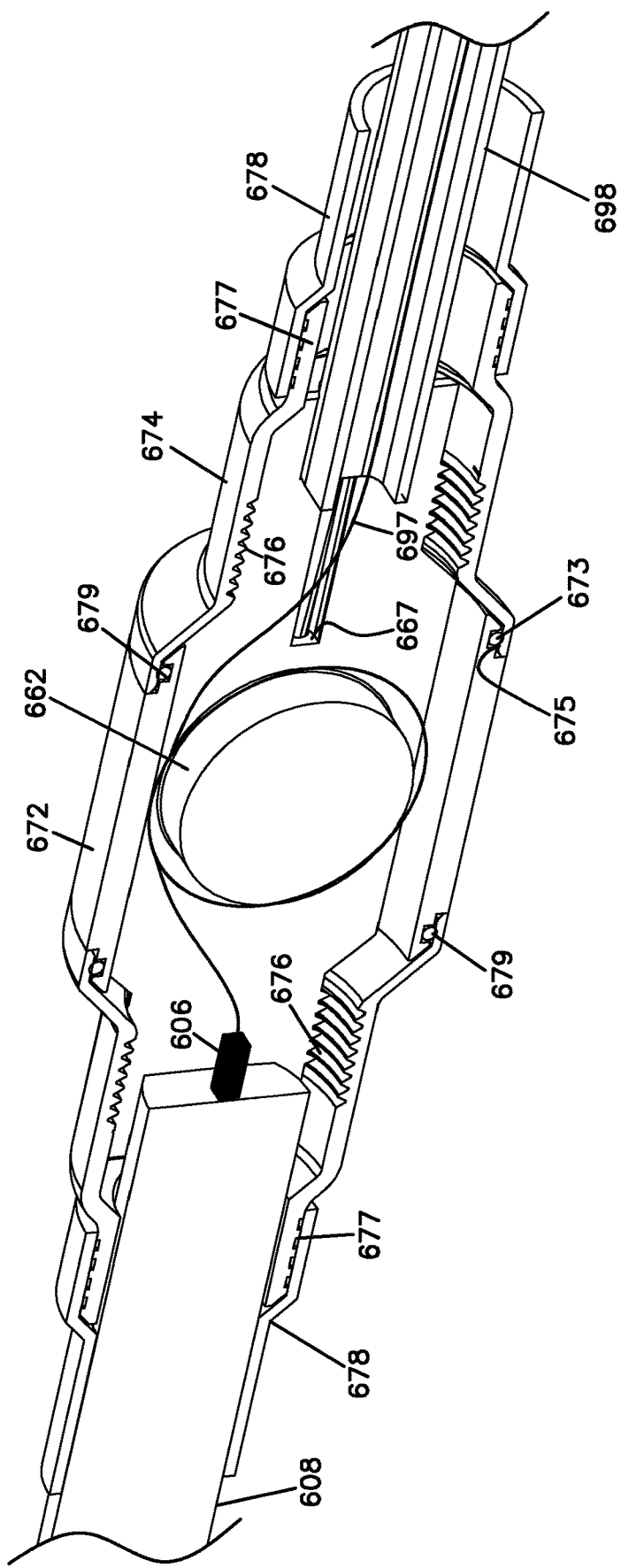
FIG. 37 is an axial cross-sectional view of the fiber take-up arrangement of FIG. 33 that is rotated 90° from the cross-sectional view of FIG. 36.

Referring to the figures in general, the present disclosure relates generally to an optical fiber connector arrangement 100, 200, 300, 400, 600 for a multi-fiber cable 105, 205, 305, 405, 605. The optical fiber connector arrangement 100, 200, 300, 400, 600 includes a connector housing arrangement 110, 210, 310, 410, 610, 810 defining an anchor section 112, 212, 312, 412, 612, 812 for the multi-fiber cable; multi-fiber optical ferrules 125, 425, 625, 825 that each terminate multiple optical fibers of the multi-fiber cable; and a fiber take-up arrangement 160, 260, 360, 460, 660. In some implementations, the fiber take-up arrangement 160, 260, 360, 460 is disposed at the connector housing arrangement 110, 210, 310, 410 (see FIGS. 2, 8, 15, and 18). In other implementations, the fiber take-up arrangement 660 is spaced along the cable 605 from the connector housing arrangement 610, 810 (see FIG. 33).

Figure 1:
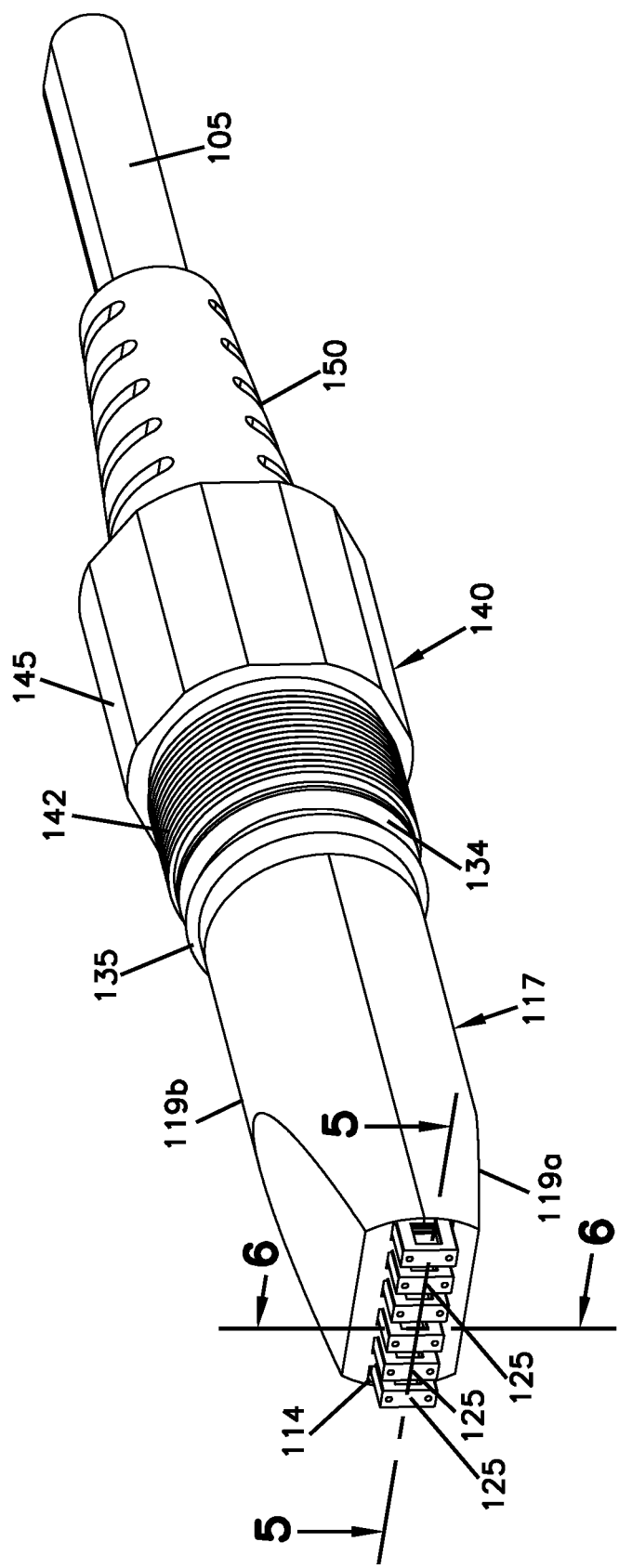
FIG. 1 is a front perspective view of an example multi-fiber cable terminated by an optical connector configured in accordance with the principles of the present disclosure.
Figure 2:
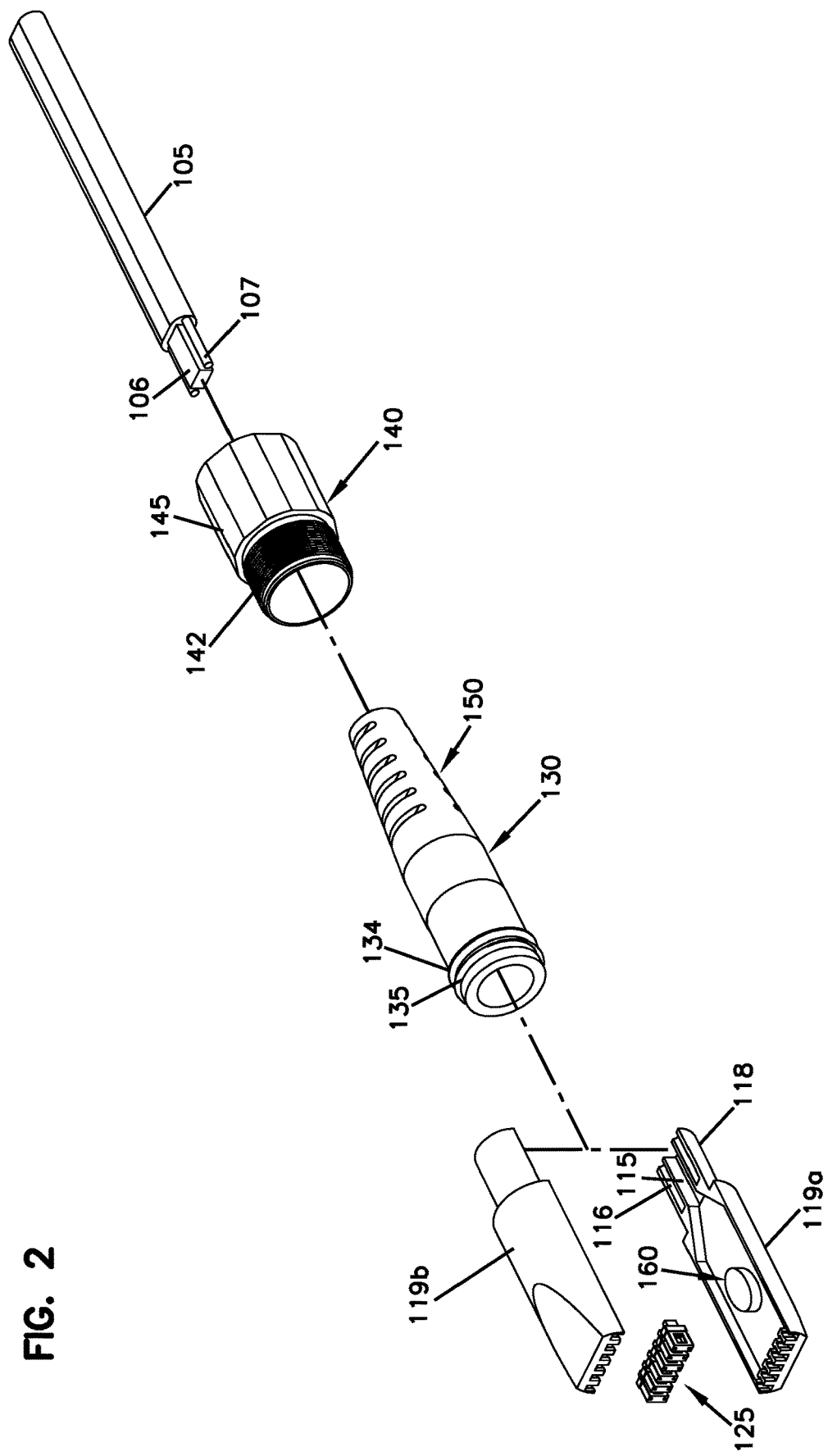
FIG. 2 is a front perspective view of the cable and components of the optical connector of FIG. 1 axially exploded from each other.
Figure 3:
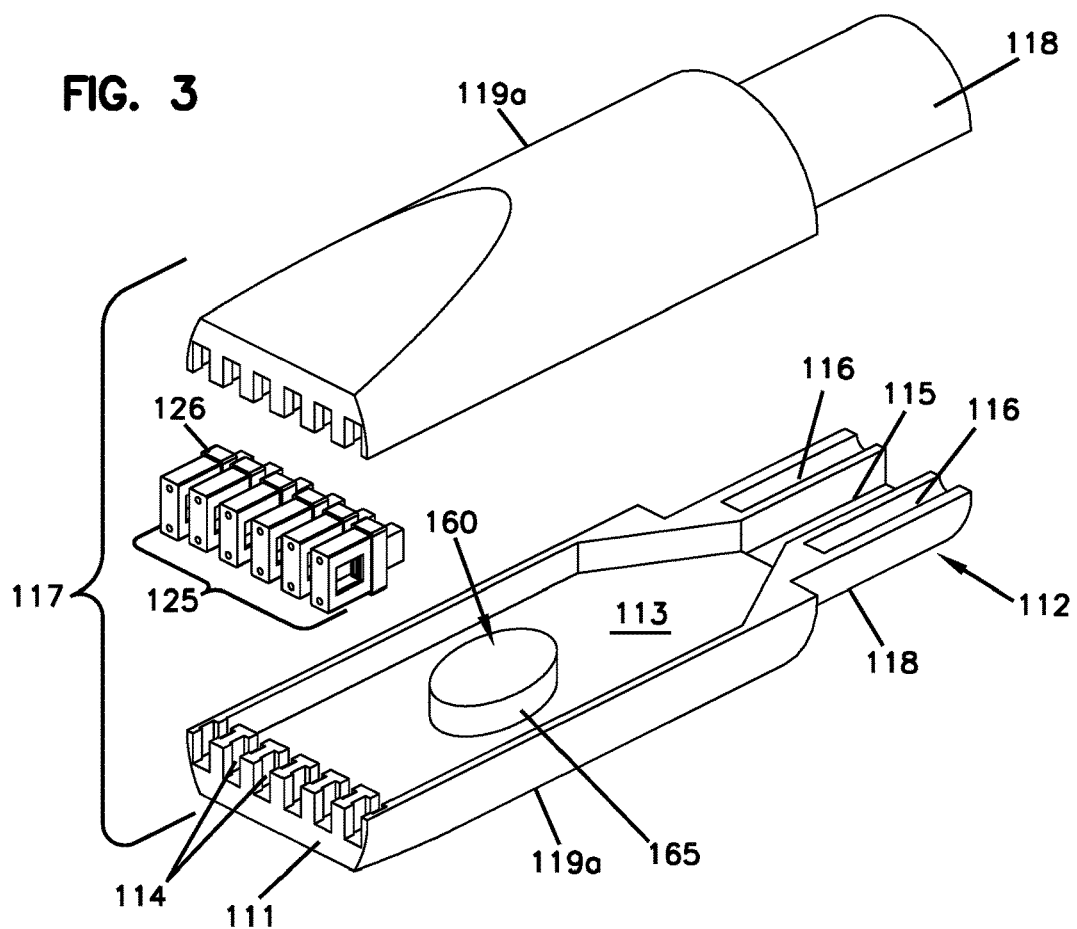
FIG. 3 in an enlarged view of a portion of FIG. 2.
Figure 4:
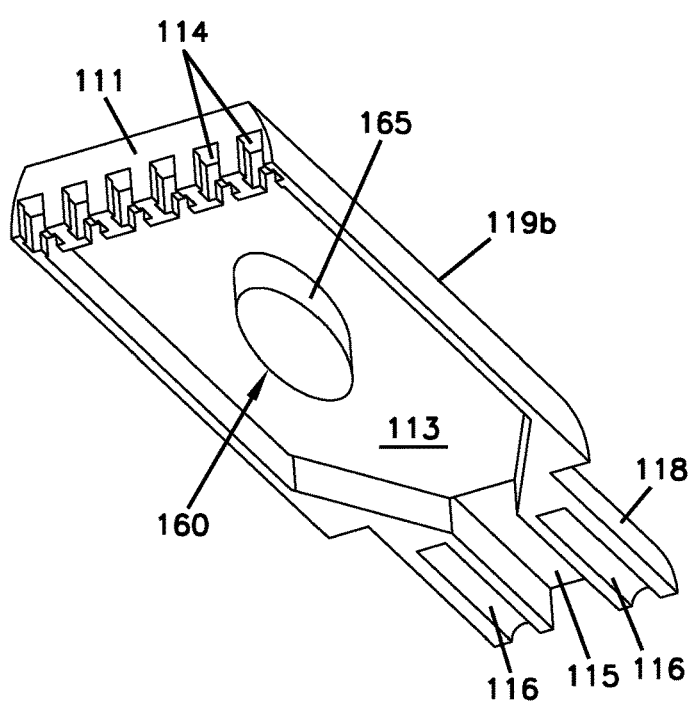
FIG. 4 is a bottom perspective view of a portion of FIG. 2.
Figure 8:
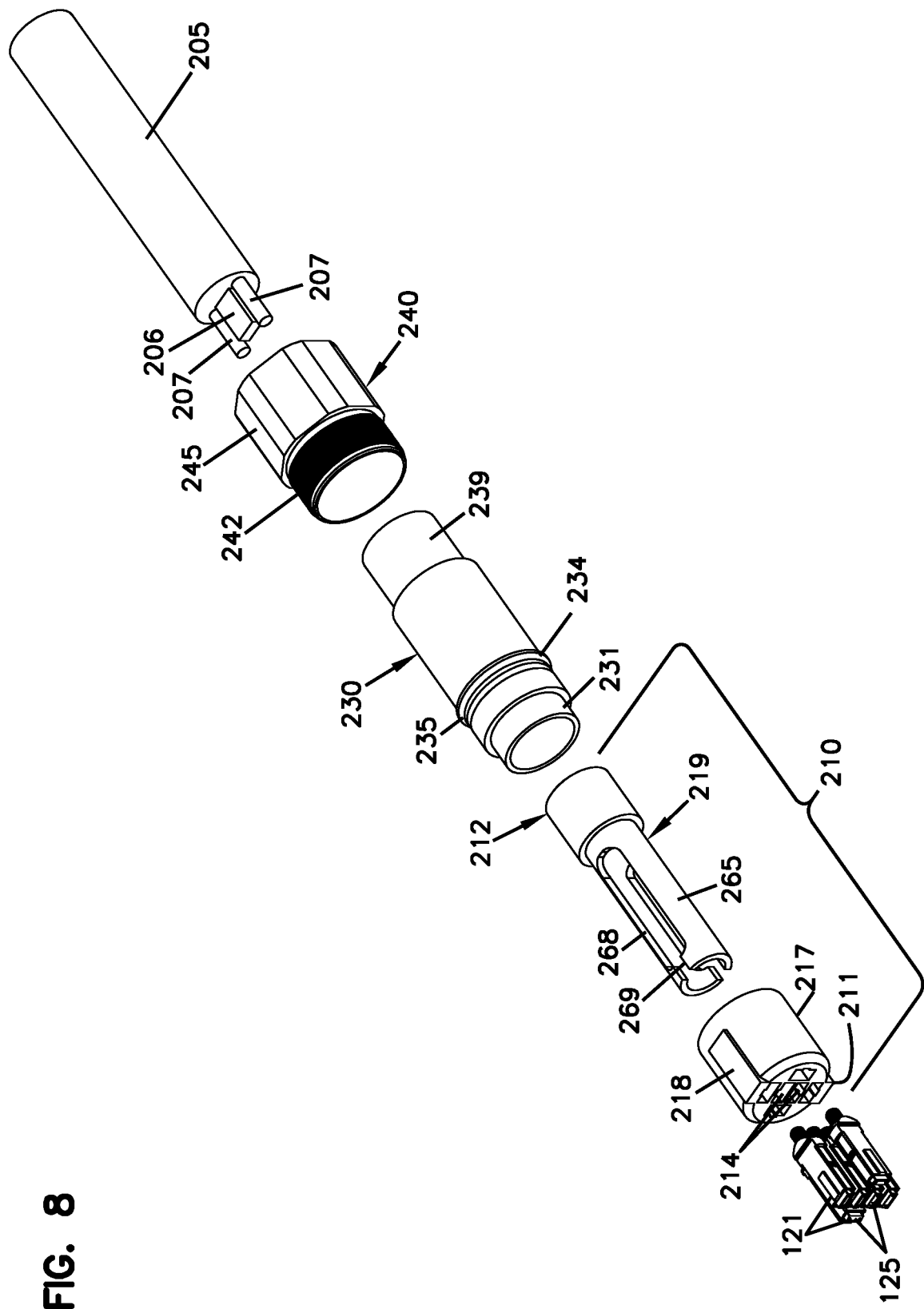
FIG. 8 a front perspective view of the cable and components of the optical connector of FIG. 7 axially exploded from each other.
Figure 9:
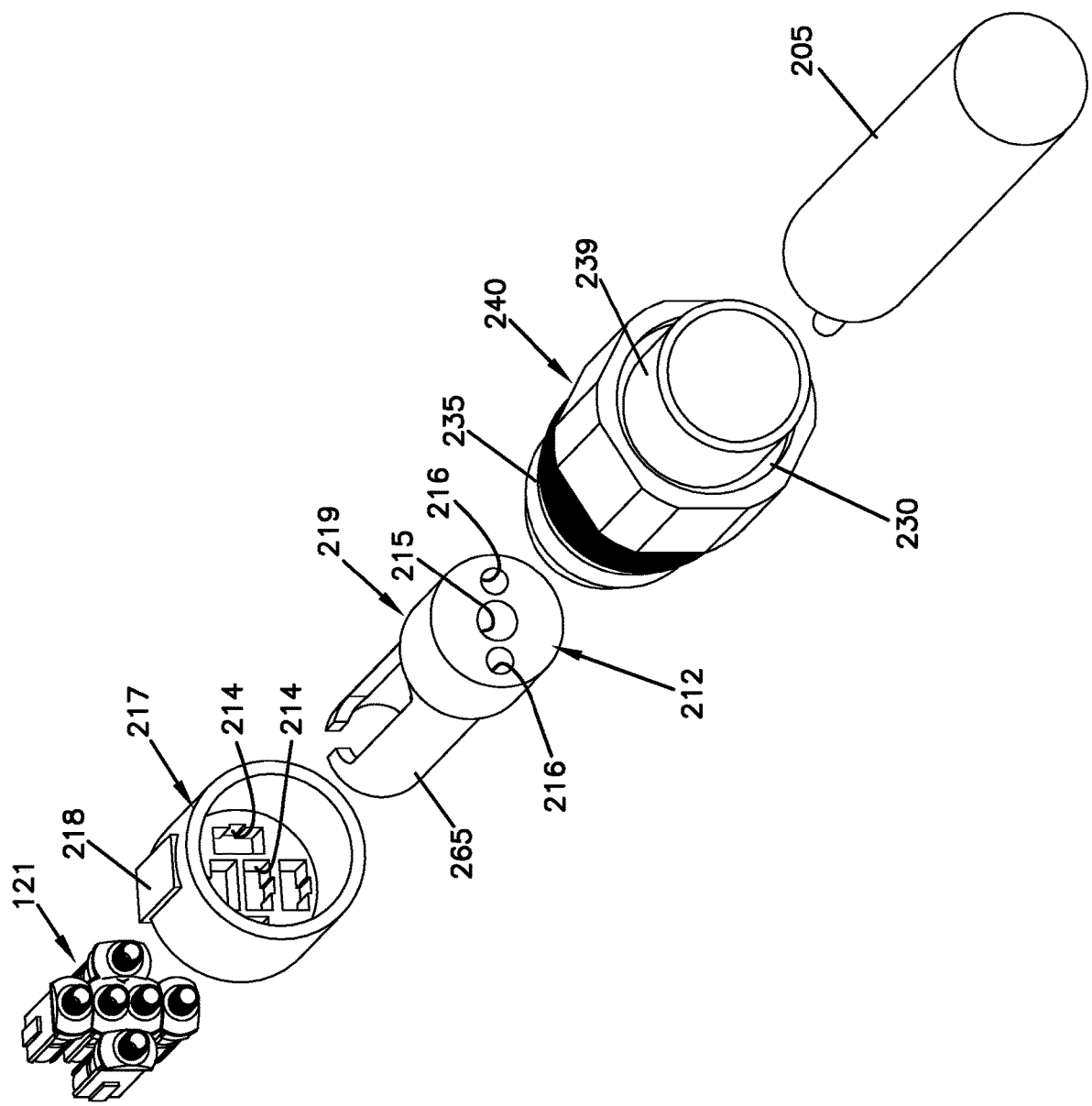
FIG. 9 a rear perspective view of FIG. 8.
Figure 12:
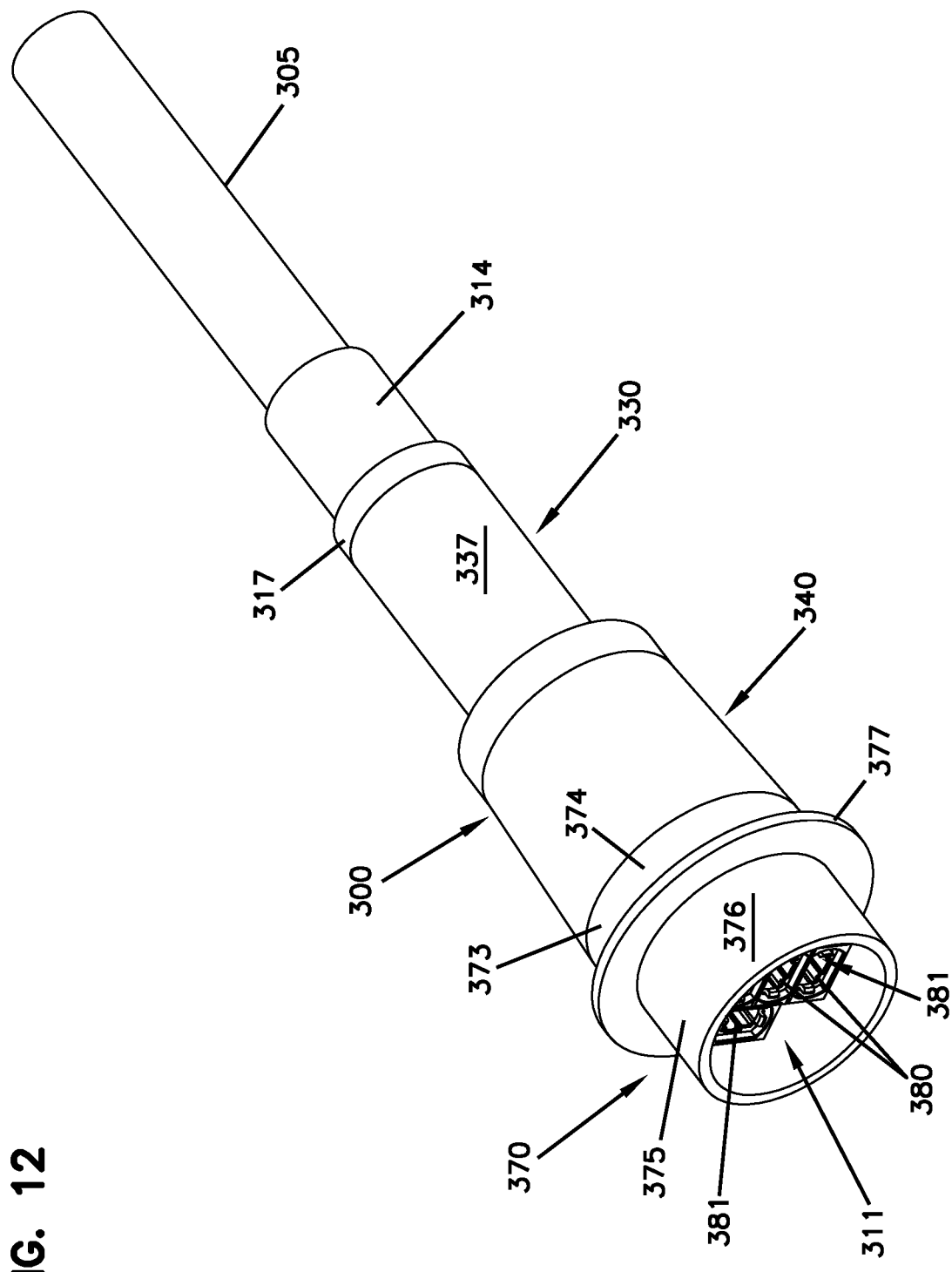
FIG. 12 is a front perspective view of another example multi-fiber cable terminated by an optical connector configured in accordance with the principles of the present disclosure.
Figure 13:
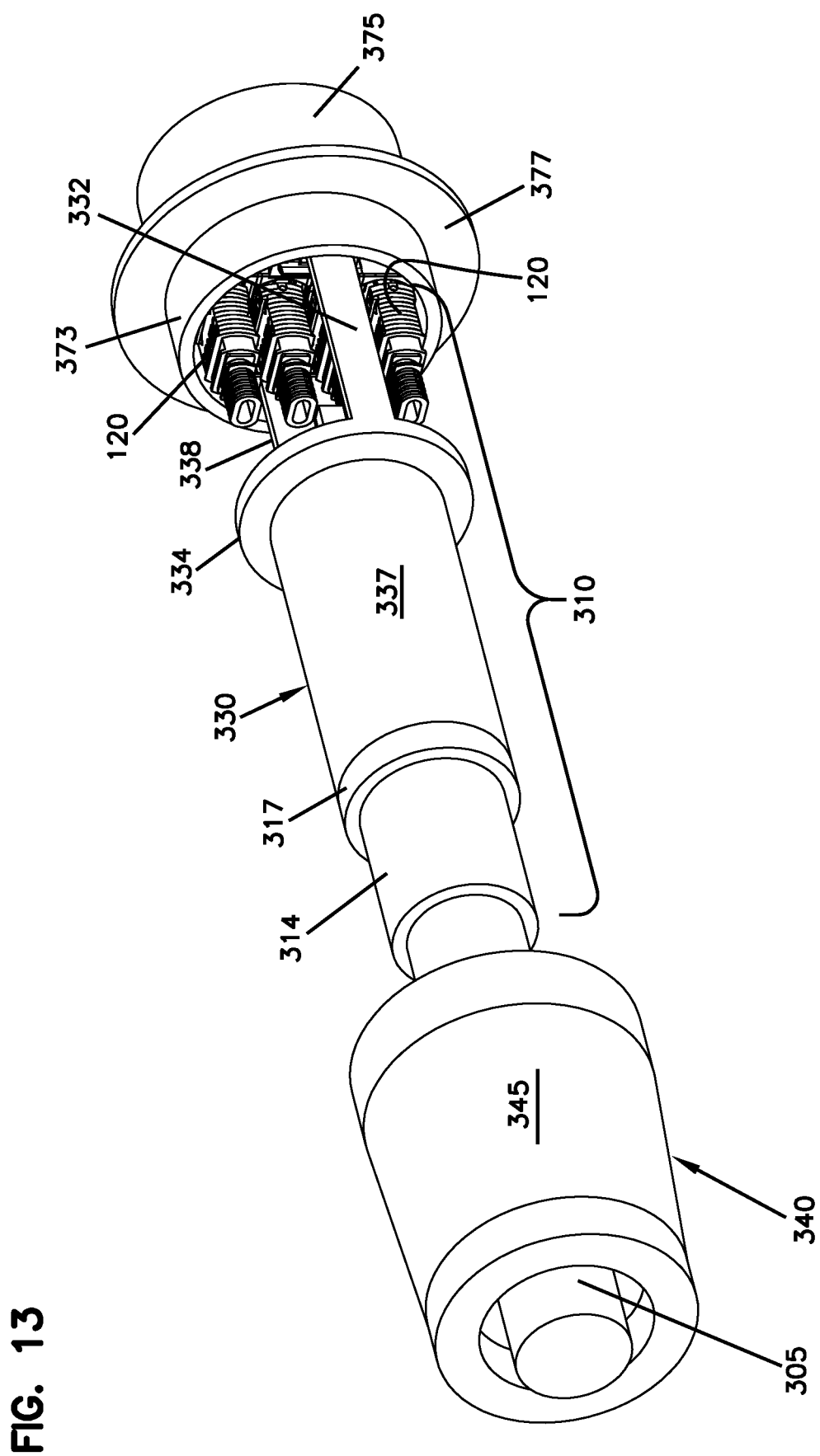
FIG. 13 is a rear perspective view of the cable and optical connector of FIG. 12 with a twist-to-lock fastener retracted from an adapter arrangement to reveal a coupling sleeve.
Figure 14:
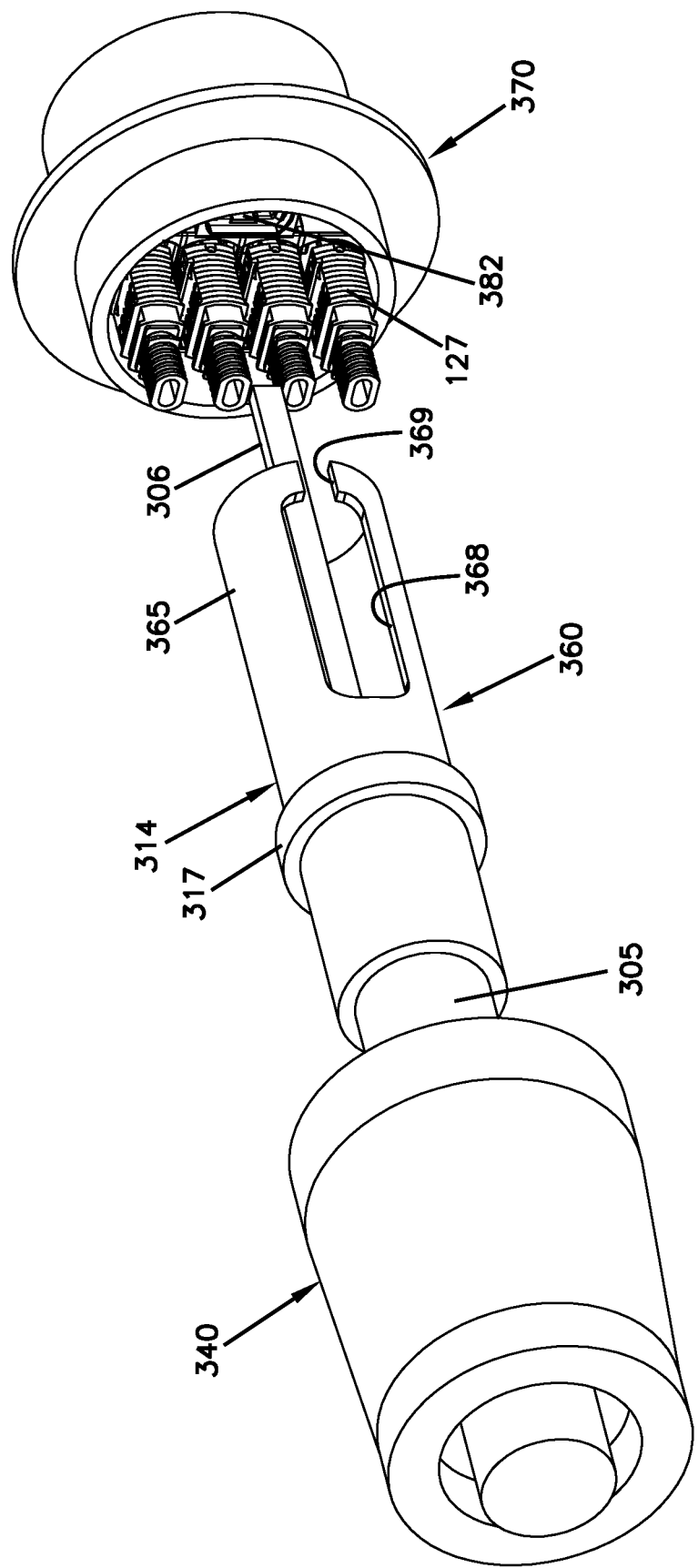
FIG. 14 shows the cable and optical connector of FIG. 13 with the coupling sleeve removed.
Figure 15:
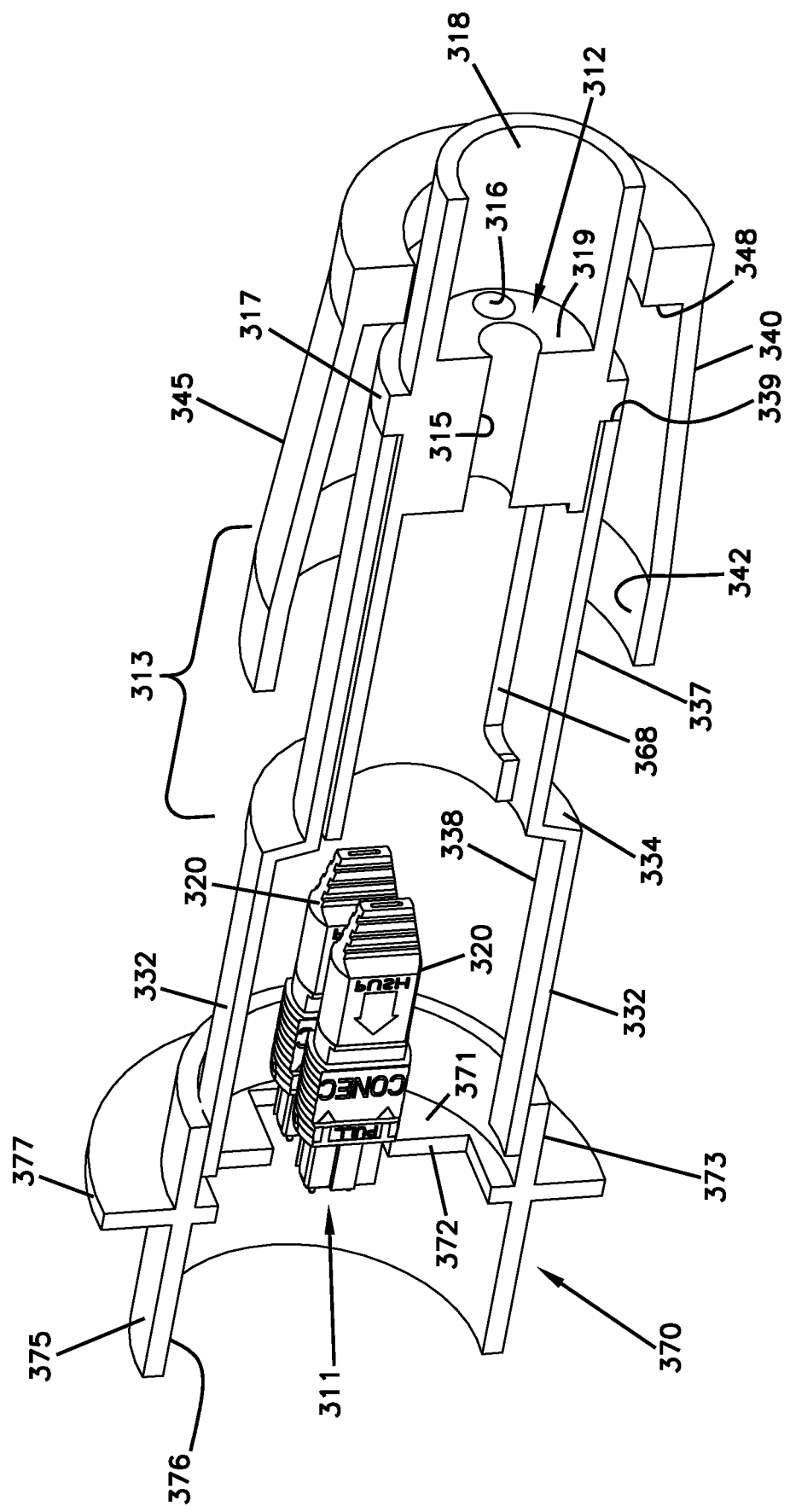
FIG. 15 is a front perspective view of an axial cross-section of the cable and optical connector of FIG. 13.
Figure 16:
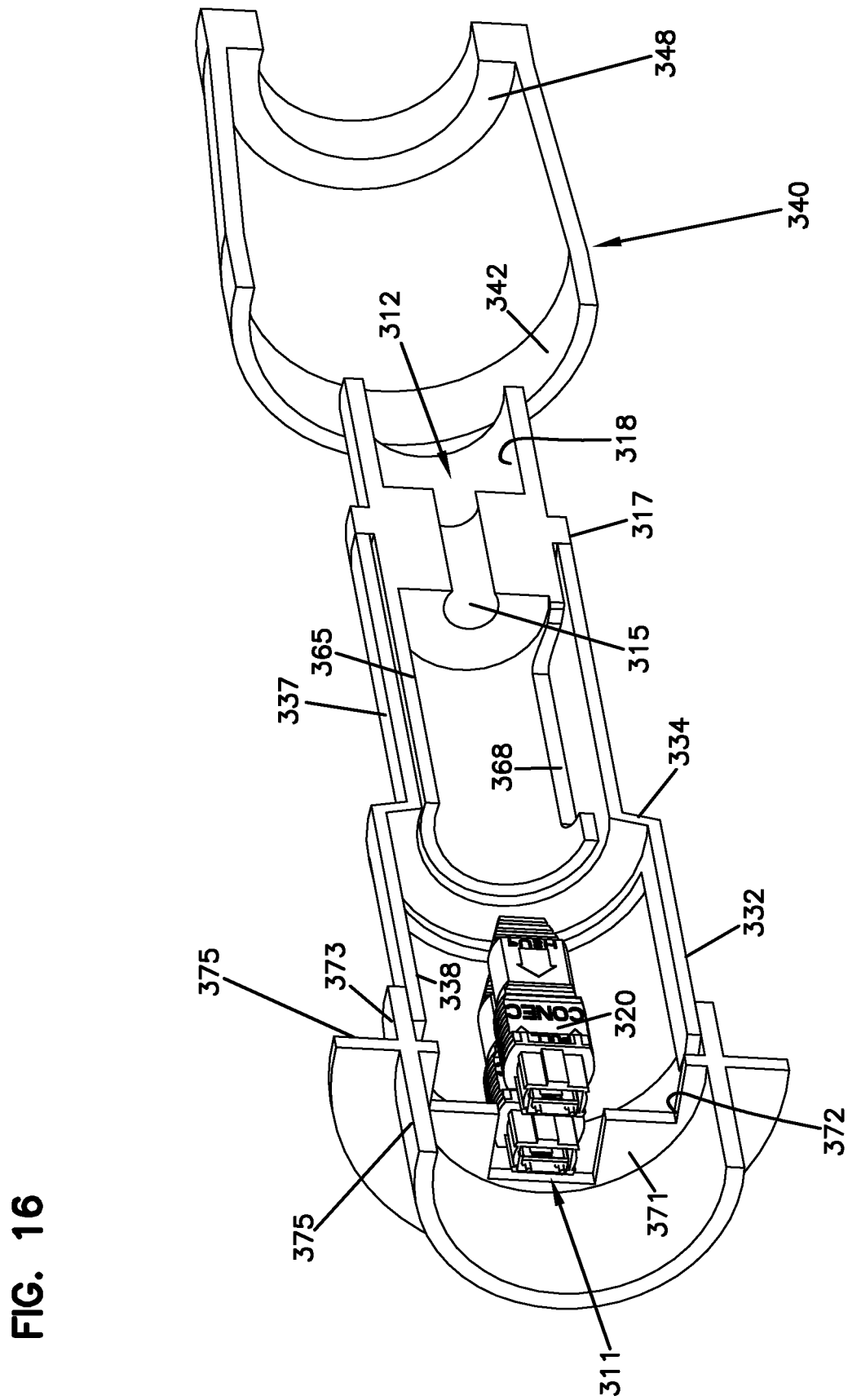
FIG. 16 is a rear perspective view of the axial cross-section of the cable and optical connector of FIG. 13.

In some implementations, the optical fiber connector arrangement 100, 400, 600 includes bare optical ferrules 125, 425, 625, 825 (e.g., see FIGS. 1, 19, 39, and 52). In other implementations, the optical fiber connectors 200, 300 include multi-fiber connectors 120 (e.g., MPO connectors) or portions thereof. For example, an MPO connector 120 includes a multi-fiber ferrule 125, a connector housing 121 that carries the ferrule 125, and a grip sleeve 127 that aids in disengaging the MPO connector 120 from a receptacle (e.g., an optical adapter port). Some types of connector housings 121 can hold springs to bias the ferrules 125. Some types of connector housings 121 help with ferrule alignment and/or protection. Some of the optical fiber connectors 300 disclosed herein include MPO connectors 120 (see FIG. 13). Others of the optical fiber connectors 200 disclosed herein include the connector housing 121 (see FIG. 8).

Each ferrule 125, 425, 625, 825 is configured to receive one or more optical fibers 106, 206, 306, 406, 606. In certain examples, each ferrule 125, 425, 625, 825 is configured to receive multiple optical fibers 106, 206, 306, 406, 606. In various examples, the ferrules 125, 425, 625, 825 can be configured to receive two fibers, four fibers, six fibers, twelve fibers, twenty-four fibers, thirty-six fibers, forty-eight fibers, seventy-four fibers, ninety-six fibers, one hundred forty-four fibers, or any other desired number of fibers.

The connector housing arrangement 110, 210, 310, 410, 610, 810 has a connection end 111, 211, 311, 411, 611, 811 at which the optical ferrules 125, 425, 625, 825 are accessible (see FIGS. 1, 7, 12, 17, 33, and 50). For example, each optical ferrule 125, 425, 625, 825 can be disposed in one of multiple openings defined at connection end 111, 211, 311, 411, 611, 811. In certain examples, the ferrules 125, 425, 625, 825 are biased out of the openings with springs (e.g., coil springs, leaf springs, etc.). In some implementations, the ferrules 125, 425, 625, 825 can be individually spring-biased. In other implementations, one spring can bias two or more ferrules 125, 425, 625, 825. In an example, all of the ferrules 125, 425, 625, 825 can be biased by a single spring. In still other examples, the ferrules 125, 425, 625, 825 can be axially fixed at the connection end 111, 211, 311, 411, 611, 811.

In some implementations, the optical ferrules 125, 425, 625, 825 extend forwardly of the respective connection end 111, 211, 411, 611, 811 (see FIGS. 1, 7, 17, 33, and 50). In other implementations, the optical ferrules 125, 425, 625, 825 are recessed within the openings (see FIG. 12). For example, the optical ferrules 125, 425, 625, 825 can be disposed within ports of an adapter mounted to the connection end of the optical fiber connector 300 as will be described in more detail herein.

The connector housing arrangement 110, 210, 310, 410, 610, 810 has an anchor section 112, 212, 312, 412, 612, 812 at which the multi-fiber cable 105, 205, 305, 405 or a furcation cable 695 coupled to the multi-fiber cable 605 is received (see FIGS. 5, 6, 10, 11, 15, 20, 36, and 52). In certain implementations, one or more strength members 107, 207, 407, 697 of the multi-fiber cable 105, 205, 305, 405 or furcation cable 695 are secured (e.g., crimped, glued, hooked, wrapped around, etc.) at the anchor section 112, 212, 312, 412, 612, 812. Optical fibers 106, 206, 306, 406, 606 of the multi-fiber cable 105, 205, 305, 405, 605 extend through the anchor end 112, 412, 612, 812, through the connector housing arrangement 110, 210, 310, 410, 610, 810, and to the optical ferrules 125, 425, 625, 825 at the connection end 111, 211, 311, 411, 611, 811.

In some implementations, a flat drop cable 105, 205, 305, 405 or flat furcation cable 695 includes two strength members 107, 207, 307, 407, 697 (e.g., fiber reinforced epoxy rods) that anchor to the connector housing arrangement 110, 210, 310, 410, 610, 810. For example, the two strength members 107, 207, 307, 407, 697 can be inserted into cavities defined at the anchor section 112, 212, 312, 412, 612, 812 (e.g., see FIGS. 21, 42, and 52). In other implementations, other types of cables (e.g., round cables) and/or cables having other types of strength members (e.g., aramid yarn, fiberglass strands, etc.) can be anchored to the connector housing arrangement 110, 210, 310, 410, 610, 810 (e.g., by adhesive, crimping, etc.).

The fiber take-up arrangement 160, 260, 360, 460, 660 is configured to manage excess length of the optical fibers before the optical fibers reach the connection end 11, 211, 311, 411, 611, 811 of the connector housing arrangement 110, 210, 310, 410, 610, 810. In some implementations, the fiber take-up arrangement 160, 260, 360, 460 is disposed at the connector housing arrangement 110, 210, 310, 410, 610, 810. In other implementations, the fiber take-up arrangement 660 is spaced from the connector housing arrangement 610, 810. In such implementations, the fiber take-up arrangement 660 anchors the multi-fiber cable 605 and receives the optical fibers 606 thereof. The optical fibers 606 extend from the fiber take-up arrangement 660 along the furcation cable 695 to the connector housing arrangement 610, 810.

In some implementations, the optical cable 105, 205, 305, 405, 605 is sealed to the optical fiber connector arrangement 100, 200, 300, 400, 600. Sealing between the cable 105, 205, 305, 405, 605 and the connector arrangement 100, 200, 300, 400, 600 can be accomplished using radial seals, axial seals, and heat recoverable sleeves 455, 655, 678, 878. In some implementations, the optical cable 105, 205, 305, 405 is sealed to the connector housing arrangement 110, 210, 310, 410. In other implementations, the optical cable 605 is sealed to the fiber take-up section 660 of the connector arrangement 600 and the furcation cable 695 is sealed to the fiber take-up section 660 and the connector housing arrangement 610, 810.

In some implementations, the optical fiber connector arrangement 100, 200, 300, 400, 600 provides environmental protection when the connector arrangement 100, 200, 300, 400, 600 is received at a component (e.g., an optical adapter 500, 700). For example, in some implementations, the optical fiber connector arrangement 100, 200, 300, 400, 600 can include a gasket or other sealing member that provides a seal between the optical fiber connector arrangement 100, 200, 300, 400, 600 and the component. Sealing between the component and the connector arrangement 100, 200, 300, 400, 600 can be accomplished using radial seals and/or axial seals. In an example, an O-ring 135, 235, 435, 635, 835 can be provided on the connector housing arrangement 110, 210, 310, 410, 610, 810. In another example, the gasket 135, 235, 435, 635, 835 can be provided on another portion of the connector arrangement 100, 200, 300, 400, 600. In other implementations, the optical fiber connector arrangement 100, 200, 300, 400, 600 can be configured to press against a gasket or sealing member disposed at the component (e.g., within a receptacle defined by the component).

In some implementations, the environmental seal between the optical fiber connector arrangement 100, 200, 300, 400, 600 and the component is activated by a twist-to-lock fastener 140, 240, 340, 440, 640, 840. A twist-to-lock fastener connects a first object to a second object by twisting (e.g., rotating) the fastener to connect the fastener to the second object while the fastener is engaged with the first object. Non-limiting examples of twist-to-lock connections include threaded connections and bayonet connections. In an example, the twist-to-lock fastener 140, 240, 340, 440, 640, 840 includes an external threaded surface to engage an internal threaded surface of the component. In another example, the twist-to-lock fastener 140, 240, 340, 440, 640, 840 includes an internal threaded surface to engage an external threaded surface of the component. In an example, the twist-to-lock fastener 140, 240, 340, 440, 640, 840 includes part of a bayonet connection to mate with a corresponding part of the bayonet connection on the component.

In certain implementations, the twist-to-lock fastener 140, 240, 340, 440, 640, 840 can be disposed over the connector housing arrangement 110, 210, 310, 410, 610, 810, which includes an outwardly extending flange 134, 234, 334, 434, 634. To connect the optical connector arrangement 100, 200, 300, 400, 600 to the component, the twist-to-lock fastener 140, 240, 340, 440, 640 is moved relative to the connector housing arrangement 110, 210, 310, 410, 610 to abut the outwardly extending flange 134, 234, 334, 434, 634, 834. The twist-to-lock fastener 140, 240, 340, 440, 640, 840 is twisted to engage the component (e.g., to engage a threaded surface, to engage a bayonet surface, etc.) to trap the outwardly extending flange 134, 234, 334, 434, 634, 834 between the component and the twist-to-lock fastener 140, 240, 340, 440, 640, 840. In an example, the gasket or seal 135, 235, 435, 635, 835 can be provided on or in the twist-to-lock fastener 140, 240, 340, 440, 640, 840.

Five example optical connector arrangements 100, 200, 300, 400, 600 suitable for use in termination a multi-fiber cable 105, 205, 305, 405, 605 are described in more detail herein. Each of these optical connector arrangements 100, 200, 300, 400, 600 is configured to terminate at least 72 optical fibers. In certain examples, each of these optical connector arrangements 100, 200, 300, 400, 600 is configured to terminate at least 96 optical fibers. In certain examples, each of these optical connector arrangements 100, 200, 300, 400, 600 is configured to terminate at least one 108 optical fibers. In certain examples, each of these optical connector arrangements 100, 200, 300, 400, 600 is configured to terminate at least one 144 optical fibers.

FIGS. 1-6 illustrate one example optical fiber connector 100 including a connector housing arrangement 110, optical ferrules 125 carried by the connector housing arrangement 110, and a fiber take-up arrangement 160 disposed within the connector housing arrangement 110. The connector housing arrangement 110 defines a transition region 113. Optical fibers 106 of the multi-fiber cable 105 enter the connector housing arrangement 110 at the anchor end 112 and are routed through the transition region 113 of the connector housing arrangement 110 to the optical ferrules 125.

In some implementations, the connector housing arrangement 110 includes a front housing 117 and a coupling sleeve 130. The front housing 117 defines the connection end face 111, the anchor end 112, and the take-up arrangement 160. In some implementations, the front housing 117 includes an integral housing. In other implementations, however, the front housing 117 includes a first housing section 119a and a second housing section 119b. In certain examples, the first and second housing parts 119a, 119b cooperate to retain the ferrules 125. In an example, the first and second housing parts 119a, 119b are identical.

In some implementations, the connection end face 111 of the front housing 117 defines one or more openings 114 at which the optical ferrules 125 are accessible. For example, each housing part 119a, 119b may define open-ended slots or notches that align to form the openings 114. In the example shown, each ferrule 125 mounts in a respective one of the openings 114. For example, each ferrule 125 may include a shoulder 126 that abuts a retention surface at the opening 114. Each ferrule 125 may be individually spring-biased within the respective opening 114. Alternatively, two or more of the ferrules 125 may be biased by a common spring. In other implementation, however, multiple ferrules 125 can mount in a common opening 114. In certain examples, portions of the ferrules 125 protrude forwardly of the openings 114. In certain examples, the ferrules 125 are laterally aligned in a row. In other examples, the ferrules 125 can be disposed in any desired pattern.

In certain implementations, a fiber take-up arrangement 160 is disposed at the transition region 113 of the front housing 117. In some implementations, the fiber take-up arrangement 160 includes a spool or mandrel 165. In an example, the spool 165 has a circular shape. In another example, the spool 165 has an oblong shape. In some examples, the spool 165 is integral with one of the housing parts 119a, 119b. In other examples, the spool 165 attaches to an interior of one of the housing parts 119a, 119b. In certain examples, the housing parts 119a, 119b cooperate to define the spool 165.

In certain implementations, the anchor end 112 of the front housing 117 defines a fiber passage 115 at which the optical fibers 106 may enter the front housing 117. In examples, the fiber passage 115 is sized to receive multiple optical fibers 106. In an example, the fiber passage 115 is configured to receive one or more ribbons of optical fibers 106. In another example, the fiber passage 115 is configured to receive loose optical fibers 106. In certain examples, the first and second housing parts 119a, 119b cooperate to define the fiber passage 115. The fiber passage 115 provides access to the transition region 113 at which individual optical fibers 106 separate out to be terminated at the optical ferrules 125.

In certain implementations, the anchor end 112 also includes strength member cavities 116 at which the strength members 107 of the multi-fiber cable 105 are received. In certain examples, the first and second housing parts 119a, 119b cooperate to define the cavities 116. In examples, epoxy can be applied to the strength members 107 at the strength member cavities 116 to retain the strength members 107 at the plug nose arrangement 110. In other examples, the strength members 107 can be otherwise held at the cavities 116. In examples, the strength member cavities 116 do not connect to the transition region 113.

In certain implementations, the front housing 117 includes a reduced section 118 at the anchor end 112. The reduced section 118 tapers or steps inwardly from a remainder of the front housing 117. In an example, the first and second housing parts 119a, 119b cooperate to define the reduced section 118. In some implementations, the reduced section 118 of the front housing 117 defines the strength member cavities 116. In certain implementations, the reduced section 118 of the front housing 117 defines the fiber passage 115.

The coupling sleeve 130 couples to the front housing 117. In certain implementations, the coupling sleeve 130 mounts over the reduced section 118 of the front housing 117. In some implementations, the coupling sleeve 130 carries a gasket (e.g., an O-ring) 135 and includes an outwardly extending flange 134. In the example shown, the gasket 135 is disposed between the flange 134 and the connection end face 111. In other implementations, the gasket 135 can be mounted within the coupling sleeve 130 or over the front housing 117. The strain-relief boot 150 is coupled to the coupling sleeve 130 and extends over a portion of the multi-fiber cable 105.

A twist-to-lock fastener 140 is disposed over the coupling sleeve 130 to releasably secure the optical fiber connector 100 to a component (e.g., an optical adapter). In examples, the gasket 135 can be disposed on or in the twist-to-lock fastener 140 instead of or in addition to connector housing arrangement 110. In examples, the twist-to-lock fastener 140 included a threadable nut having an external threaded section 142 and a gripping section 145. When the connector 100 is plugged into a port of a component, the threaded section 142 of the twist-to-lock fastener 140 is engaged with an internal thread of the component. In other examples, the twist-to-lock fastener 140 can include a bayonet connection. Rotating the twist-to-lock fastener 140 relative to the component moves the twist-to-lock fastener 140 axially against the outwardly extending flange 134 of the coupling sleeve 130, thereby securing the connector 100 to the component.

In accordance with some aspects, during assembly of the connector 100, the multi-fiber cable 105 is threaded through the coupling sleeve 130 to the front housing 117. The jacket is removed from a front portion of the cable 105. Strength members 107 of the cable 105 are placed in portions of the cavities 116 defined in the first housing part 119a of the front housing 117. A fiber ribbon is disposed along a portion of the fiber passage 115 defined in the first housing part 119a. The optical fibers 106 of the ribbon are separated and terminated at the optical ferrules 125. The optical ferrules 125 are mounted to the portions of the openings 114 defined in the first housing part 119a. Excess length of optical fibers 106 is wrapped around the spool 165. The second housing part 119b of the front housing 117 is disposed over the first housing part 119a to form the front housing 117. The coupling sleeve 130 slides axially over the reduced section 118 of the front housing 117.

FIGS. 7-11 illustrate another example optical fiber connector 200 including a connector housing arrangement 210, optical ferrules 125 carried by the connector housing arrangement 210, and a fiber take-up arrangement 260 disposed within the connector housing arrangement 210. The connector housing arrangement 210 defines a transition region 213. Optical fibers 206 of the multi-fiber cable 205 enter the connector housing arrangement 210 at the anchor end 212 and are routed through the transition region 213 of the connector housing arrangement 210 to the optical ferrules 125.

In some implementations, the connector housing arrangement 210 includes a front housing 217, a rear housing 219, and a coupling sleeve 230. The front housing 217 defines the connection end face 211 and the rear housing 219 defines the anchor end 212 and the take-up arrangement 260. In an example, the front housing 217 includes a key 218 for rotationally orienting the connector 200. In some implementations, the front housing 217 attaches to a front of the coupling sleeve 230 and the rear housing 219 attaches to a rear of the coupling sleeve 230. In certain implementations, a portion of the rear housing 219 extends into the coupling sleeve 230.

In some implementations, the connection end face 211 of the front housing 217 defines one or more openings 214 at which the optical ferrules 125 are accessible. In the example shown, each opening 214 receives a connector housing 121 (e.g., an MPO connector housing) without a surrounding grip housing 127. In certain examples, each connector housing 121 provides a spring bias for the corresponding ferrule 125. In certain examples, the connector housing 121 includes a rotational orientation key. In other implementation, however, full MPO connectors 120 including the grip housings 127 can be disposed at the openings 214. In still other implementations, multiple connectors 120 or portions thereof can be received in an opening 214. In certain examples, portions of the ferrules 125 protrude forwardly of the openings 214. In certain examples, the ferrules 125 are disposed in a plus sign pattern. In other examples, the ferrules 125 can be disposed in any desired pattern.

In certain implementations, the rear housing 219 includes the anchor end 212, which defines a fiber passage 215 at which the optical fibers 206 may enter the connector housing arrangement 210. In examples, the fiber passage 215 is sized to receive multiple optical fibers 206. In an example, the fiber passage 215 is configured to receive one or more ribbons of optical fibers 206. In another example, the fiber passage 215 is configured to receive loose optical fibers 206. The fiber passage 215 provides access to the transition region 213 at which individual optical fibers 206 separate out to be terminated at the optical ferrules 125.

In certain implementations, the anchor end 212 also includes strength member cavities 216 at which the strength members 207 of the multi-fiber cable 205 are received. In examples, epoxy can be applied to the strength members 207 at the strength member cavities 216 to retain the strength members 207 at the connector housing arrangement 210. In other examples, the strength members 207 can be otherwise held at the cavities 216. In examples, the strength member cavities 216 do not connect to the transition region 213.

In certain implementations, the rear housing 219 also includes the fiber take-up arrangement 260. In some implementations, the fiber take-up arrangement 260 includes a mandrel extending forwardly of the anchor section 212. The mandrel 265 defines axial slots 268 that provide access to a hollow interior of the mandrel 265. Access openings 269 provide axial access to the elongated slots 268. Excess length of optical fibers 206 can be wrapped around the mandrel 265. For example, the optical fibers 206 enter the hollow mandrel 265 through the anchor end 212. The optical fibers 206 can be slid through an access opening 269 into one of the axial slots 268 to route the optical fibers 106 to an exterior of the mandrel 265. The fibers 206 are wrapped around the mandrel 265 and routed towards the optical ferrules 125 at the front housing 217.

The coupling sleeve 230 couples to the front housing 217. For example, the coupling sleeve 230 can include a front fitting 231 that is sized to extend into an interior of the front housing 217 from a rear of the front housing 217. The coupling sleeve 230 also may couple to the rear housing 219. For example, the coupling sleeve 230 may include a rear fitting 239 that fits over the anchor end 212 of the rear housing 219. In various examples, the anchor end 212 can be glued, latched, welded, or otherwise connected to the rear fitting 239. In certain examples, the mandrel 265 extends into an interior of the coupling sleeve 230. The coupling sleeve 230 carries a gasket 235 and includes an outwardly extending flange 234. In certain examples, a strain-relief boot is coupled to the coupling sleeve 230 or rear housing 219.

A twist-to-lock fastener 240 is disposed over the coupling sleeve 230 to releasably secure the optical fiber connector 200 to a component (e.g., an optical adapter). In examples, the twist-to-lock fastener 240 included a threadable nut having an external threaded section 242 and a gripping section 245. When the connector 200 is plugged into a port of a component, the threaded section 242 of the twist-to-lock fastener 240 is engaged with an internal thread of the component. Threading the twist-to-lock fastener 240 to the component moves the twist-to-lock fastener 240 axially against the outwardly extending flange 234 of the coupling sleeve 230, thereby securing the connector 200 to the component.

In accordance with some aspects, during assembly of the connector 200, the cable jacket is removed from a front portion of the cable 205. Strength members 207 of the cable 205 are placed in portions of the cavities 216 at the rear housing 219. A fiber ribbon is threaded through the fiber passage 215 defined in the rear housing 219 and into the mandrel 265. The optical fibers 206 of the ribbon are separated and terminated at the optical ferrules 125 of the connector housings 121. The connector housings 121 are disposed at the openings 214 defined in the front housing 217. Excess length of optical fibers 206 is wrapped around the mandrel 265 (e.g., using access openings 269 and axial slots 268). The front housing 217 and the rear housing 219 mount to the coupling sleeve 230.

FIGS. 12-16 illustrate another example optical fiber connector 300 including a connector housing arrangement 310, optical ferrules 125 disposed within optical connectors 120, and a fiber take-up arrangement 360 disposed within the connector housing arrangement 310. In some implementations, the optical fiber connector 300 is a female connector. For example, in certain implementations, the optical fiber connector 300 includes an adapter arrangement 370 having one or more first ports 381 and one or more second ports 382. The optical connectors 120 can be loaded (e.g., manually) at the first ports 381 of the adapter arrangement 370 as will be described in more detail herein. The second ports 382 face outwardly (e.g., forwardly) of the optical fiber connector 300.

The connector housing arrangement 310 defines a transition region 313. Optical fibers 306 of the multi-fiber cable 305 enter the connector housing arrangement 310 at the anchor end 312 and are routed through the transition region 313 of the connector housing arrangement 310 to the optical ferrules 125. In some implementations, the connector housing arrangement 310 includes an inner housing 314 and a coupling sleeve 330. A strain-relief boot may couple to the inner housing 314. A coupling nut 340 is disposed around and selectively engages the coupling sleeve 330.

The inner housing 314 defines the anchor end 312 and the take-up arrangement 360. The inner housing 314 also includes an outwardly extending flange 317. In an example, the outwardly extending flange extends radially outwardly from the anchor end 312. In certain examples, the inner housing 314 defines the connection end 311. In other examples, however, the adapter arrangement 370 can define the connection end 311.

In certain implementations, the inner housing 314 includes the anchor end 312, which defines a fiber passage 315 at which the optical fibers 306 may enter the connector housing arrangement 310. In examples, the fiber passage 315 is sized to receive multiple optical fibers 306. In an example, the fiber passage 315 is configured to receive one or more ribbons of optical fibers 306. In another example, the fiber passage 315 is configured to receive loose optical fibers 306. The fiber passage 315 provides access to the transition region 313 at which individual optical fibers 306 separate out to be terminated at the optical ferrules 125.

In certain implementations, the anchor end 312 also includes strength member cavities 316 at which the strength members 307 of the multi-fiber cable 305 are received. In examples, epoxy can be applied to the strength members 307 at the strength member cavities 316 to retain the strength members 307 at the connector housing arrangement 310. In other examples, the strength members 307 can be otherwise held at the cavities 316. In examples, the strength member cavities 316 do not connect to the transition region 313.

In some implementations, the anchor end 312 defines an axial cavity 318 at the rear of the inner housing 314. Access to the fiber passage 315 and strength member cavities 316 are provided at a recessed surface 319 within the axial cavity 318. The jacket of the cable 305 can extend into the axial cavity 318 to the recessed surface 319.

In certain implementations, the inner housing 314 also includes the fiber take-up arrangement 360. In some implementations, the fiber take-up arrangement 360 includes a mandrel 365 extending forwardly of the anchor section 312. The mandrel 365 defines axial slots 368 that provide access to a hollow interior of the mandrel 365. Access openings 369 provide axial access to the elongated slots 368. Excess length of optical fibers 306 can be wrapped around the mandrel 365. For example, the optical fibers 306 enter the hollow mandrel 365 through the anchor end 112. The optical fibers 306 can be slid through an access opening 369 into one of the axial slots 368 to route the optical fibers 306 to an exterior of the mandrel 365. The fibers 306 are wrapped around the mandrel 365 and routed towards the optical ferrules 125.

In some implementations, the adapter arrangement 370 includes a retention wall 371 that defines one or more openings 372 at which the optical ferrules 125 are accessible. For example, optical multi-fiber connectors (e.g., MPO connectors) 120 may be disposed at the openings 372. In the example shown, the opening 372 receives multiple optical adapter housings (e.g., MPO adapters) 380 that each define a respective first and second port 381, 382. The first port 381 of each optical adapter housing 380 receives one of the optical multi-fiber connectors 120. In examples, the connector housing 121 of each multi-fiber connector 120 provides spring-biasing for the ferrules 125. In examples, the grip sleeves 127 of the multi-fiber connectors 120 enable a user to manually release the connector 120 from the first port 381 of the respective adapter 380.

In certain examples, the adapters 380 (and hence the multi-fiber connectors 120) are disposed in a plus sign pattern. In other examples, the adapters 380 and connectors 120 can be disposed in any desired pattern. In some implementations, an optical adapter housing 380 can define multiple first ports 381 for receiving multiple multi-fiber connectors 120. In other implementations, the retention wall 371 defines multiple openings 372 that each receive a separate optical adapter housing 380.

In certain implementations, a rearward extension 373 extends outwardly from the retention wall 371 towards the cable 305. A forward extension 375 also extends outwardly from the retention wall 371 away from the cable 305. The forward extension 375 is configured to secure to a component (e.g., a male connector). For example, the forward extension 375 may include a connection element (e.g., threads) 376. In an example, the forward extension 375 has a threaded inner surface.

The coupling sleeve 330 couples to the adapter arrangement 370. In certain examples, the coupling sleeve 330 couples to the inner housing 314. The coupling sleeve 330 includes a body 337 from which one or more arms 332 extend forwardly towards the adapter arrangement 370. The body 337 is sized to fit around the mandrel 365. In an example, the body 337 defines an axial abutment end 339 that abuts the outwardly extending flange 317 of the inner housing 314. The coupling sleeve 330 includes an outwardly extending flange 334 at an opposite end of the body 337 from the axial abutment end 339. The arms 332 extend forwardly from the outwardly extending flange 334.

In some implementations, the forwardly extending arms 332 abut the retention wall 371 of the adapter arrangement 370. In certain examples, the forwardly extending arms 332 inhibit forward movement of the coupling sleeve 330, which inhibits forwardly movement of the inner housing 314. In certain examples, the forwardly extending arms 332 provide stability while the optical multi-fiber connectors 120 are inserted into the first ports 381 of the adapter arrangement 370. In certain implementations, the body 337 and the arms 332 define open sides 338 through which a user can access the connectors 120 at the adapter arrangement 370. For example, the open sides 338 can extend forwardly of the body 337 and between the arms 332.

A twist-to-lock fastener 340 is disposed over the coupling sleeve 330 to releasably secure the coupling sleeve 330 to the adapter arrangement 370. In certain implementations, the twist-to-lock fastener 340 covers the open sides 338 when secured to the adapter arrangement 370, thereby inhibit access to the multi-fiber connectors 120. In certain implementations, the twist-to-lock fastener 340 carries a gasket (e.g., an internal O-ring, an external O-ring, an axial seal, etc.) that abuts against the outwardly extending flange 317. In some implementations, the twist-to-lock fastener 340 carries a gasket (e.g., an internal O-ring, an external O-ring, etc.) that mates with the rearward extension 373 of the adapter arrangement 370. In other implementations, the gasket is carried by the rearward extension 373 and seals to the twist-to-lock fastener 340 when the twist-to-lock fastener 340 is secured to the adapter arrangement 370.

In some implementations, the twist-to-lock fastener 340 included a threadable nut having a threaded section 342 and a gripping section 345. In the example shown, the threaded section 342 is an internal threaded section and the gripping section 345 is an external gripping section. The threaded section 342 of the twist-to-lock fastener 340 engages a connection element 374 (e.g., an external thread) of the rearward extension 373. In other implementations, the twist-to-lock fastener 340 can have a bayonet connection. Threading or otherwise twisting the twist-to-lock fastener 340 relative to the adapter arrangement 370 moves the twist-to-lock fastener 340 axially against the outwardly extending flange 334 of the coupling sleeve 330, thereby securing the coupling sleeve 330 to the adapter arrangement 370.

In accordance with some aspects, during assembly of the connector 300, a jacketed portion of the cable 305 is inserted into the axial cavity 318. Strength members of the cable 305 are placed in the cavities 316; a fiber ribbon is threaded through the fiber passage 315 and into the mandrel 365. The optical fibers 306 of the ribbon are separated and terminated at the optical ferrules 125 of the multi-fiber connectors 120. The multi-fiber connectors 120 are plugged into the first ports 381 of the optical adapter housings 380 at the adapter arrangement 370. Excess length of optical fibers 306 is wrapped around the mandrel 365 (e.g., using access openings 369 and axial slots 368).

FIGS. 17-30 illustrate yet another example optical fiber connector 400 including a connector housing arrangement 410, optical ferrules 425 carried by the connector housing arrangement 410, and a fiber take-up arrangement 460 disposed within the connector housing arrangement 410. The connector housing arrangement 410 defines a transition region 413. Optical fibers 406 of the multi-fiber cable 405 enter the connector housing arrangement 410 at the anchor end 412 and are routed through the transition region 413 of the connector housing arrangement 410 to the optical ferrules 425.

In some implementations, the connector housing arrangement 410 includes a front housing 417 and a coupling sleeve 430. The front housing 417 defines the connection end face 411, the anchor end 412, and the take-up arrangement 460. In some implementations, the front housing 417 includes an integral housing. In other implementations, however, the front housing 417 includes a first housing section 419a and a second housing section 419b. In certain examples, the first and second housing parts 419a, 419b cooperate to retain the ferrules 425. In certain examples, the first and second housing parts 419a, 419b surround and protect the take-up arrangement 460. In an example, the first and second housing parts 419a, 419b latch together.

In some implementations, the connection end face 411 of the front housing 417 defines one or more openings at which the optical ferrules 425 are accessible. For example, one or both housing parts 419a, 419b may define open-ended slots or notches 414. In an example, both housing parts 419a, 419b define open-ended notches 414 that align with each other. In another example, the first housing 419a defines the open-ended notches 414 and the second housing 419*b* defines a wall or other surface that closes the notches 414.

In the example shown, each ferrule 425 mounts in a respective one of the openings. For example, each ferrule 425 may include a shoulder 426 (FIG. 19) that abuts a retention surface at the notch 414 (see FIG. 21). In certain examples, the ferrules 425 are laterally aligned in a row. In other examples, the ferrules 425 can be disposed in any desired pattern. Each ferrule 425 may be individually spring-biased within the respective opening. In an example, each ferrule 425 can be biased by a coil spring. In another example, each ferrule 425 can be biased by a low profile leaf spring. Alternatively, two or more of the ferrules 425 may be biased by a common spring (e.g., coil spring, leaf spring, etc.). In other implementation, however, the ferrules 425 are not spring-biased.

Figure 17:
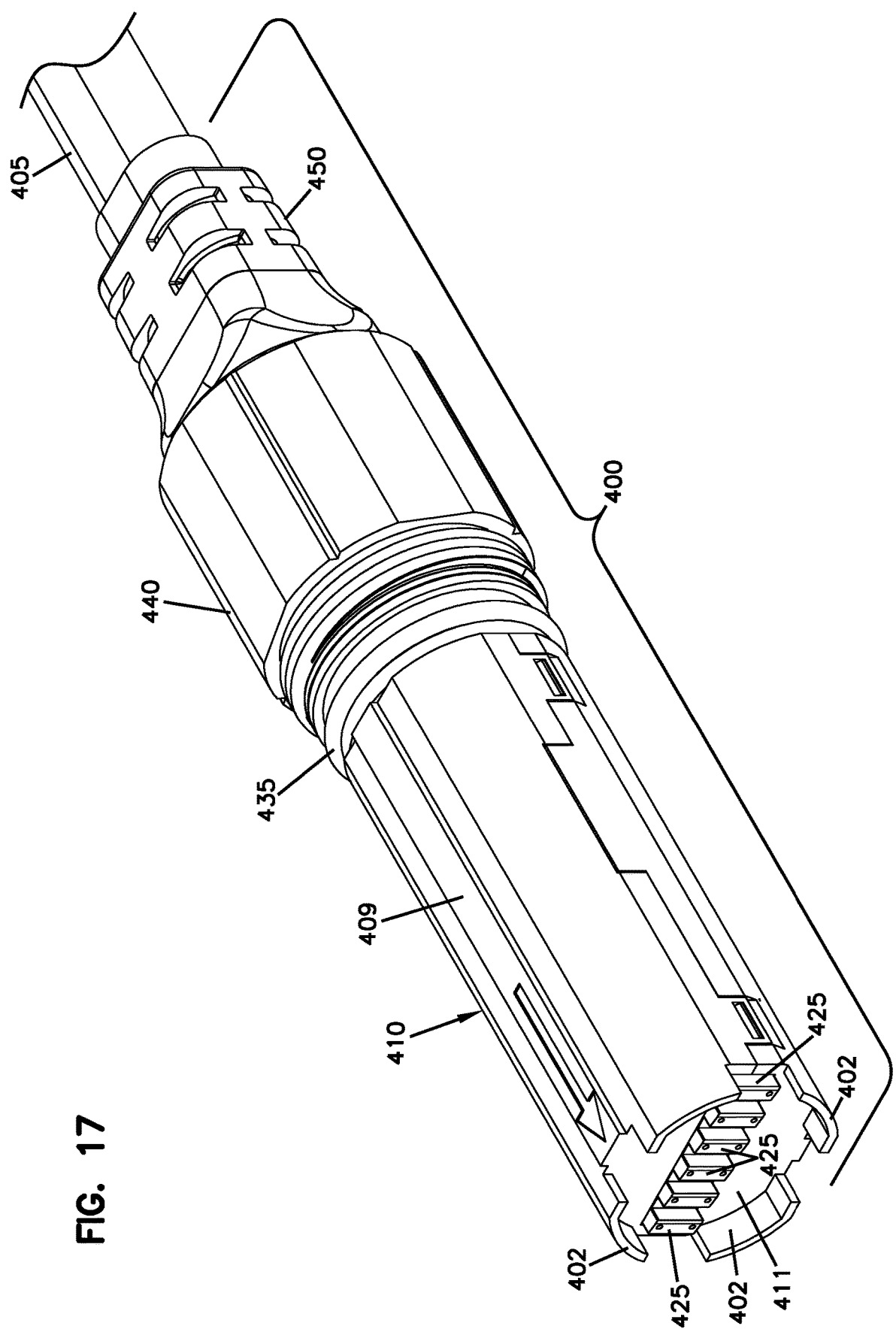
FIG. 17 is a front perspective view of another example multi-fiber cable terminated by an optical connector configured in accordance with the principles of the present disclosure.

In some implementations, portions of the ferrules 425 protrude forwardly of the connection end face 411 (see FIG. 17). In certain implementations, one or more flanges 402 extend forwardly of the connection end face 411 (see FIG. 17). In certain examples, the flanges 402 extend forwardly past the ferrules 425 (see FIGS. 21 and 22). In certain examples, the flanges 402 form an interrupted wall extending forwardly of the connection end face 411. For example, interruptions 403 in the wall may provide access to the ferrules 425 for cleaning and/or polishing.

In certain implementations, a fiber take-up arrangement 460 is disposed at the transition region 413 of the front housing 417. In some implementations, the fiber take-up arrangement 460 includes a spool or mandrel 465. In an example, the spool 465 has a circular shape. In another example, the spool 465 has an oblong shape. In some examples, the spool 465 is integral with one of the housing parts 419*a*, 419*b*. In other examples, the spool 465 attaches to an interior of one of the housing parts 419*a*, 419*b*. In certain examples, the housing parts 419*a*, 419*b* cooperate to define the spool 465. In certain examples, one or more flanges 467 may extend radially outwardly from the spool 465 to aid in retaining and/or managing the optical fibers 406. In an example, each flange 467 may have an anchor end inserted into a hole 466 in the spool 465 (see FIG. 20).

In certain implementations, the anchor end 412 of the front housing 417 defines a fiber passage 415 at which the optical fibers 406 may enter the front housing 417. The fiber passage 415 provides access to the transition region 413 at which individual optical fibers 406 separate out to be terminated at the optical ferrules 425. In examples, the fiber passage 415 is sized to receive multiple optical fibers 406. In an example, the fiber passage 415 is configured to receive one or more ribbons of optical fibers 406. In another example, the fiber passage 415 is configured to receive loose optical fibers 406. In some examples, the first and second housing parts 419*a*, 419*b* cooperate to define the fiber passage 415. In other examples, the first housing part 419*a* defines the anchor end 412 and fiber passage 415.

In certain implementations, the anchor end 412 also includes strength member cavities 416 at which the strength members 407 of the multi-fiber cable 405 are received. In some examples, the first and second housing parts 419*a*, 419*b* cooperate to define the cavities 416. In other examples, however, the first housing part 419*a* includes the anchor end 412 that defines the cavities 416. In examples, epoxy can be applied to the strength members 407 at the strength member cavities 416 to retain the strength members 407 at the connector housing arrangement 410. In other examples, the strength members 407 can be otherwise held at the cavities 416. In examples, the strength member cavities 416 do not connect to the transition region 413.

In accordance with some aspects, during assembly of the connector 400, the multi-fiber cable 405 is threaded through the coupling sleeve 430 to the front housing 417. The jacket is removed from a front portion of the cable 405. Strength members 407 of the cable 405 are placed in portions of the cavities 416 defined in the anchor end 412. A fiber ribbon is disposed along a portion of the fiber passage 415 defined in the first housing part 419*a*. The optical fibers 406 of the ribbon are separated and terminated at the optical ferrules 425. The optical ferrules 425 are mounted at the notches 414 defined in the first housing part 419*a*. Excess length of optical fibers 406 is wrapped around the spool 465 (see FIG. 21). The second housing part 419*b* of the front housing 417 is disposed over the first housing part 419*a* to form the front housing 417.

In certain implementations, the front housing 417 includes a reduced section 418 at the anchor end 412. The reduced section 418 tapers or steps radially inwardly from an outer periphery of the front housing 417. In some examples, the first and second housing parts 419*a*, 419*b* cooperate to define the reduced section 418. In other examples, the first housing part 419*a* defines the reduced section 418. In some implementations, the reduced section 418 of the front housing 417 defines the strength member cavities 416. In certain implementations, the reduced section 418 of the front housing 417 defines the fiber passage 415.

The coupling sleeve 430 couples to the front housing 417. In certain implementations, the coupling sleeve 430 mounts over the reduced section 418 of the front housing 417 (see FIGS. 21 and 22). In an example, the coupling sleeve 430 is rotationally keyed to the reduced section 418 (e.g., by respective flats 418*a*, 436 shown in FIG. 18). In some implementations, the coupling sleeve 430 carries a gasket (e.g., an O-ring) 435 and includes an outwardly extending flange 434. In the example shown, the gasket 435 is disposed between the flange 434 and the connection end face 411. In other implementations, the gasket 435 can be mounted within the coupling sleeve 430 or over the front housing 417.

Figure 21:
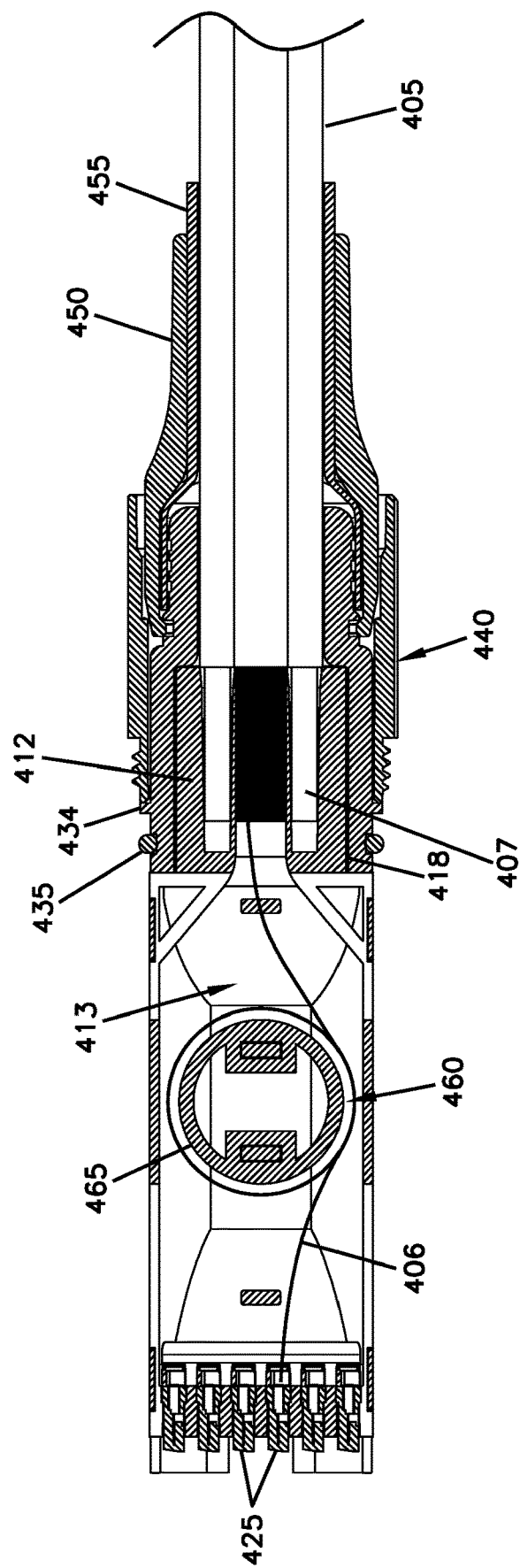
FIG. 21 is a plan view of a longitudinal cross-section of the assembled optical connector of FIG. 17.
Figure 22:
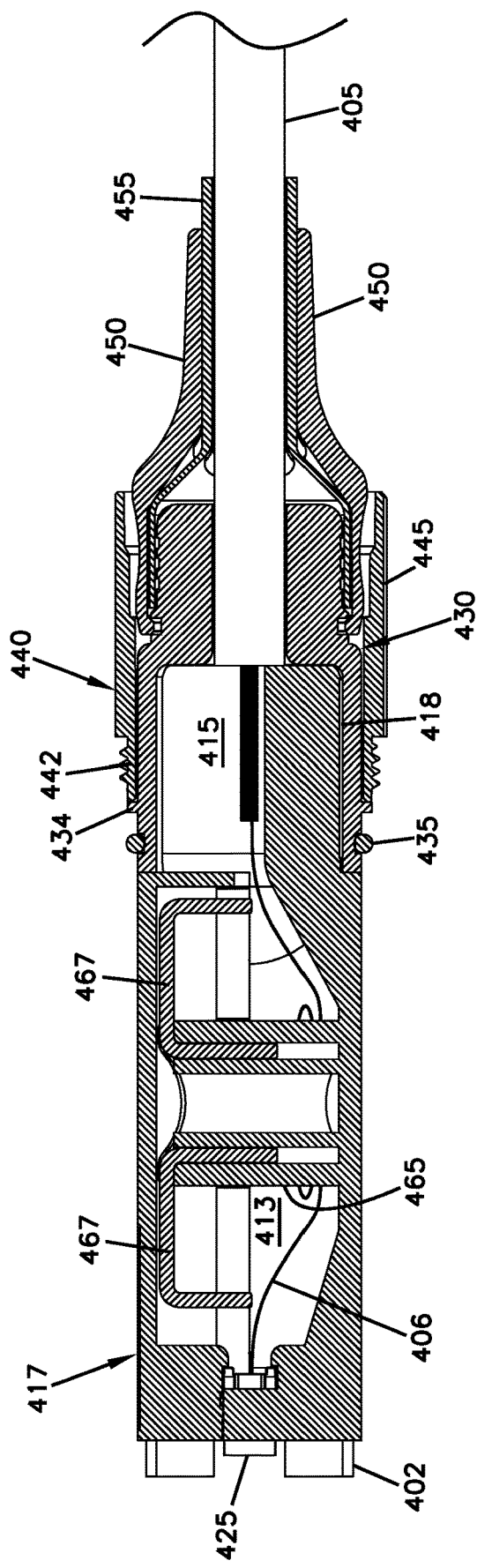
FIG. 22 is a side elevational view of another longitudinal cross-section of the assembled optical connector of FIG. 17.

The strain-relief boot 450 is coupled to the coupling sleeve 430 (e.g., over the heat recoverable sleeve 455) and extends over a portion of the multi-fiber cable 405 (see FIG. 21). In certain examples, the coupling sleeve 430 includes a reduced section 437 over which a portion of the strain-relief boot 450 extends. In certain examples, the reduced section 437 of the coupling sleeve 430 includes a textured surface (e.g., ribs, threads, bumps, etc.) that facilitates attaching the heat recoverable sleeve 435. In certain examples, the reduced section 437 defines a groove or slots into which a ledge or teeth of the strain-relief boot 450 extend to hold the strain-relief boot 450 to the coupling sleeve 430.

Figure 18:
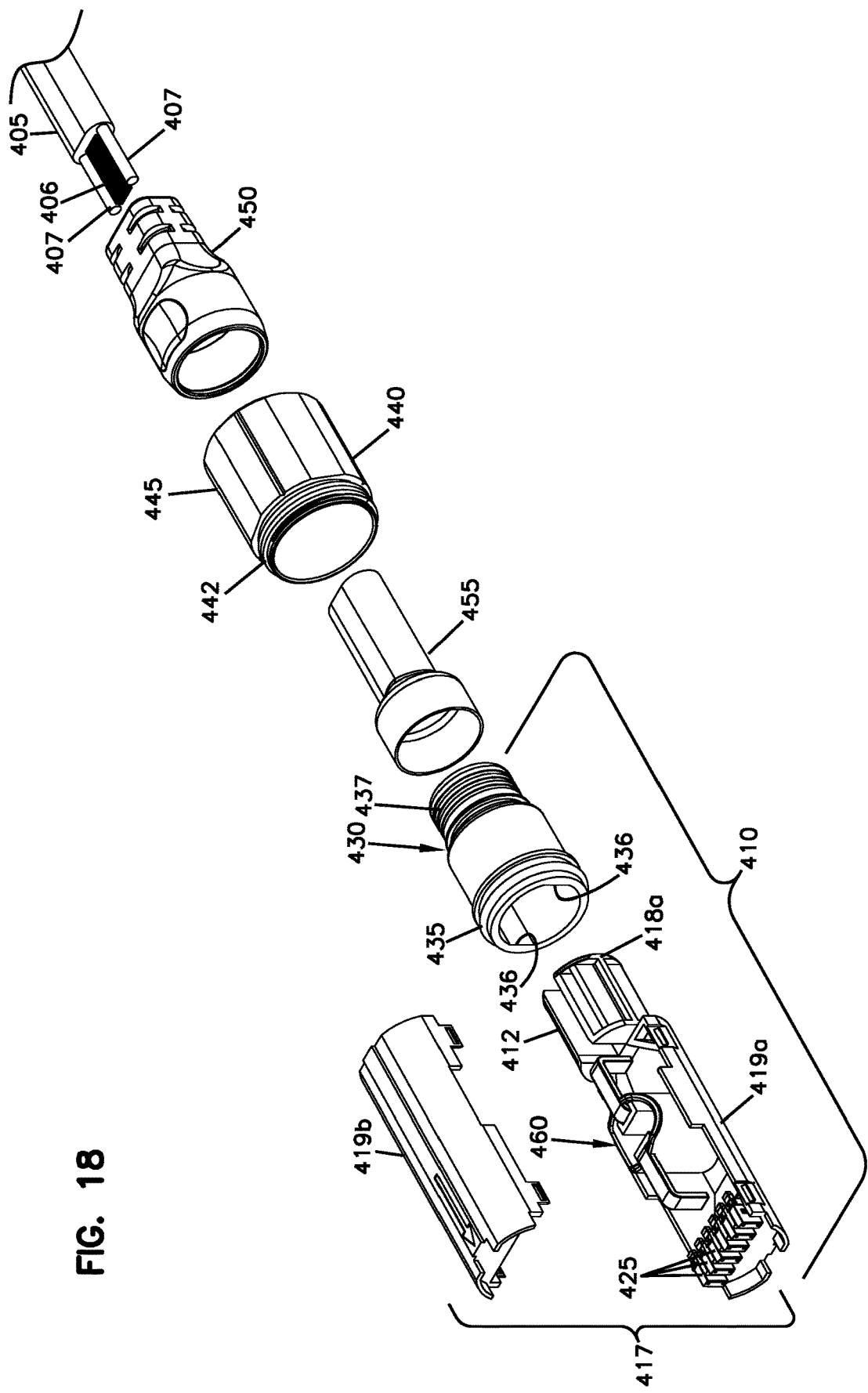
FIG. 18 is a front perspective view of the cable and components of the optical connector of FIG. 17 axially exploded from each other.
Figure 18A:
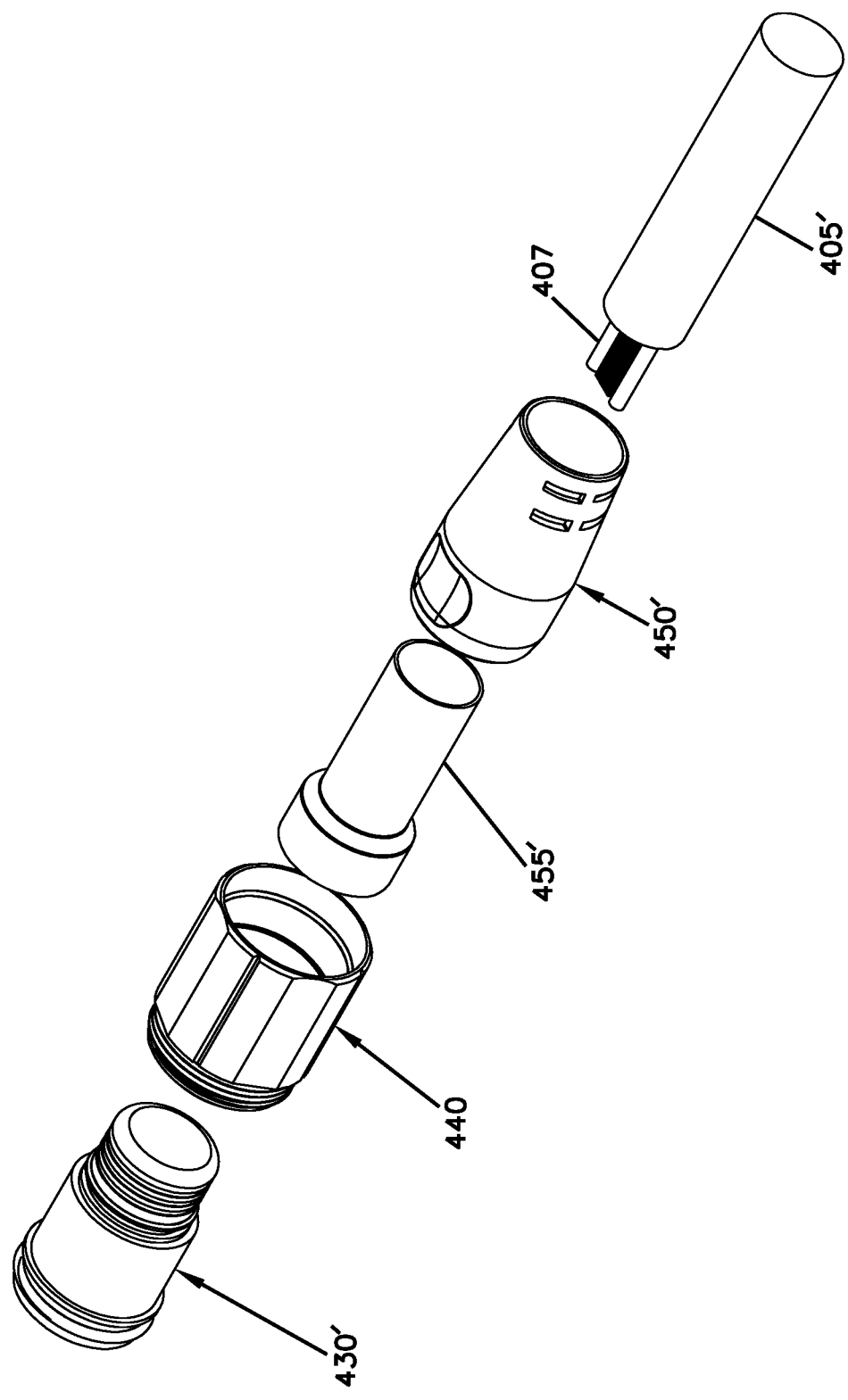
FIG. 18A is a rear perspective view of an alternative cable and corresponding components suitable for use with the optical connector of FIG. 17.
Figure 19:
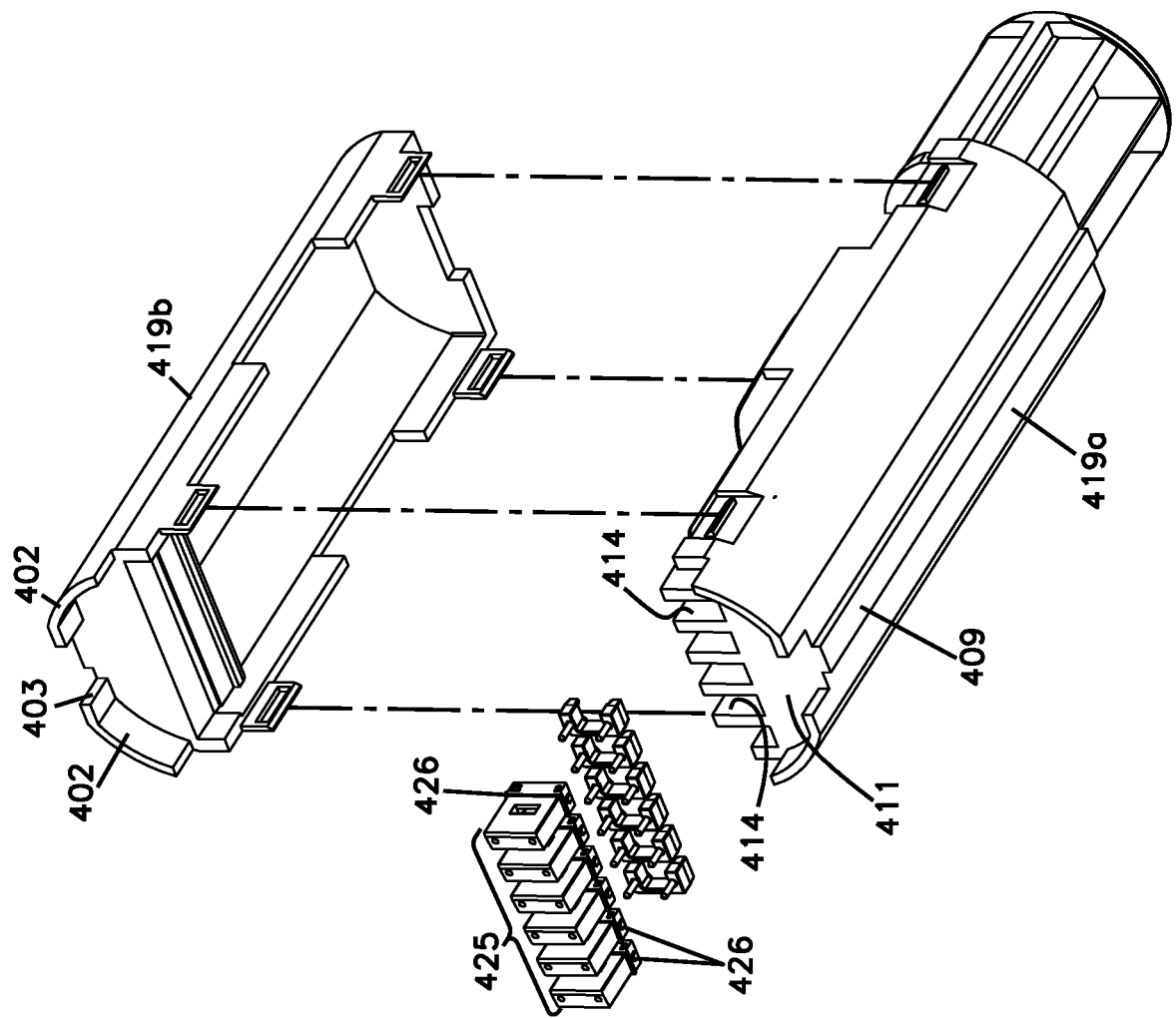
FIGS. 19 and 20 are perspective view of some of the components of the optical connector of FIG. 17 exploded from other components.
Figure 20:
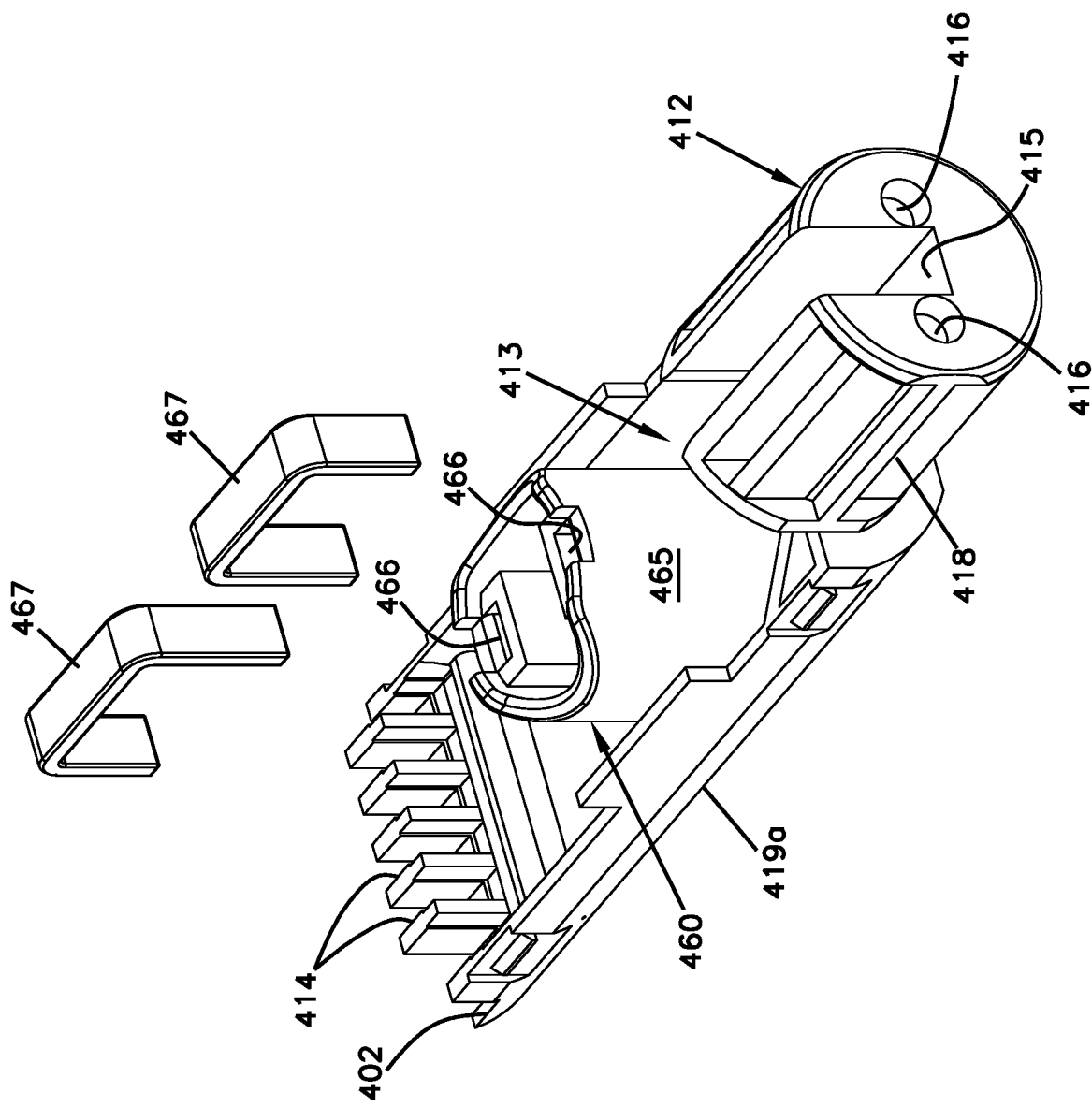

In certain implementations, the coupling sleeve 430, the heat recoverable sleeve 455, and/or the strain-relief boot 450 are shaped to match an outer periphery of the cable 405. For example, in some implementations, the cable 405 is a flat cable. In such cases, the coupling sleeve 430, the heat recoverable sleeve 455, and/or the strain-relief boot 450 have a flattened profile corresponding to the cable 405 (see FIG. 18). In other implementations, the cable 405 is a round cable. In such cases, the coupling sleeve 430, the heat recoverable sleeve 455, and/or the strain-relief boot 450 have a rounded profile corresponding to the cable 405 (see FIG. 18A).

A twist-to-lock fastener 440 is disposed over the coupling sleeve 430 to releasably secure the optical fiber connector 400 to a component (e.g., an optical adapter). In examples, the gasket 435 can be disposed on or in the twist-to-lock fastener 440 instead of or in addition to connector housing arrangement 410. In examples, the twist-to-lock fastener 440 included a threadable nut having an external threaded section 442 and a gripping section 445. When the connector 400 is plugged into a port of a component, the threaded section 442 of the twist-to-lock fastener 440 is engaged with an internal thread of the component. In other examples, the twist-to-lock fastener 440 can include a bayonet connection. Rotating the twist-to-lock fastener 440 relative to the component moves the twist-to-lock fastener 440 axially against the outwardly extending flange 434 of the coupling sleeve 430, thereby securing the connector 400 to the component.

Figure 23:
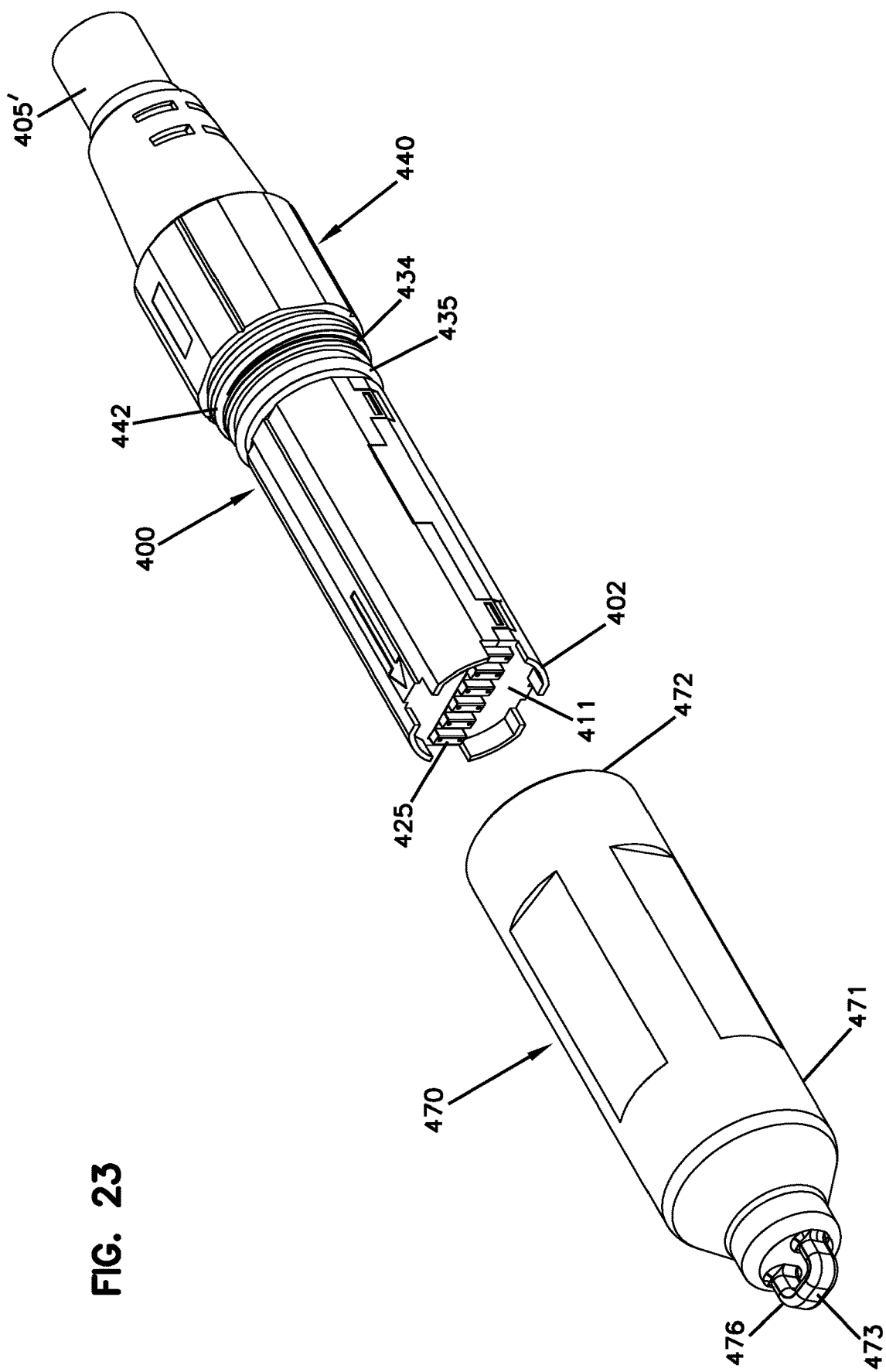
FIG. 23 is a perspective view of the optical connector of FIG. 17 aligned with an example connector dust cap.
Figure 24:
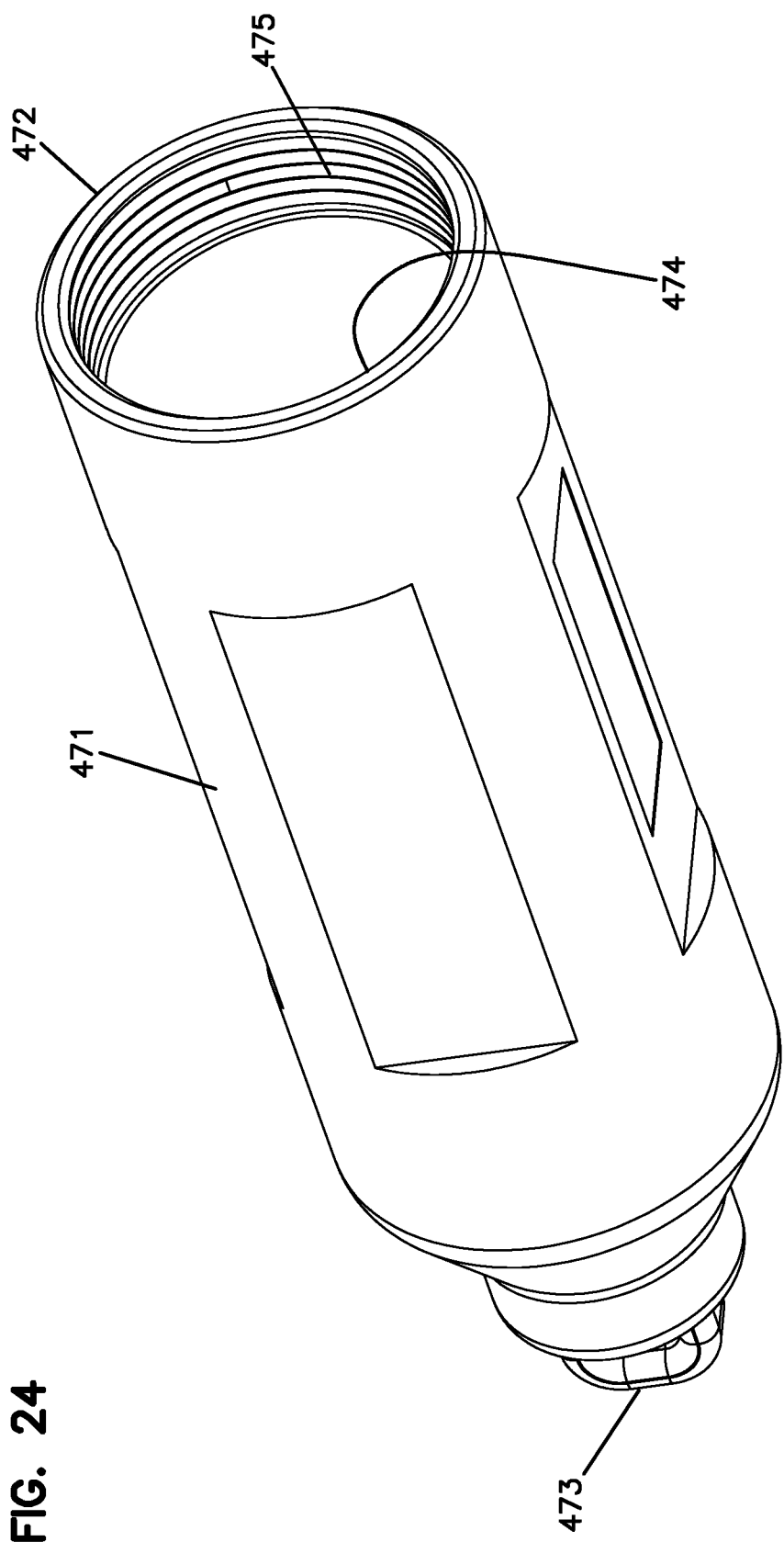
FIG. 24 is a perspective view of the connector dust cap of FIG. 23.
Figure 25:
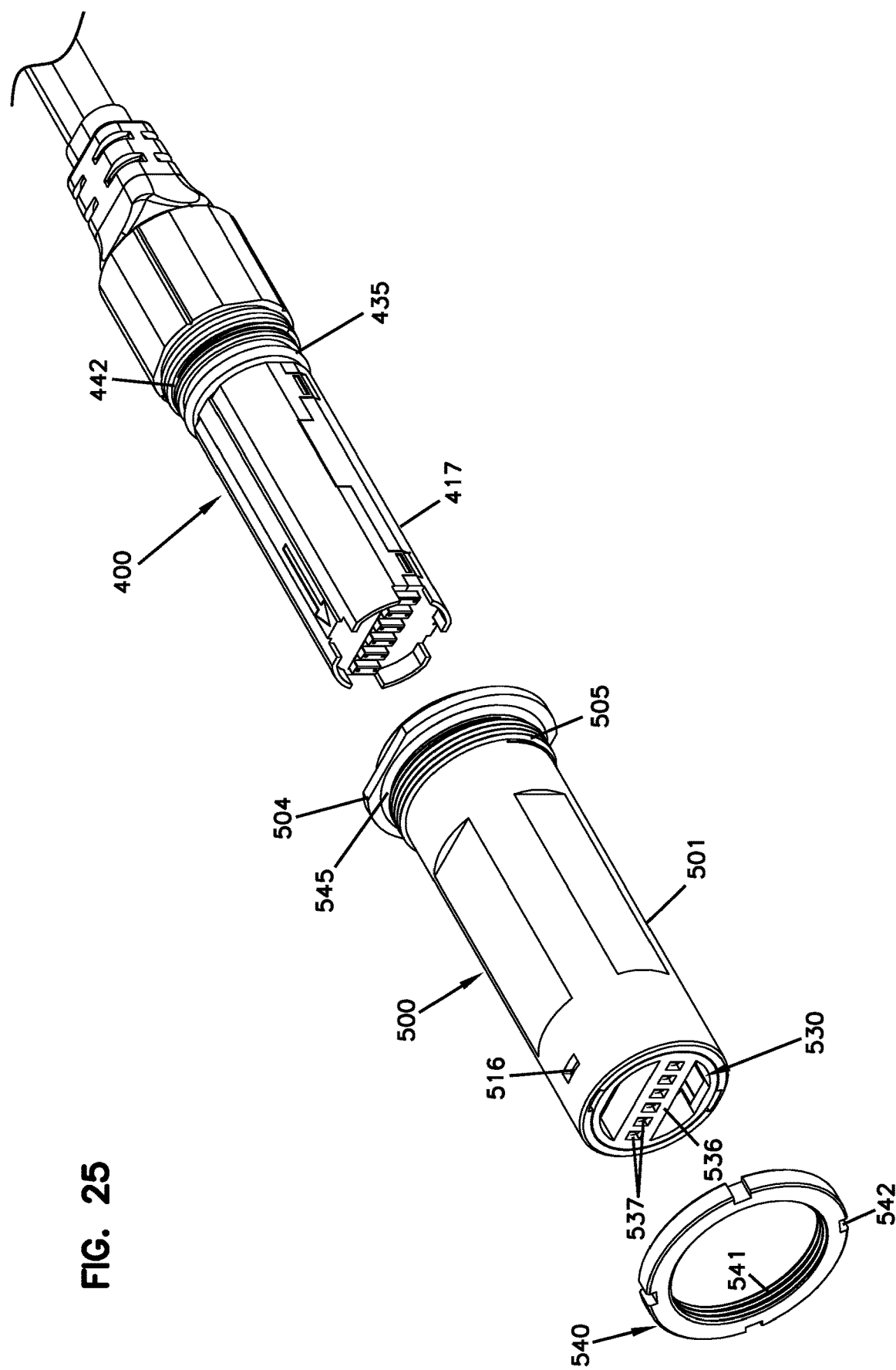
FIG. 25 is a perspective view of the optical connector of FIG. 17 aligned with an example adapter.

FIGS. 23-30 illustrate example components to which the connector 400 can be secured. FIGS. 23-24 illustrate an example dust cap 470 that secures to the connector 400 to cover the connection end face 411. The dust cap 470 has a body 471 extending from an open end 472 to a closed end 473. The dust cap body 471 defines a hollow interior 474 accessible through the open end 472. The dust cap body 471 defines a fastening region that is configured to engage with the twist-to-lock fastener 440. For example, the dust cap body 471 may define internal threading 475 at the first end 472.

In use, the front housing 417 of the connector 400 is inserted into the interior 474 of the dust cap 470. The ferrules 425 are protected by the closed end 473 and the body 471. In certain examples, the gasket 435 of the connector 400 presses against the interior surface of the dust cap body 471 to environmentally seal the ferrules 425 within the dust cap 470. In certain examples, the closed end 473 includes a pulling eye 476 that enables the cable 405 to be pulled through a conduit or other passage.

FIGS. 25-30 illustrate an example optical adapter 500 defining a port at which the optical connector 400 can be received. In some implementations, the optical adapter 500 includes a body 501 that extends from a first end 502 to a second end 503. The first end 501 defines the port sized to receive the optical connector 400. In some implementations, the second end 502 of the body 501 is configured to support optical ferrules 525 that mate with the optical ferrules 425 of the connector 400. In other implementations, the second end 502 of the body 501 defines a second port that can receive an optical connector.

The adapter body 501 includes a flange 504 that extends radially outwardly from the body 501. The adapter body 501 defines external threads 505 adjacent the flange 504. The adapter 500 includes a retaining ring 540 that is configured to move axially along the adapter body 501. For example, in one implementation, the retaining ring 540 has an internal thread 541 that engages the external threads 505 of the adapter body 501. In certain examples, the retaining ring 540 defines external notches 542 that facilitate rotating the retaining ring 540.

The retaining ring 540 cooperates with the flange 504 to secure a wall, panel, or other surface therebetween to mount the adapter 500 to the wall, panel, or other surface. In some implementations, the flange 504 is disposed at the first end 502 of the body 501. In other implementations, flange 504 is disposed closer to the second end 503 of the body 501. In still other implementations, the flange 504 is disposed at any intermediate position between the first and second ends 502, 503.

Figure 26:
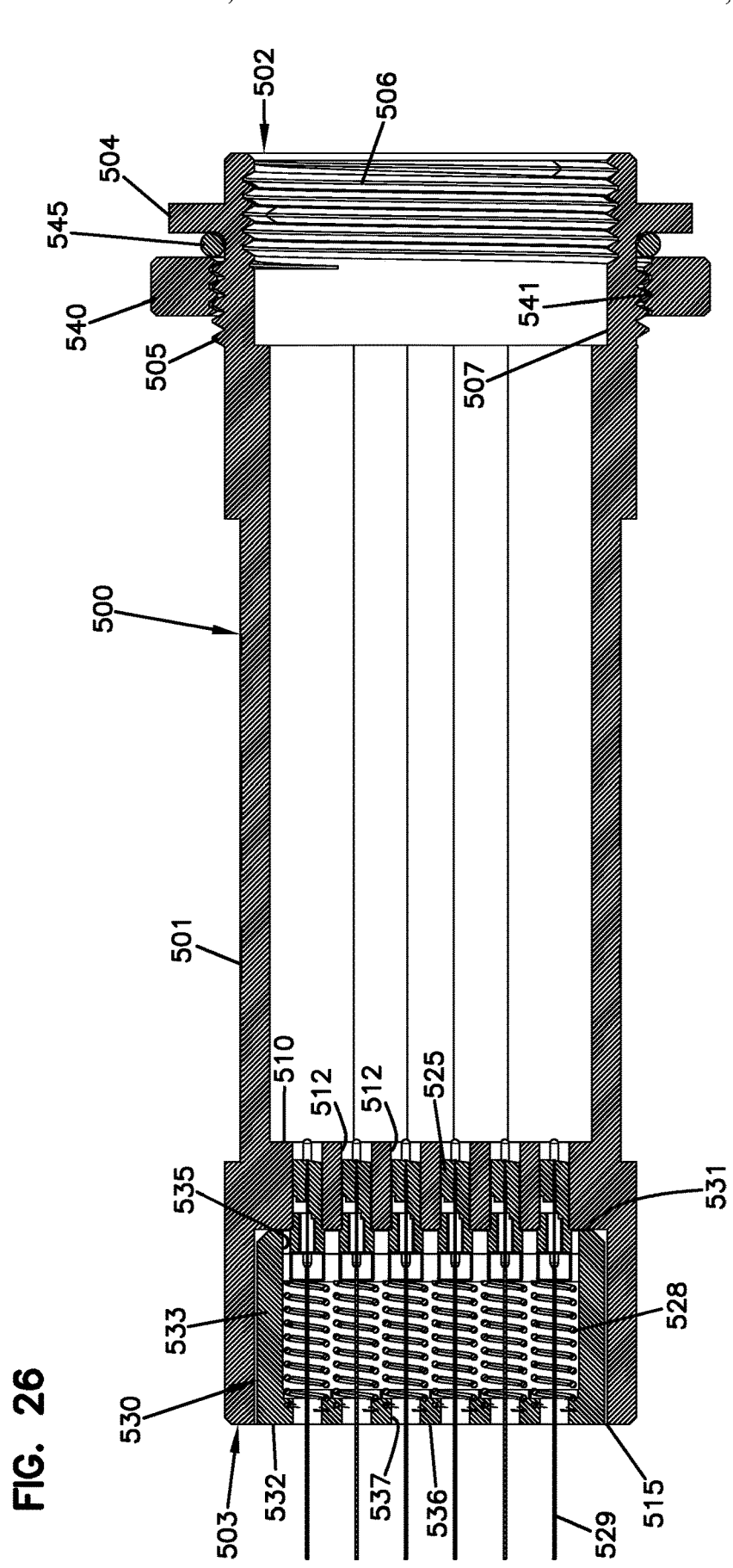
FIG. 26 is a top plan view of a longitudinal cross-section of the adapter of FIG. 25.

As shown in FIG. 26, the adapter body 501 includes internal fastening features 506 at the first end 502. The internal fastening features 506 are configured to engage with the twist-to-lock fastener 440 of the connector 400 to hold the connector 400 at the adapter 500. In some implementations, the internal fastening features 506 include internal threading (see FIG. 26). In other implementations, the internal fastening features 506 include part of a bayonet connection. The adapter body 501 also includes a sealing surface 507 against which the gasket 435 of the connector 400 presses when the connector 400 is disposed within the adapter 500. Accordingly, the front housing 417 of the connector 400 can be environmentally sealed within the adapter 500.

Figure 27:
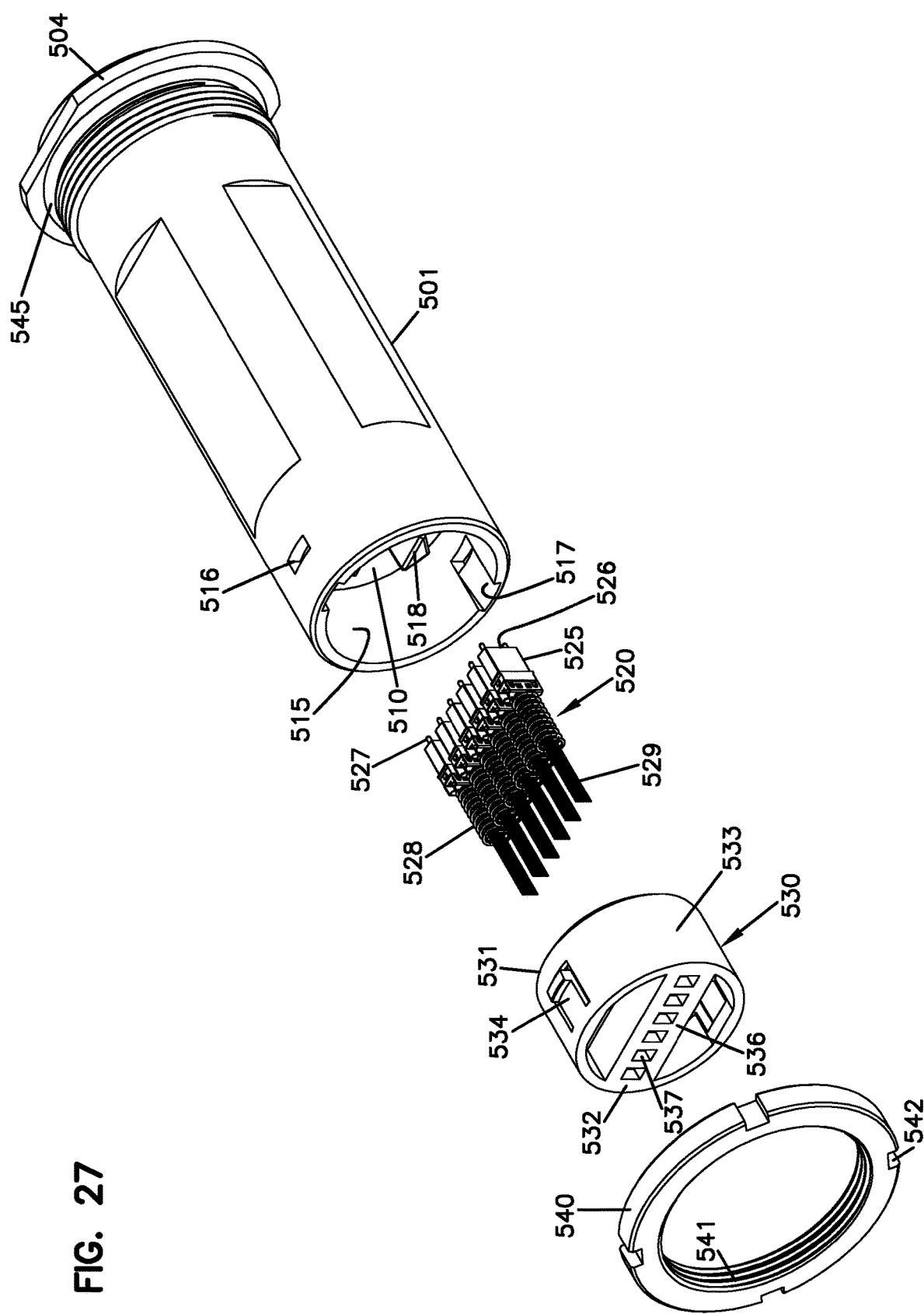
FIG. 27 is a rear perspective view of the adapter of FIG. 25 with a ferrule plug and ferrule arrangement exploded rearwardly from a remainder of the adapter.
Figure 28:
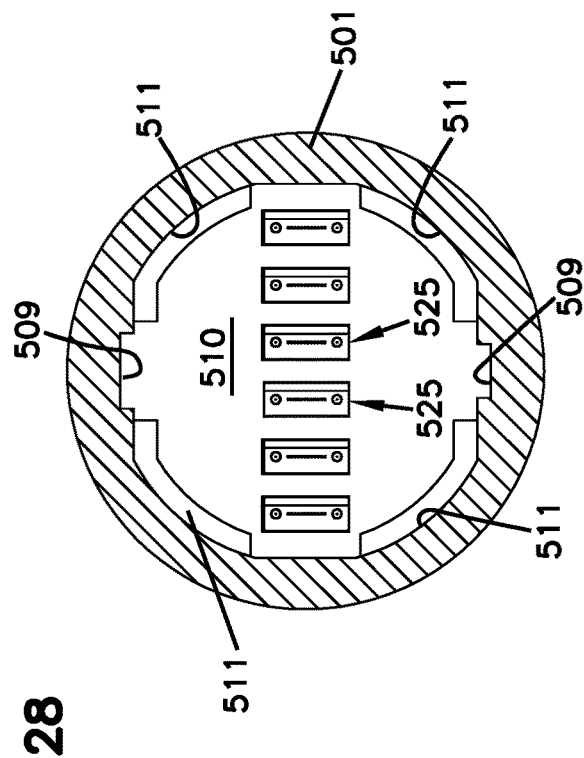
FIG. 28 is a transverse cross-sectional view of the adapter of FIG. 25 where connection end faces of the ferrule arrangement are visible.
Figure 30:
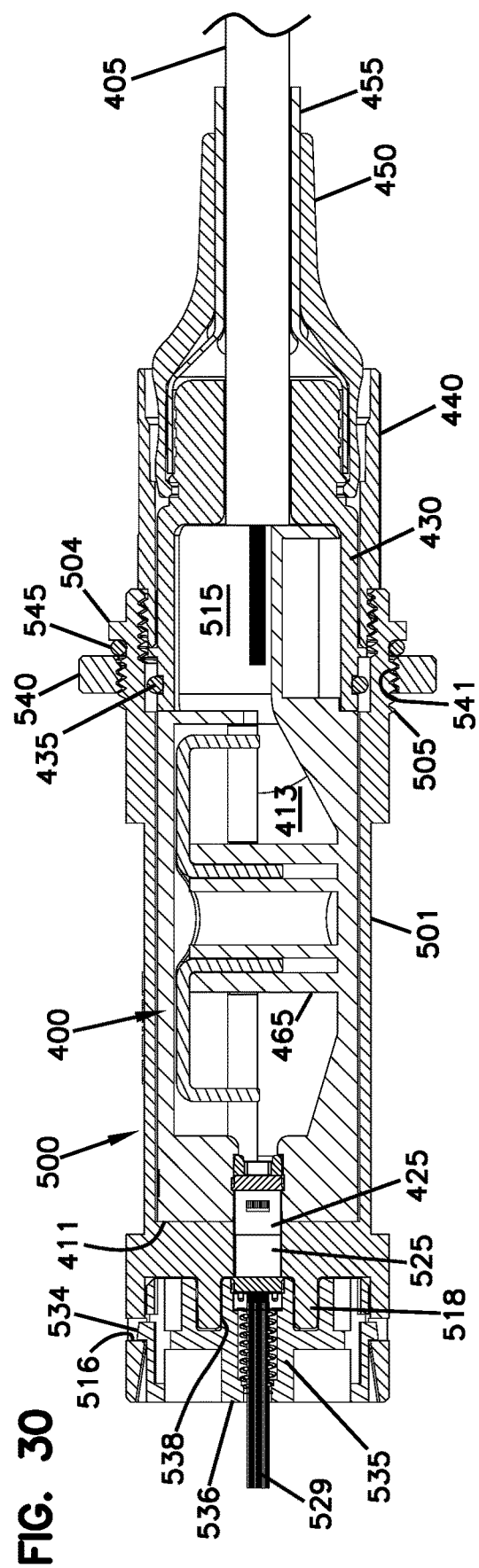
FIG. 30 is a side elevational view of a longitudinal cross-section of the optical connector and adapter of FIG. 25 assembled together.

As shown in FIGS. 26-28, the adapter body 501 includes an internal wall 510 at which adapter ferrules 525 can be disposed. The internal wall 510 defines openings 512 through which the adapter ferrules 525 extend with end faces 526 of the ferrules 525 facing towards the first end 502 of the adapter body 501. When the connector 400 is disposed at the adapter 500, the connection end face 411 of the connector 400 abuts or is disposed adjacent to the internal wall 510. The optical ferrules 425 of the connector 400 align with the optical ferrules 525 of the adapter 500. When the twist-to-lock fastener 440 of the connector 400 is engaged with the internal fastening feature 506 of the adapter, the optical ferrules 425, 525 optically couple together (e.g., see FIG. 30).

A first interior region of the adapter body 501 extending from the internal wall 510 to the first end 502 of the adapter body 501 is configured to receive the connector 400. For example, in certain implementations, the internal wall 510 defines depressions 511 sized and shaped to accommodate the forwardly extending flanges 402 of the connector 400. The depressions 511 enable the connection end face 411 of the connector 400 to approach and/or abut the internal wall 510 of the adapter 500.

In certain implementations, an inner surface of the first interior region of the adapter body 501 defines one or more axially extending keyways 509. The keyways 509 are sized and shaped to accommodate axially extending keys 409 (FIGS. 17 and 19) on the connector 400. The keys 409 and keyways 509 rotationally orient the connector 400 relative to the adapter 500 when the connector 400 is inserted at the adapter port. The keys 409 and keyways 509 also maintain the rotational orientation of the connector 400 relative to the adapter 500 as the connector 400 continues to be inserted into the adapter 500 and the ferrules 425, 525 align.

A second interior region of the adapter body 501 extending from the internal wall 510 to the second end 503 of the adapter body 501 is configured to receive an adapter ferrule arrangement 520. The adapter ferrule arrangement 520 includes one or more adapter ferrules (e.g., multi-fiber ferrules) 525 and optical fibers 529 extending outwardly from the adapter ferrules 525. The adapter ferrule arrangement 520 also can include one or more ferrule springs (e.g., coil springs, leaf springs, etc.) 528. In an example, each adapter ferrule 525 has a corresponding ferrule spring 528. In another example, one ferrule spring 528 can bias multiple of the adapter ferrules 525.

Figure 29:
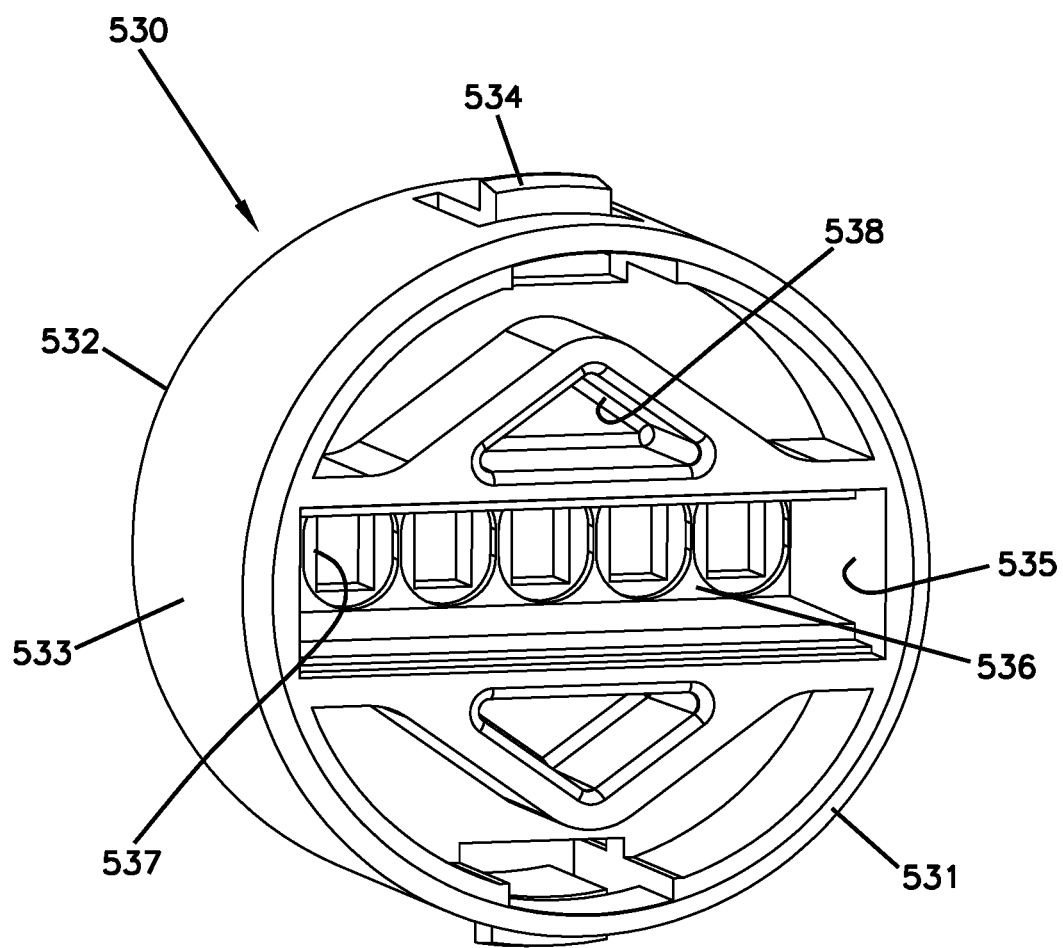
FIG. 29 is a perspective view of the ferrule plug of FIG. 27.

In some implementations, the second interior region defines a cavity 515 in which the adapter ferrule arrangement 520 is disposed (see FIG. 27). A ferrule plug 530 is inserted into the cavity 515 to retain the adapter ferrule arrangement 520 between the ferrule plug 530 and the internal wall 510 (see FIGS. 26 and 30). The ferrule plug 530 defines a cavity 535 in which the adapter ferrule arrangement 520 is at least partially disposed (see FIG. 26). The cavity 535 is open at a first end 531 of the ferrule plug 530 (FIG. 29). A second end 532 of the ferrule plug 530 includes an end surface 536 that defines openings 537 through which the fibers 529 of the adapter ferrule arrangement 520 extend (See FIG. 31). The springs 528 are disposed between the end surface 536 and the adapter ferrules 525 to bias the ferrules 525 through the internal wall openings 512.

Referring to FIGS. 27 and 29, the ferrule plug 530 includes an outer wall 533 that extends axially from a first end 531 to a second end 532. In an example, the outer wall 533 is an annular wall. The outer wall 533 includes one or more latching arms 534 that each have a latching hook that protrudes radially outwardly from the outer wall 533. The latching arms 534 flex to displace the latching hooks radially inwardly relative to the outer wall 533. The adapter body 501 defines latch openings 516 sized to receive the latching hooks on the latching arms 534. The latch openings 516 are located between the internal wall 510 and the second end 503 of the adapter body 501. Guide channels 517 can lead from the second end 503 to the latch openings 516 (see FIG. 27).

In certain implementations, the internal wall 510 and the ferrule plug 530 include alignment features that rotationally orient the ferrule plug 530 within the adapter cavity 515. Accordingly, the ferrules 525, end surface openings 537 of the ferrule plug 530, and internal wall openings 512 of the adapter body 501 will align. In some implementations, the adapter internal wall 510 includes alignment members 518 that extend towards the second end 503 of the adapter body 501. The ferrule plug 530 defines alignment holes 538 that are sized and shaped to receive the alignment members 518 of the internal wall 510 when the ferrule plug 530 is received at the adapter cavity 515. In other examples, however, the adapter internal wall 510 can define alignment holes and the ferrule plug 530 can define alignment members.

Figure 31:
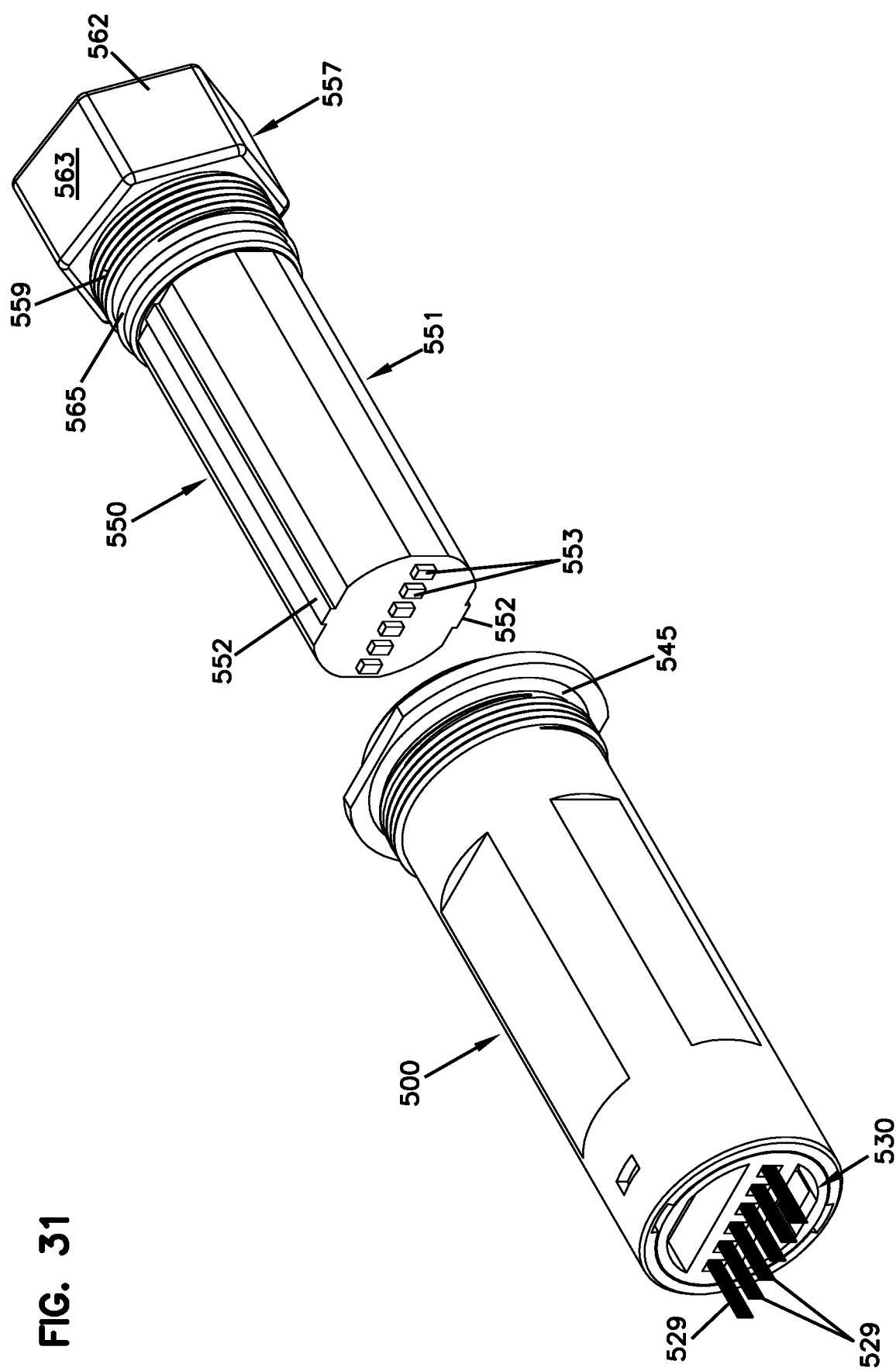
FIG. 31 is a perspective view of the adapter of FIG. 25 aligned with an adapter dust plug.
Figure 32:
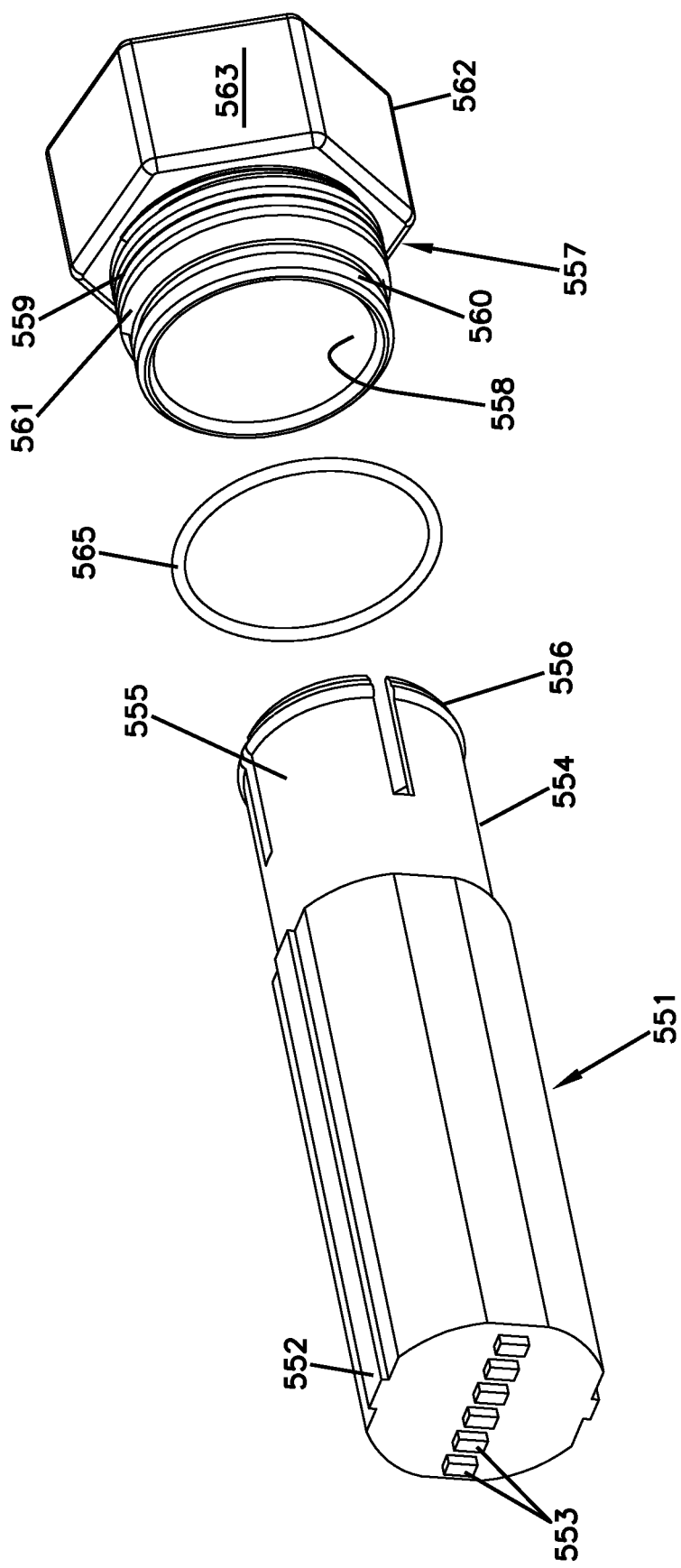
FIG. 32 is an exploded view of the adapter dust plug.

FIGS. 31 and 32 illustrate an example adapter dust plug 550 that is configured to be received in the port at the first end 502 of the adapter body 501. The adapter dust plug 550 includes a plug body 551 that fits within the first interior region of the adapter 500. One or more plug members 553 extend forwardly from a connection end face of the plug body 551. The plug members 553 protect the end faces 526 of the adapter ferrules 525. The number of plug members 553 corresponds to the number of adapter ferrules 525 within the adapter body 501. In some implementations, the plug members 553 are sized to extend into openings 512 to engage the adapter ferrules 525. In other implementations, a connection end face of the plug body 551 does not include plug members 553.

In certain implementations, the plug body 551 includes axially extending keys 552. The keys 552 cooperate with the keyways 509 within the adapter body 501 to rotationally orient the adapter dust plug 550 relative to the adapter 500 when the adapter dust plug 550 is inserted at the adapter port. The keys 552 and keyways 509 also maintain the rotational orientation of the adapter dust plug 550 relative to the adapter 500 as the adapter dust plug 550 continues to be inserted into the adapter 500 and the plug members 553 engage the ferrules 525.

In some implementations, the adapter dust plug 550 includes a twist-to-lock fastener 559 that engages the internal fastening features 506 of the adapter body 501 to hold the adapter dust plug 550 at the adapter 500. For example, the twist-to-lock fastener 559 can include external threads or a bayonet connection. The twist-to-lock fastener 559 is configured to rotate relative to the plug body 551. Accordingly, the adapter dust plug 550 can be secured to the adapter 500 without movement of the plug members 553 relative to the adapter ferrules 525, which could otherwise damage the adapter ferrules 525 and/or plug members 553.

As shown in FIG. 32, the adapter dust plug 550 includes a separate fastener body 557 that carries the twist-to-lock fastener 559. The fastener body 557 also can include a grip section 562 configured to facilitate grasping by a user for manipulation of the fastener body 557. For example, the grip section 562 can step radially outwardly from the twist-to-lock fastener 559. In certain examples, the grip section 562 can include flats 563 around an outer perimeter.

The fastener body 557 is configured to be mounted to the plug body 551 at an axially fixed position. The fastener body 557 can rotate relative to the plug body 551. In certain examples, the fastener body 557 can rotate freely relative to the plug body 551. For example, in certain implementations, an attachment feature 554 extends from the plug body 551 opposite the connection end face. The attachment feature 554 includes flexible members 555 configured to deflect inwardly. Each flexible member 555 includes an outwardly extending latch member 556.

The attachment feature 554 can fit within an interior passage 558 of the fastener body 557. An inner surface of the passage 558 can define an annular channel. The latch members 556 deflect inwardly as the attachment feature 554 is slid into the fastener body 557. When the latch members 556 reach the inner annular channel, the latch members 556 deflect into the channel to hold the plug body 551 at an axially fixed position relative to the fastener body 557. The plug body 551 can rotate relative to the fastener body 557 by allowing the latch members 556 to slide along the annular channel.

In certain implementations, the adapter dust plug 550 is configured to environmentally seal to the adapter 500. For example, a gasket (e.g., O-ring) 565 can be disposed on the fastener body 557 so that the gasket 565 is disposed within the adapter body 501 at the sealing surface 507 when the adapter dust plug 550 is received at the adapter 500. In certain implementations, the fastener body 557 includes a support section 560 over which the gasket 565 is mounted. A radial step 561 transitions between the support section 560 and the twist-to-lock fastener 559.

FIGS. 33-43 illustrate yet another example optical fiber connector arrangement 600 for a multi-fiber cable 605. The optical fiber connector arrangement 600 includes a connector housing arrangement 610 and a fiber take-up arrangement 660 spaced along the multi-fiber cable 605 from the connector housing arrangement 610. The multi-fiber cable 605 is anchored to the fiber take-up arrangement 660 and excess length of optical fibers 606 of the multi-fiber cable 605 is stored at a storage drum 662 therein. Distal ends of the optical fibers 606 are routed through a furcation cable 695 to the connector housing arrangement 610. A first end of the furcation cable 695 is anchored to the fiber take-up arrangement 660. A second end of the furcation cable 695 is anchored to the connector housing arrangement 610. The distal ends of the optical fibers 606 are connectorized at the ferrules 625 and disposed at a connection end 611 of the connector housing arrangement 610.

FIGS. 34-37 illustrate one example fiber take-up arrangement 660 suitable for use in the optical fiber connector arrangement 600. The fiber take-up arrangement 660 includes a mandrel arrangement 661 and a sealing arrangement 670. The mandrel arrangement 661 is configured to hold the excess length of the optical fibers 606. The mandrel arrangement 661 also is configured to anchor the strength members 607 of the multi-fiber cable 605 and the strength members 697 of the furcation cable 695. The sealing arrangement 670 provides an environmentally seal between the multi-fiber cable 605 and the furcation cable 695.

The mandrel arrangement 661 includes a first anchor body 663a separated from a second anchor body 663b by a gap. A drum 662 extends across the gap to connect the first and second anchor bodies 663a, 663b. In an example, the drum 662 has a circular shape. In another example, the drum 662 has an oblong shape. Optical fibers 606 of the multi-fiber cable 605 extend axially between the anchor bodies 663a, 663b to the drum 662, wrap around the drum 662, and extend axially between the anchor bodies 663a, 663b away from the drum 662. The drum 662 is sized to inhibit excessive bending of the optical fibers 662 wrapped therearound.

In some implementations, the anchor bodies 663a, 663b of the mandrel arrangement 661 are configured to axially fix the strength members 607, 697 of the cable 605, 695. In certain implementations, each anchor body 663a, 663b is configured to axially fix a strength member 607, 697 of each cable 605, 695. In certain examples, the strength members 607, 697 are terminated at anchor boots 609, 699, respectively. The anchor bodies 663a, 663b are configured to receive and axially retain the anchor boots 609, 699. In examples, each anchor body 663a, 663b defines a channel 667 that extends from an axial end of the anchor body 663a, 663b to a cavity 668 defined at an intermediate location along the anchor body 663a, 663b.

In certain examples, the anchor boots 609, 699 are shaped to match the shape of the cavities 668. In the example shown, the anchor boots 609, 699 have T-shaped axial cross-sections that match the T-shaped axial cross-sections of the cavities 668. In certain examples, the anchor boots 609, 699 and cavities 668 are shaped to enable the anchor boots 609, 699 to pass laterally (i.e., radially) into the cavities 668 while inhibiting axial movement of the anchor boots 609, 699 relative to the cavities 668. The strength members 607, 697 of the cables 605, 695 are disposed within the channels 667 when the anchor boots 609, 699 are disposed in the cavities 668.

In certain implementations, the anchor bodies 663a, 663b reduce in cross-section at the axial ends. These axial end sections 665, 666 define mounting surfaces for the sealing arrangement 670. For example, each axial end section 665, 666 may define external threads 665a, 666a. In some implementations, the threads 665a, 666a are spaced inwardly from the axial ends of the anchor bodies 663a, 663b (see FIG. 35). In other implementations, the threads 665a, 666a are disposed at the axial ends of the anchor bodies 663a, 663b. In some examples, the axial end sections 665, 666 define portions of the channels 667. In other examples, the channels 667 extend across the larger intermediate sections of the anchor bodies 663a, 663b.

The sealing arrangement 670 includes a closure member 672 configured to surround the mandrel arrangement 661. The closure member 672 extends over the cavities 668, thereby retaining the anchor boots 609, 699 in the cavities 668. First and second end members 674 mount to opposite ends of the mandrel arrangement 661 to hold the closure member 372 therebetween. For example, each of the first and second end members 674 may define internal threads 676 that engage the external threads 665a, 666a at a respective axial end section 665, 666. The closure member 672 is axially held between the first and second end members 674. For example, each of the first and second end members 674 may flare or step radially outwardly at the axial end facing the closure member 672.

Each of the opposite axial ends of the closure member 672 defines an attachment section 673. For example, the attachment sections 673 can step or taper radially inwardly from an intermediate section of the closure member 672. Portions of the first and second end members 674 extend over the attachment sections 673. For example, each end member 674 can include a sealing surface 675 that extends over the respective attachment section 673. Seals (e.g., O-rings) 679 can be disposed between the attachment sections 673 and the sealing surfaces 675 (see FIG. 36). In some implementations, the seals 679 are compressed radially between the attachment sections 673 and the sealing surfaces 675. In other implementations, the seals 679 are compressed axially between the closure member 661 and the respective end members 673.

The sealing arrangement 670 also is configured to seal to the cables 605, 695. For example, the first and second end members 674 may include mounting sections 677 opposite the sealing surfaces 675. A heat recoverable sleeve 678 can have a first portion extending over a jacket 608, 698 of the cable 605, 695 and a second portion extend over the mounting section 677 of the respective end member 674. In certain examples, the mounting sections 677 can be textured (e.g., ribs, threads, bumps, etc.) to aid in axially retention of the heat recoverable sleeve 678.

FIGS. 38-43 illustrate the example connector housing arrangement 610 that couples to the furcation cable 695. The connector housing arrangement 610 holds the optical ferrules 625 at the connection end 611. Optical fibers 606 of the multi-fiber cable 605 (or furcation fibers optically coupled to the optical fibers 606) enter the connector housing arrangement 610 at an anchor end 612, extend through a transition region 613, and terminate at the optical ferrules 625.

Figure 41:
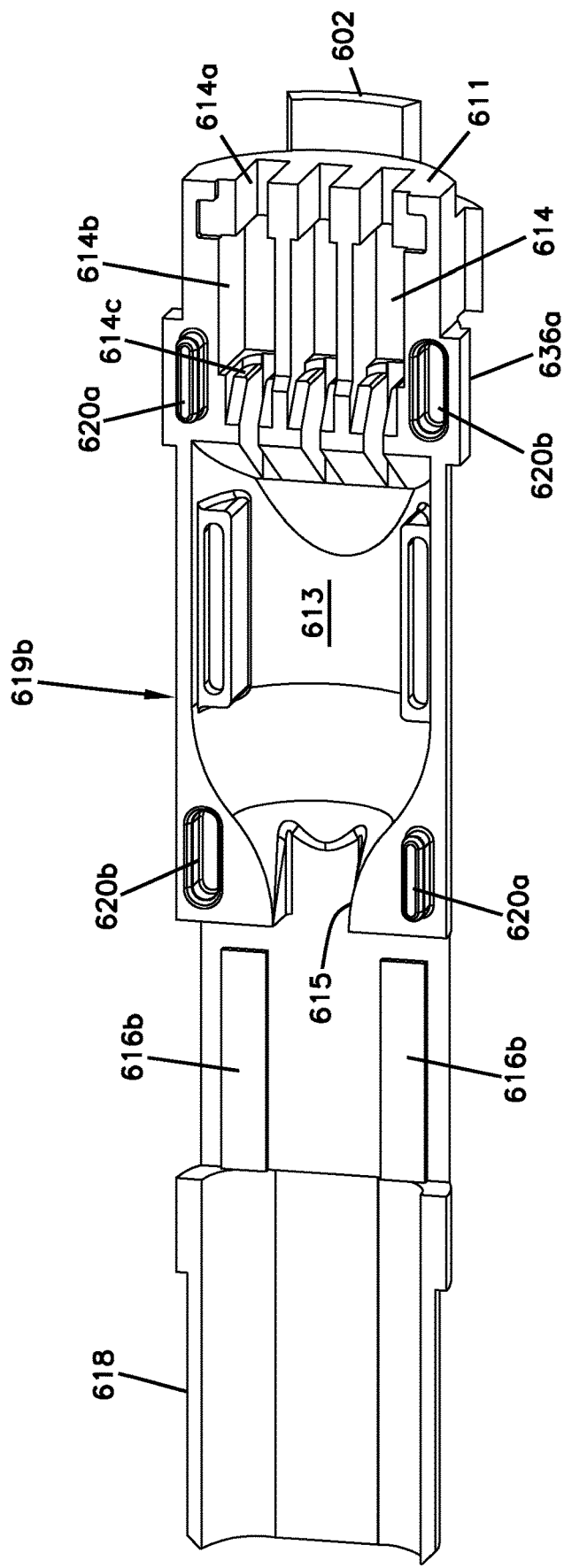

In some implementations, the connector housing arrangement 610 includes a front housing 617 and a coupling sleeve 630. The front housing 617 defines the connection end face 611, a ferrule mounting region 614, and the anchor end 612. In some implementations, the front housing 617 includes an integral housing. In other implementations, however, the front housing 617 includes a first housing section 619a (FIG. 40) and a second housing section 619b (FIG. 41). The first and second housing sections 619a, 619b can include alignment members to properly position the housing sections 619a, 619b. For example, the first and second housing sections 619a, 619b can include mating tabs 620a and slots 620b. In certain examples, the housing sections 619a, 619b latch together. In certain examples, the housing sections 619a, 619b are held together by the coupling sleeve 630.

The front housing 617 is elongated between the connection end 611 and the anchor end 612. The coupling sleeve 630 is configured to extend around the front housing 617 over a majority of the length of the front housing 617 (see FIGS. 42-43). The interior surface of the coupling sleeve 630 generally follows the exterior surface of the front housing 617. The coupling sleeve 630 is sized to retain the housing sections 619a, 619b of the front housing 617 together when the coupling sleeve 630 is mounted about the front housing 617.

In some implementations, a front portion of the front housing 617 steps radially outwardly to define a rear facing shoulder 621. A first end 631 of the coupling sleeve 630 faces the rear facing shoulder 621 when the coupling sleeve 630 is mounted about the front housing 617. In certain examples, the first end 631 of the coupling sleeve 630 abuts the rear facing shoulder 621. The interaction between the shoulder 621 and the first end 631 inhibits further forward movement of the coupling sleeve 630 over the front housing 617. A groove 623 is defined at a rear of the front housing 617 (see FIG. 39). The coupling sleeve 630 includes a hook 639 configured to mate with the groove 623 when the coupling sleeve 630 is mounted about the front housing 617 (see FIG. 43). In an example, the hook 639 is inwardly flexible relative to the front housing 617. The interaction between the hook 639 and the groove 623 inhibits further rearward movement of the coupling sleeve 630 over the front housing 617.

Figure 38:
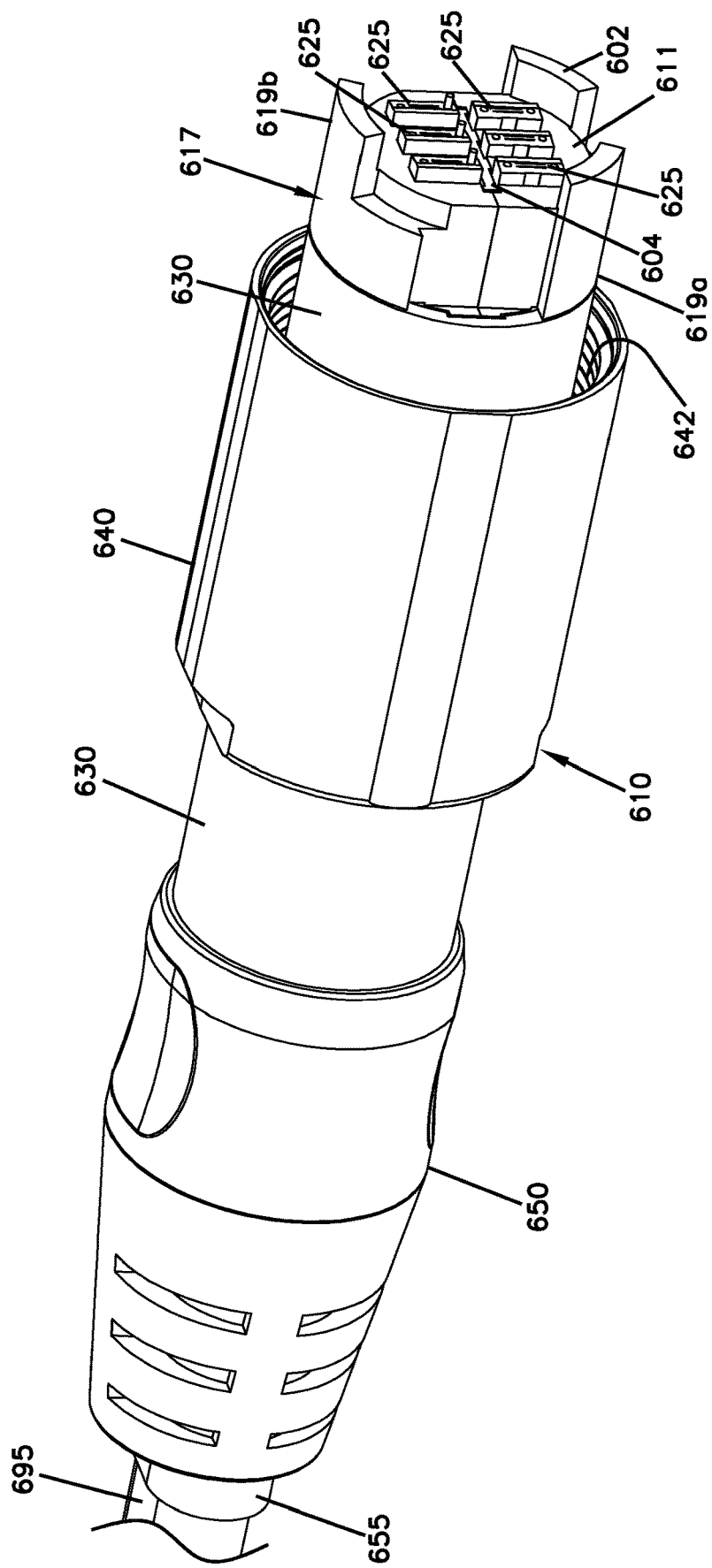
FIG. 38 is a perspective view of the connector housing arrangement of FIG. 33.
Figure 39:
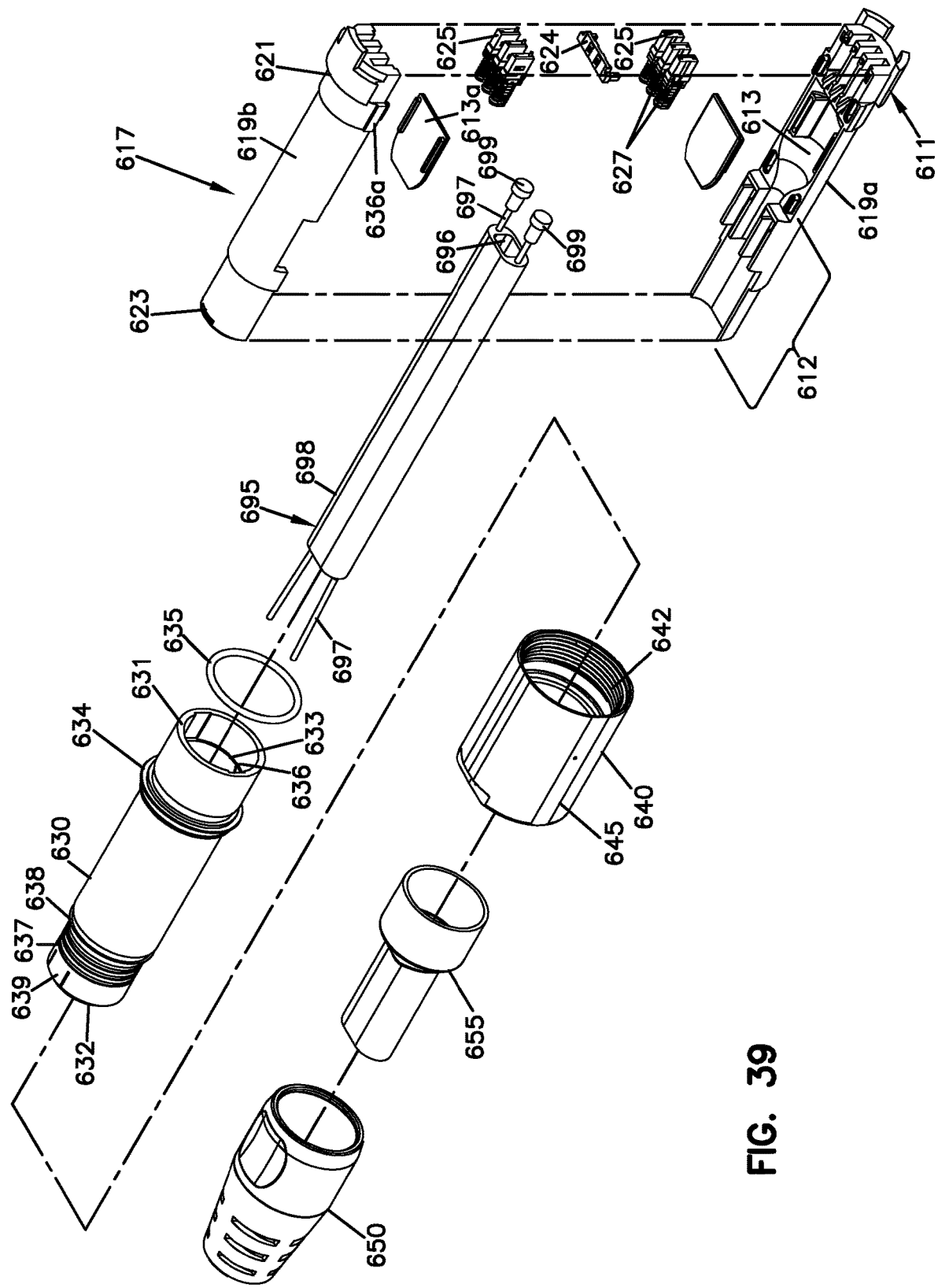
FIG. 39 is an exploded view of the connector housing arrangement of FIG. 38.
Figure 40:
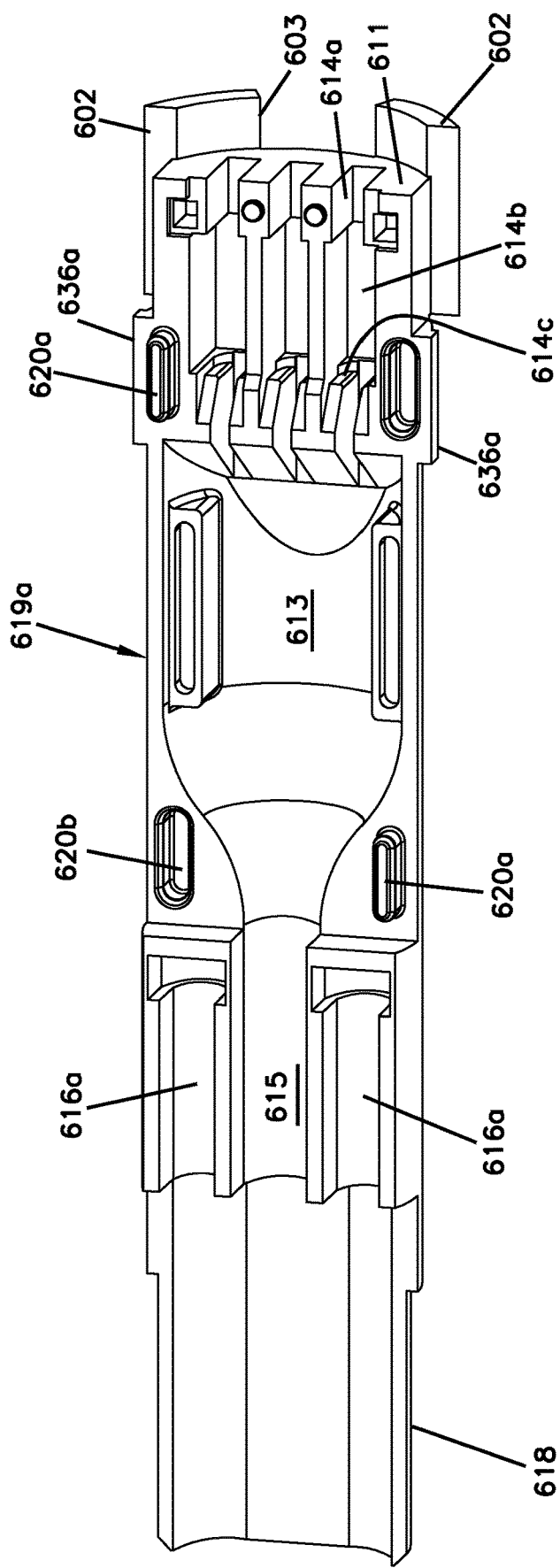
FIGS. 40 and 41 are perspective views of first and second housing sections, respectively, of the connector housing arrangement of FIG. 39.

In certain implementations, one or more flanges 602 extend forwardly of the connection end face 611 (see FIG. 38). In certain examples, the flanges 602 extend forwardly past the ferrules 625. In certain examples, the flanges 602 form an interrupted wall extending forwardly of the connection end face 611. For example, interruptions 603 in the wall may provide access to the ferrules 625 for cleaning and/or polishing. In some implementations, the flanges 602 are integral with the front housing 617. In other implementations, the flanges 602 are integral with the coupling sleeve 630.

In some implementations, the coupling sleeve 630 carries a gasket (e.g., an O-ring) 635 and includes an outwardly extending flange 634. In the example shown, the gasket 635 is disposed between the flange 634 and the connection end face 611. In other implementations, the gasket 635 can be mounted within the coupling sleeve 630 or over the front housing 617.

The connector housing arrangement 610 also is configured to seal to the furcation cable 695. In certain examples, the coupling sleeve 630 includes a reduced section 637 over which a portion of a strain-relief boot 650 extends. In some implementations, the strain-relief boot 650 provides side load strain relief to the furcation cable 695. In certain implementations, a heat recoverable sleeve 655 has a first portion extending over a jacket 698 of the furcation cable 695 and a second portion extend over a reduced section 637 of the coupling sleeve 630. In certain examples, the rear 637 of the coupling sleeve 630 can be textured (e.g., ribs, threads, bumps, etc.) to aid in axially retention of the heat recoverable sleeve 655.

Figure 42:
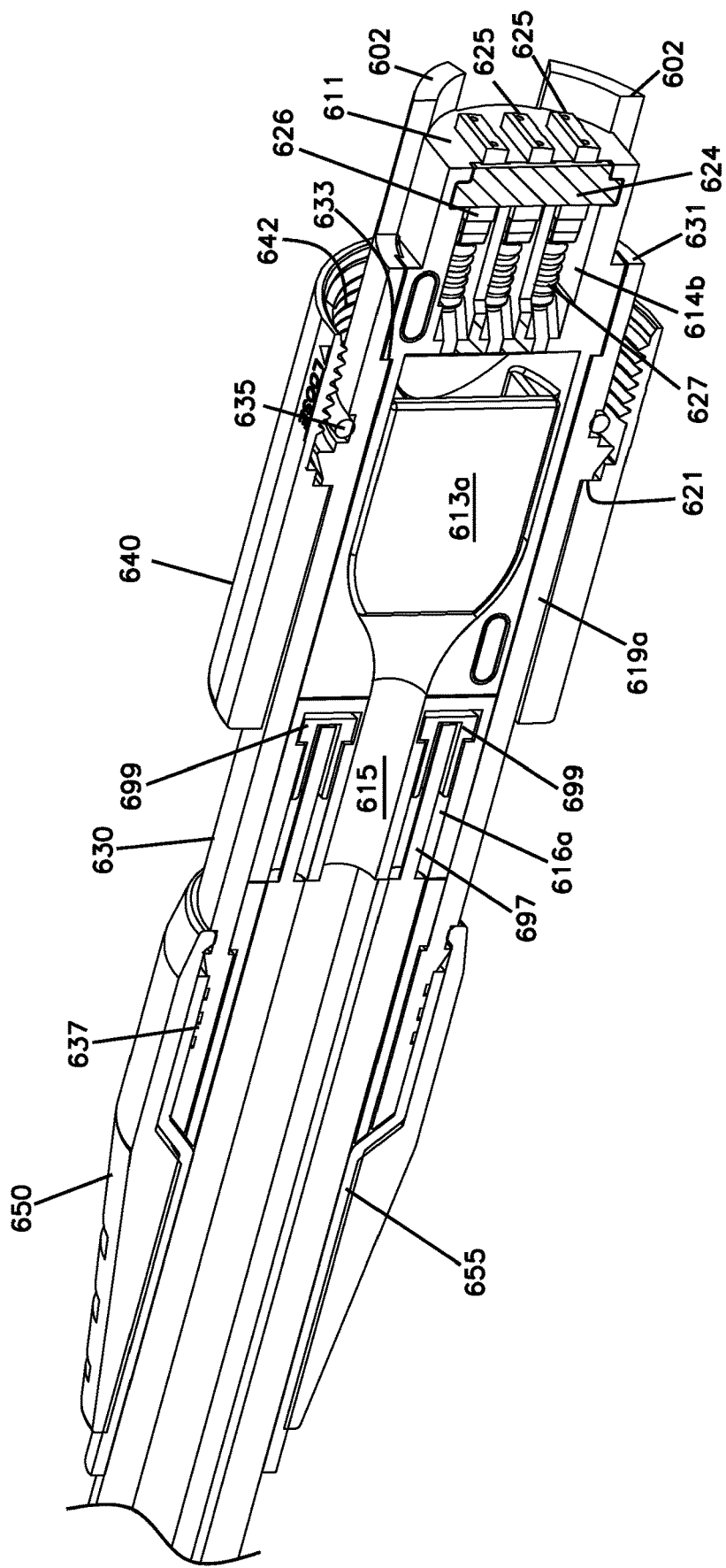
FIG. 42 is an axial cross-sectional view of the connector housing arrangement of FIG. 36.
Figure 43:
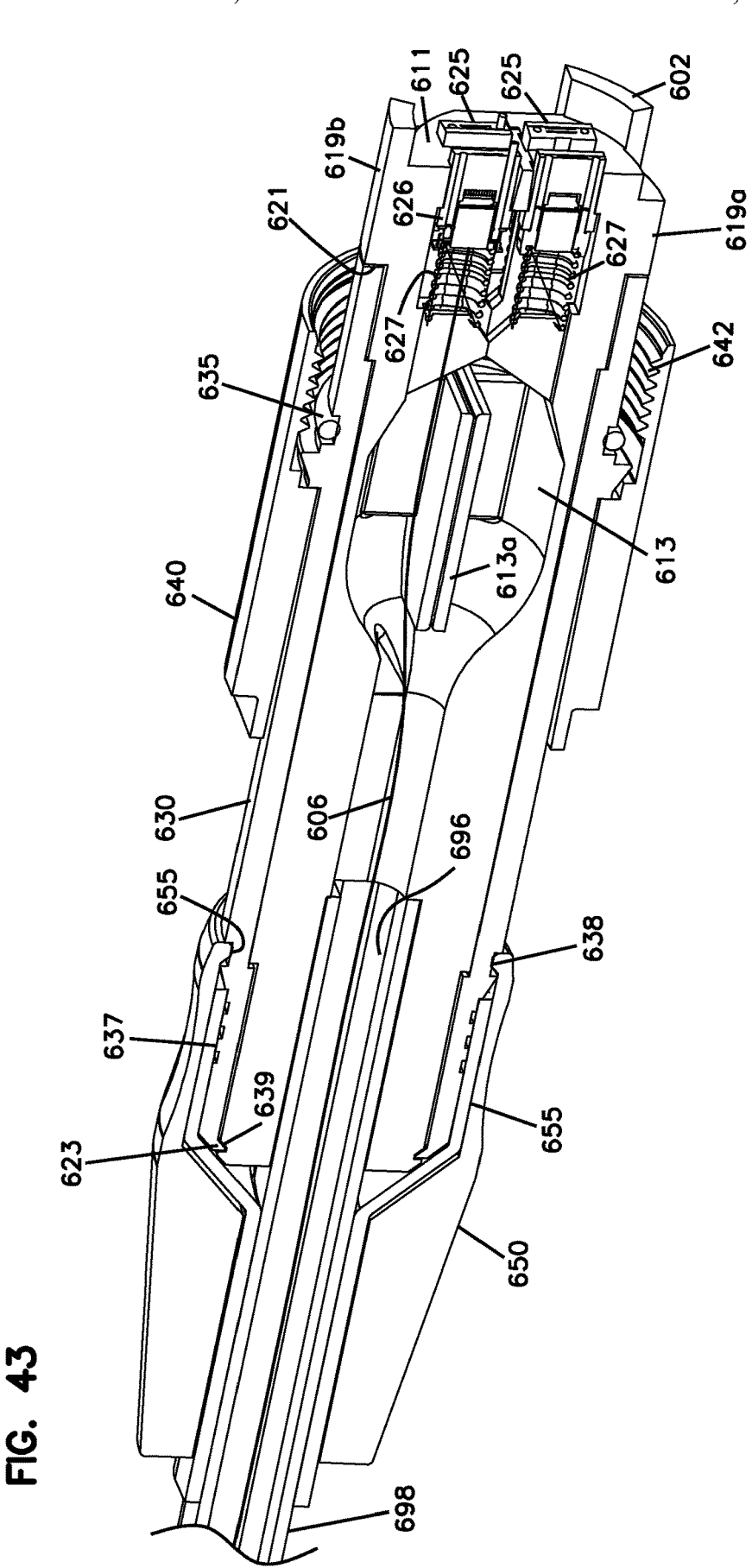
FIG. 43 is an axial cross-sectional view of the connector housing arrangement of FIG. 36 that is rotated 90° from the cross-sectional view of FIG. 42.
Figure 44:
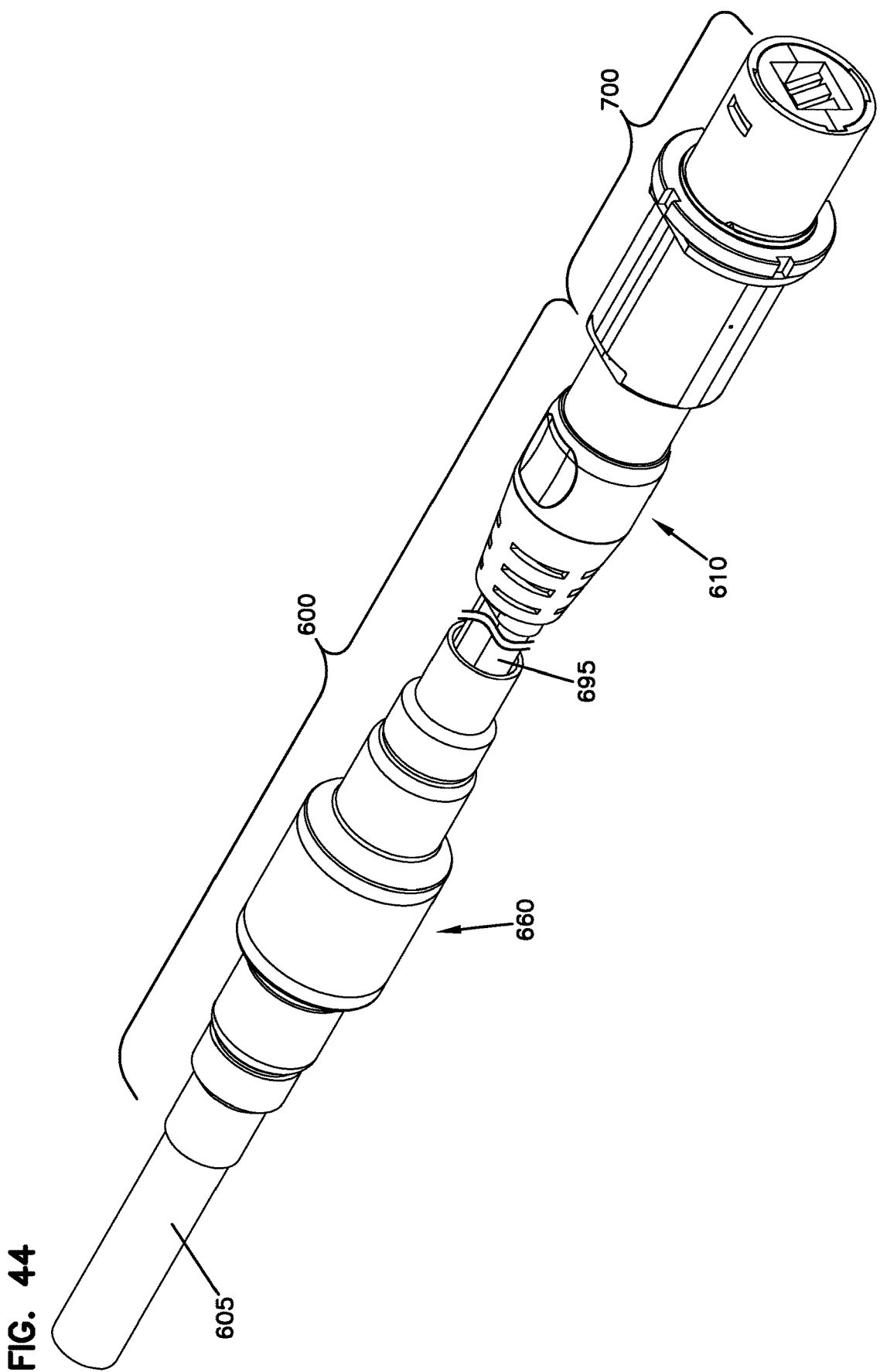
FIG. 44 is a front perspective view of the optical connector arrangement of FIG. 33 received at a port of an adapter configured in accordance with the principles of the present disclosure.

The strain-relief boot 650 is coupled to the coupling sleeve 630 (e.g., over the heat recoverable sleeve 655) and extends over a portion of the furcation cable 695 (see FIGS. 42 and 43). In certain examples, the reduced section 637 defines a groove or slot 638 into which a ledge 655 or teeth of the strain-relief boot 650 extend to hold the strain-relief boot 450 to the coupling sleeve 630 (see FIGS. 42 and 43). In certain implementations, the coupling sleeve 630, the heat recoverable sleeve 655, and/or the strain-relief boot 650 are shaped to match an outer periphery of the furcation cable 695. For example, in some implementations, the furcation cable 405 is a flat cable. In such cases, the coupling sleeve 630, the heat recoverable sleeve 655, and/or the strain-relief boot 650 have a flattened profile corresponding to the furcation cable 695. In other implementations, the furcation cable 695 is a round cable. In such cases, the coupling sleeve 630, the heat recoverable sleeve 655, and/or the strain-relief boot 650 have a rounded profile corresponding to the furcation cable 695.

In some implementations, the connection end face 611 of the front housing 617 defines one or more openings 614a at which the optical ferrules 625 are accessible. In certain examples, the first and second housing parts 619a, 619b cooperate to retain the ferrules 625. For example, the housing parts 619a, 619b may define open-ended slots or notches 614a that align with each other to form openings in which the ferrules 625 are disposed. In another example, a retainer 624 (FIG. 39) is disposed between the notches 614a defined by the first housing part 619a and the notches 614a defined by the second housing part 619b (see FIG. 42).

In the example shown, each ferrule 625 mounts in a respective one of the openings 614a. For example, each ferrule 625 may include a shoulder 626 that abuts a retention surface at the notch 614a (see FIG. 43). In some implementations, portions of the ferrules 625 protrude forwardly of the connection end face 611. Each ferrule 625 may be individually spring-biased within the respective opening. In an example, each ferrule 625 can be biased by a spring (e.g., a coil spring, a leaf spring, etc.) 627 disposed in a cavity 614b. One end of the spring 627 abuts a spring retention surface 614c and the opposite end of the spring 627 abuts the ferrule 625 (see FIGS. 42-43). Alternatively, two or more of the ferrules 625 may be biased by a common spring (e.g., coil spring, leaf spring, etc.). In other implementation, however, the ferrules 625 are not spring-biased.

In certain implementations, the anchor section 612 of the front housing 617 defines a fiber passage 615 at which the optical fibers 606 extend through the anchor section 612. The fiber passage 615 provides access to a transition region 613 at which individual optical fibers 606 separate out to be terminated at the optical ferrules 625. In examples, the fiber passage 615 is sized to receive multiple optical fibers 606. In an example, the fiber passage 615 is configured to receive one or more ribbons of optical fibers 606. In another example, the fiber passage 615 is configured to receive loose optical fibers 606. In some examples, the first and second housing parts 619a, 619b cooperate to define the fiber passage 615. In other examples, the first housing part 619a defines the fiber passage 615.

In certain implementations, the anchor end 612 also includes strength member cavities 616a at which the strength members 697 of the furcation cable 695 are received. In some examples, the first and second housing parts 619a, 619b cooperate to define the cavities 616a. In other examples, however, the first housing part 619a defines the cavities 616a and the second housing part 619b includes surfaces 616b that close the cavities 616a. In examples, anchor boots 699 can be attached to the strength members 695 of the furcation cable 695 and laterally inserted into the cavities 616a. Interaction between the anchor boots 699 and retaining walls at the cavities 616a axially retain the strength members 697 against pulling out of the front housing 617. In certain examples, epoxy can be applied to the strength members 697 and/or anchor boots 699 at the strength member cavities 616a. In other examples, the strength members 697 can be otherwise held at the cavities 616a. In examples, the strength member cavities 616a do not connect to the transition region 613.

A twist-to-lock fastener 640 is disposed over the coupling sleeve 630 to releasably secure the optical fiber connector arrangement 600 to a component (e.g., an optical adapter). In examples, the gasket 635 can be disposed on or in the twist-to-lock fastener 640 instead of or in addition to connector housing arrangement 610. In examples, the twist-to-lock fastener 640 included a threadable nut having an internal threaded section 642 and a gripping section 645. When the connector arrangement 600 is plugged into a port of a component, the threaded section 642 of the twist-to-lock fastener 640 is engaged with an external thread of the component. In other examples, the twist-to-lock fastener 640 can include a bayonet connection. Rotating the twist-to-lock fastener 640 relative to the component moves the twist-to-lock fastener 640 axially against the outwardly extending flange 634 of the coupling sleeve 630, thereby securing the connector arrangement 600 to the component.

FIGS. 44-49 illustrate an example optical adapter 700 defining a port at which the optical connector arrangement 600 can be received. In some implementations, the optical adapter 700 includes a body 701 that extends from a first end 702 to a second end 703. The first end 701 defines the port sized to receive the optical connector arrangement 600. In some implementations, the second end 702 of the body 701 is configured to support optical ferrules 725 that mate with the optical ferrules 625 of the connector arrangement 600. In other implementations, the second end 702 of the body 701 defines a second port that can receive an optical connector.

The adapter body 701 includes a fastening feature 706 at the first end 702. The fastening feature 706 is configured to engage with the twist-to-lock fastener 640 of the connector arrangement 600 to hold the connector arrangement 600 at the adapter 700. In some implementations, the fastening feature 706 includes external threading (see FIG. 45). In other implementations, the fastening features 706 include part of a bayonet connection. The adapter body 701 also includes a sealing surface 711 against which the gasket 635 of the connector arrangement 600 presses when the connector arrangement 600 is disposed within the adapter 700. Accordingly, the front housing 617 of the connector arrangement 600 can be environmentally sealed within the adapter 700.

The adapter body 701 includes a flange 704 that extends radially outwardly from the body 701. The adapter body 701 defines external threads 705 adjacent the flange 704. In certain implementations, the flange 704 is disposed between the fastening feature 706 and the external threads 705. The adapter 700 includes a retaining ring 740 that is configured to move axially along the adapter body 701. For example, in one implementation, the retaining ring 740 has an internal thread 741 that engages the external threads 705 of the adapter body 701. In certain examples, the retaining ring 740 defines external notches 742 that facilitate rotating the retaining ring 740. The retaining ring 740 cooperates with the flange 704 to secure a wall, panel, or other surface therebetween to mount the adapter 700 to the wall, panel, or other surface. In some implementations, the flange 704 is disposed at the first end 702 of the body 701. In other implementations, flange 704 is disposed closer to the second end 703 of the body 701. In still other implementations, the flange 704 is disposed at any intermediate position between the first and second ends 702, 703.

Figure 45:
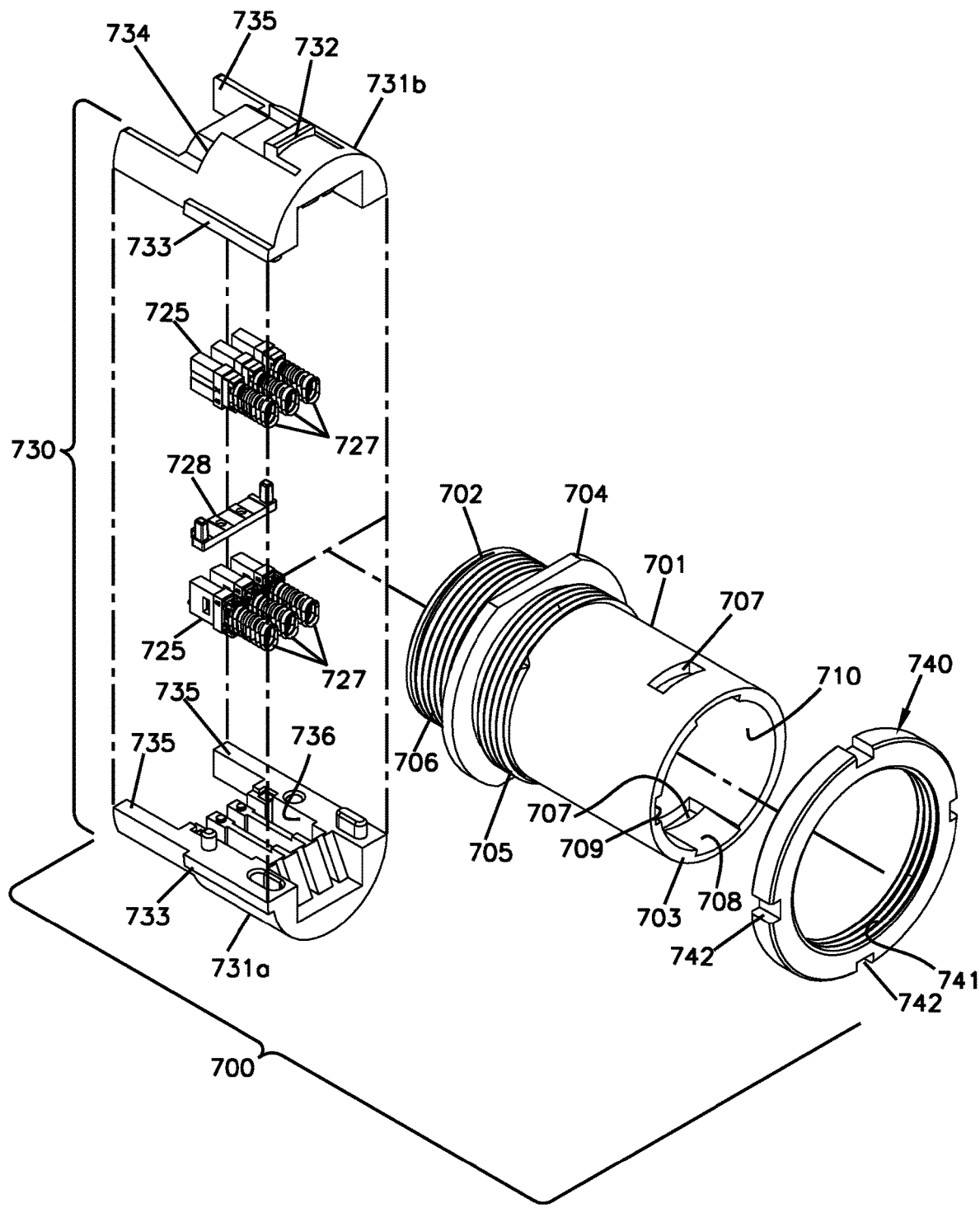
FIG. 45 is an exploded view of the adapter shown in FIG. 44.
Figure 46:
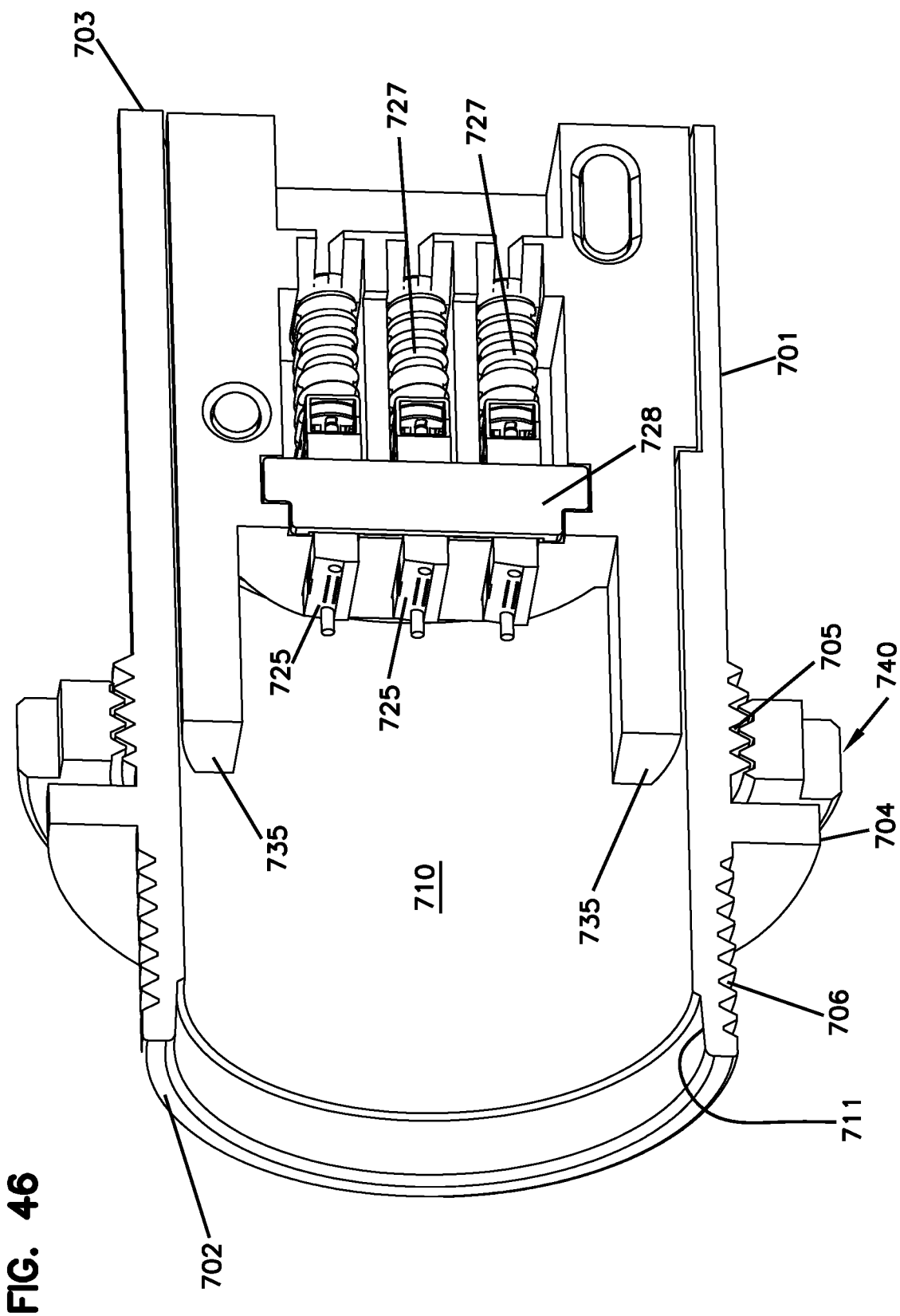
FIG. 46 is an axial cross-sectional view of the adapter of FIG. 45.
Figure 47:
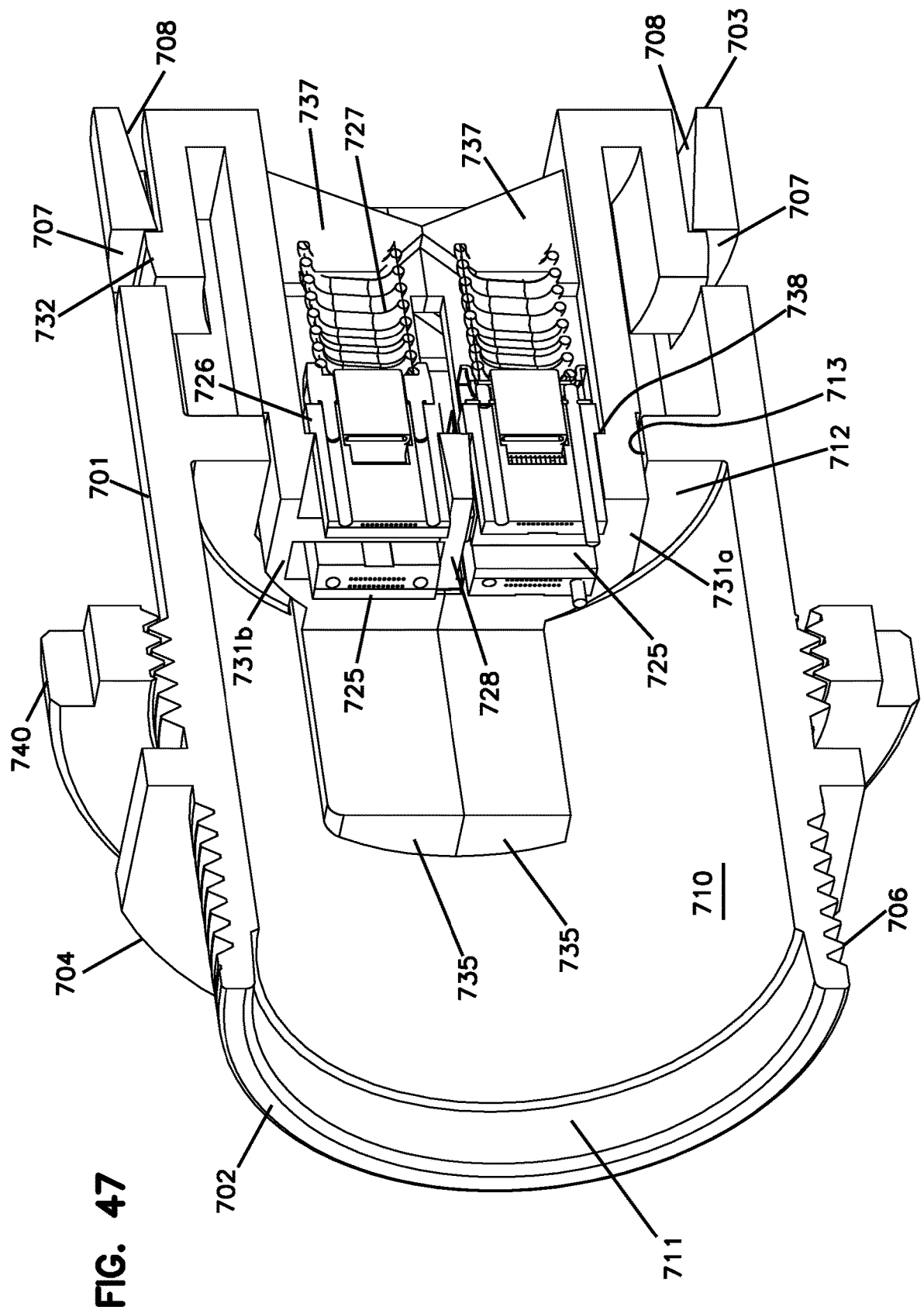
FIG. 47 is an axial cross-sectional view of the adapter of FIG. 45 that is rotated 90° from the cross-sectional view of FIG. 46.
Figure 48:
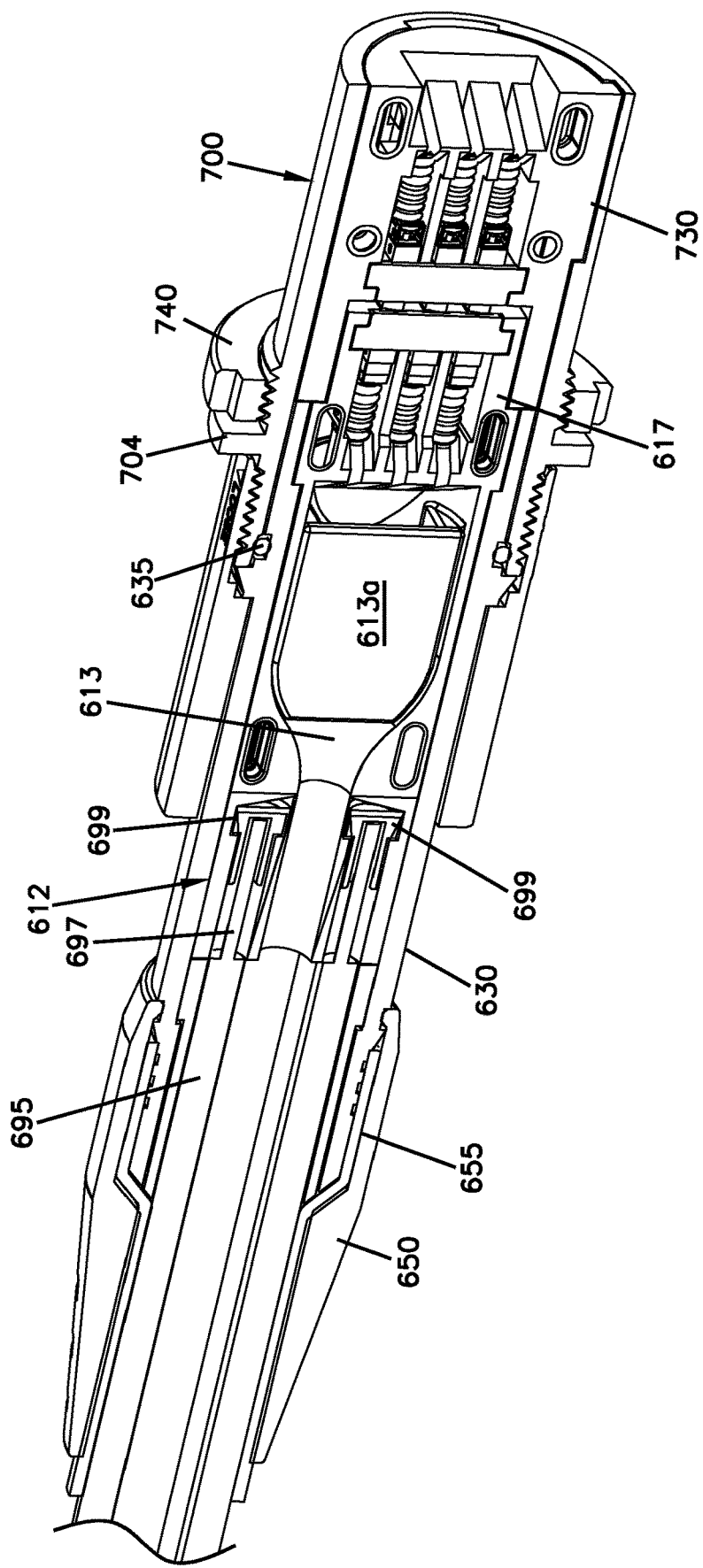
FIG. 48 is an axial cross-sectional view of the optical connector arrangement and adapter of FIG. 44.

As shown in FIGS. 45-47, the adapter body 501 is configured to receive a ferrule plug 730 that holds the optical ferrules 725. The ferrule plug 730 is disposed at the second end 703 of the adapter body 701. The ferrule plug 730 holds the optical ferrules 725 so that end faces of the ferrules 725 are accessible within an interior 708 of the adapter body 701. In certain implementations, the ferrule plug 730 includes keys 733 that slide along keyways 709 defined along an interior surface of the adapter body 701. Interaction between the keys 733 and keyways 709 ensures that the ferrules 725 correctly align with the ferrules 625 of the connector arrangement 600. When the twist-to-lock fastener 640 of the connector arrangement 600 is engaged with the fastening feature 706 of the adapter 700, the optical ferrules 625, 725 optically couple together (e.g., see FIG. 48).

The adapter body 701 includes an internal wall 712 that retains the ferrule plug 730 against forward axial movement within the adapter body 701. The ferrule plug 730 includes a stepped section 734 that engages with the internal wall 712 when the ferrule plug 730 is disposed within the adapter body 701. A lock arrangement retains the ferrule plug 730 against rearward axial movement. For example, the ferrule plug 730 can include a flexible latch 732 that snaps into a groove 707 defined in the adapter body 701. In the example shown, the ferrule plug 730 includes two flexible latches 732 at opposite sides of the ferrule plug 730. Each latch 732 snaps a respective groove 707 (see FIG. 47). In certain examples, the inner surface of the adapter body 701 is ramped or tapered leading towards the grooves 707 to facilitate insertion of the ferrule plug 730.

Figure 49:
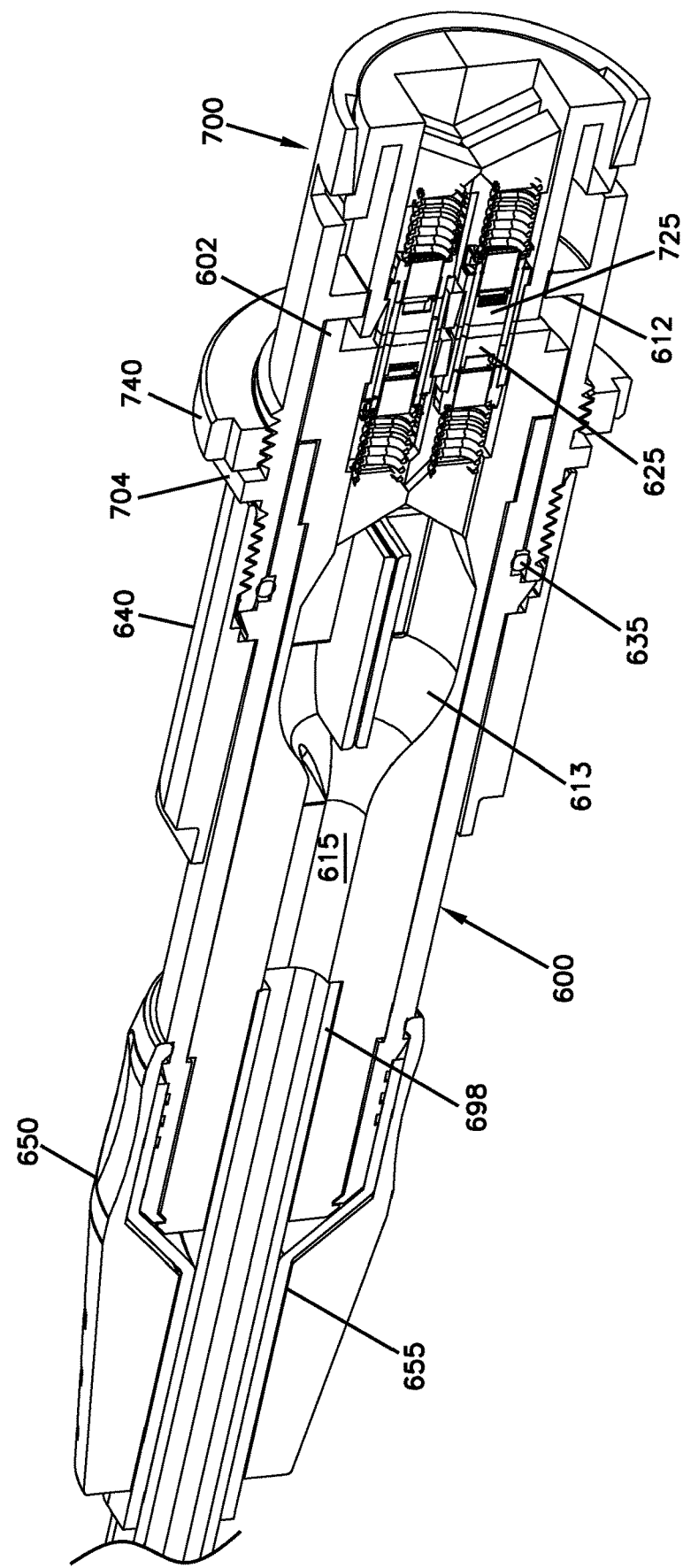
FIG. 49 is an axial cross-sectional view of the optical connector arrangement and adapter of FIG. 44 that is rotated 90° from the cross-sectional view of FIG. 48.
Figure 50:
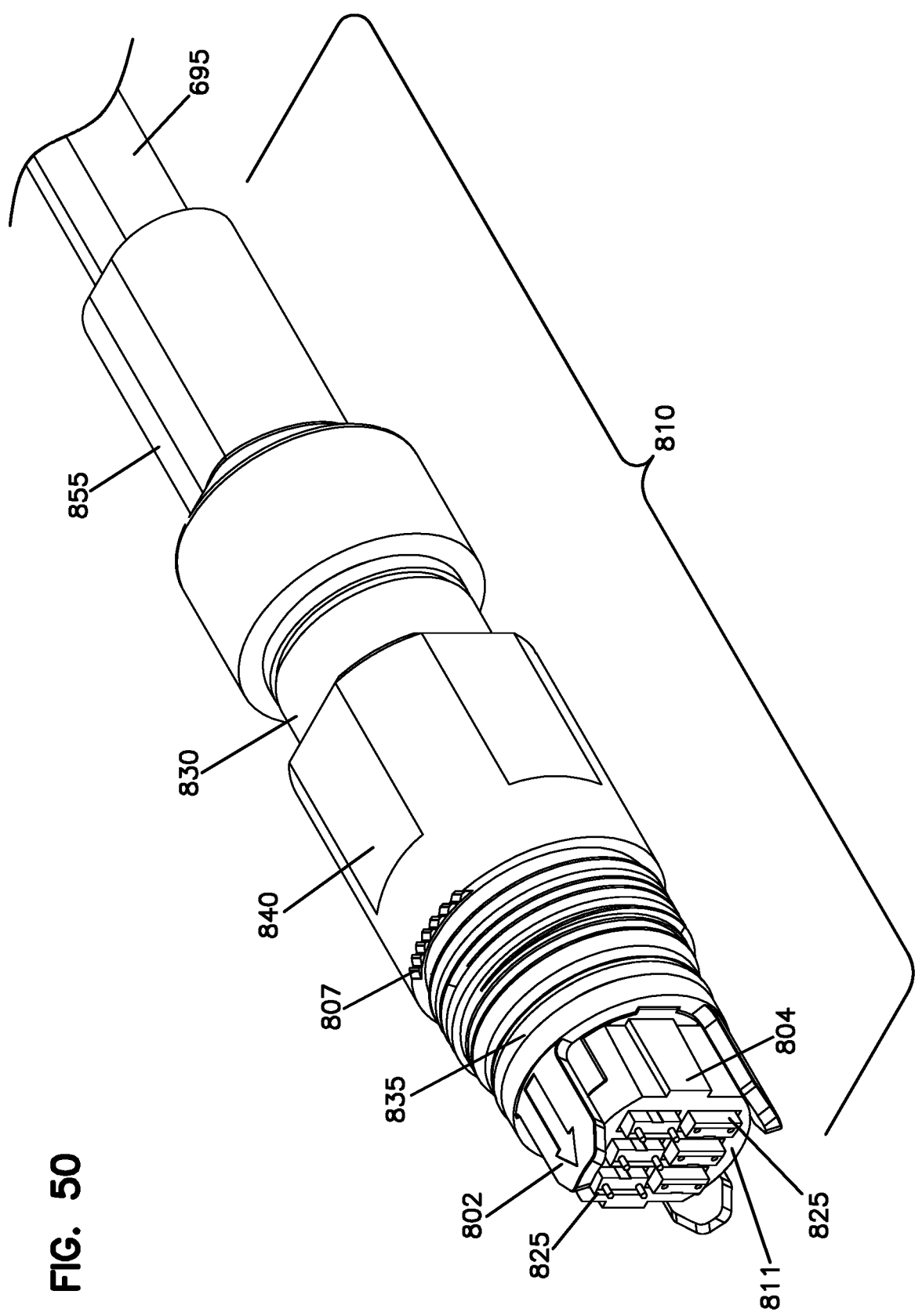
FIG. 50 is a front perspective view of another example connector housing arrangement suitable for use with the fiber take-up arrangement of FIGS. 33-37.
Figure 51:
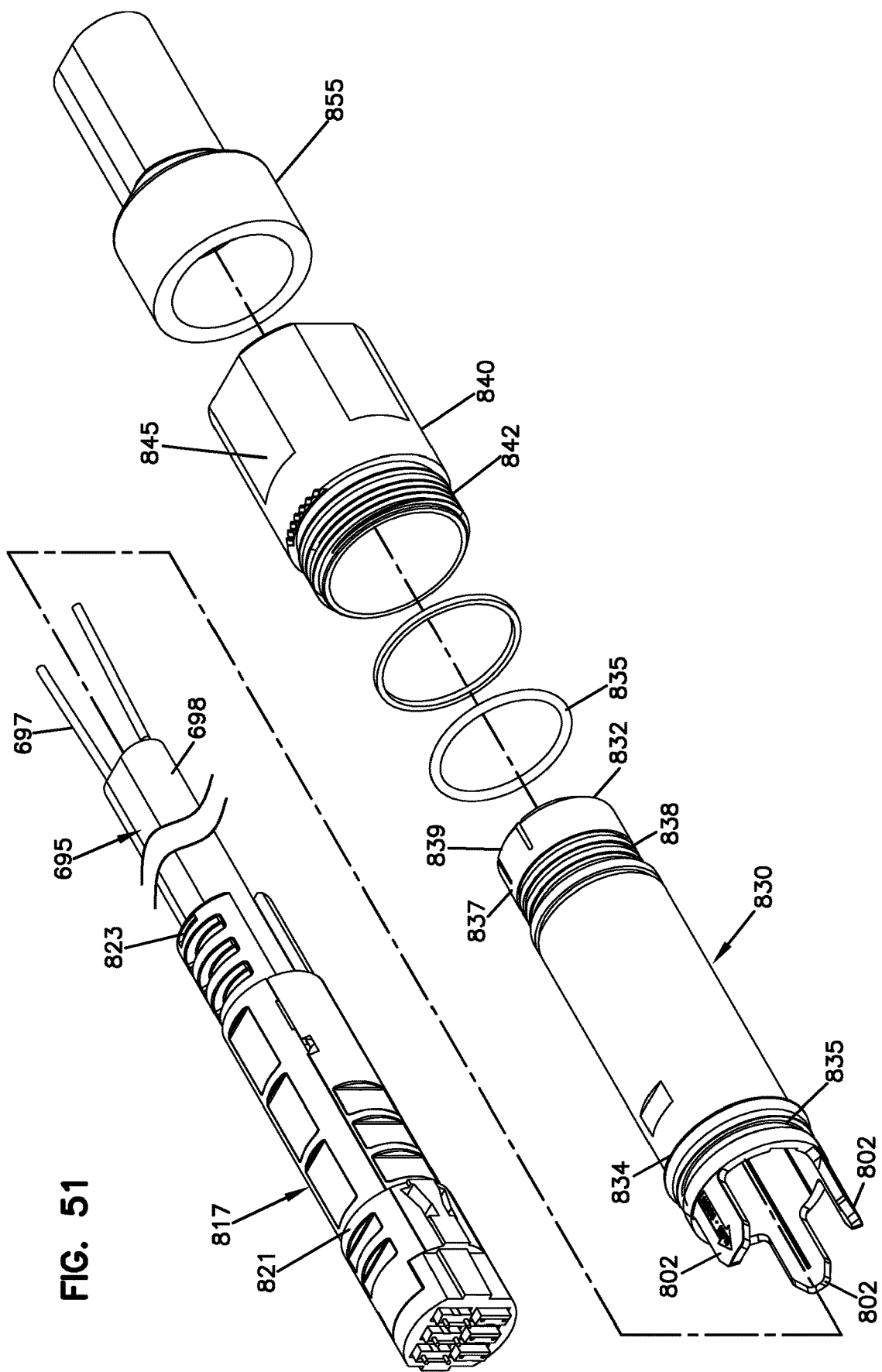
FIG. 51 is an exploded view of the connector housing arrangement of FIG. 50.

The internal wall 712 is configured to abut the flanges 602 extending forwardly of the connection end face 611 of the connector arrangement 600 when the connector arrangement 600 is received at the adapter 700 (see FIG. 49). In certain implementations, the ferrule plug 730 also includes flanges 735 that extend towards the first end 702 of the adapter body 701. The flanges 735 are configured to abut the first end 631 of the coupling housing 630 of the connector arrangement 600 when the connector arrangement 600 is received at the adapter 700 (see FIG. 48).

The ferrule plug 730 is configured to hold a plurality of optical ferrules (e.g., multi-fiber ferrule) 725 terminating optical fibers. The ferrule plug 730 also can include one or more ferrule springs (e.g., coil springs, leaf springs, etc.) 727. In an example, each adapter ferrule 725 has a corresponding ferrule spring 727. In another example, one ferrule spring 728 can bias multiple of the adapter ferrules 725.

As shown in FIG. 45, the ferrule plug 730 can be formed from a first plug housing 731a and a second plug housing 732b. The plug housings 731a, 732b cooperate to hold the ferrules 725 therebetween. In certain examples, a retainer 728 is disposed between a first row of the ferrules 725 and a second row of the ferrules 725. In certain implementations, each plug housing 731a, 731b defines slots 736 in which the ferrules 725 and ferrule springs 727 are disposed. Each plug housing 731a, 731b also includes a spring support 737 against which the spring 727 abuts. Each plug housing 731a, 731b also includes a retaining shoulder 738 (FIG. 47) against which shoulders 726f the ferrules 725 abut to inhibit the ferrules 725 from passing axially through the ferrule plug 730.

FIGS. 50-53 illustrate another example connector housing arrangement 810 suitable for use with the optical fiber connector arrangement 600. For convenience, the fiber optic connector arrangement having the connector housing arrangement 810 will be referred to with reference number 800. The multi-fiber cable 605 terminated by connector housing arrangement 800 is anchored to the fiber take-up arrangement 660 (FIGS. 33-37) and excess length of optical fibers 606 of the multi-fiber cable 605 is stored at a storage drum 662 therein. Distal ends of the optical fibers 606 are routed through a furcation cable 695 (FIGS. 33-37) to the connector housing arrangement 810. A first end of the furcation cable 695 is anchored to the fiber take-up arrangement 660 (FIGS. 33-37). A second end of the furcation cable 695 is anchored to the connector housing arrangement 810 (see FIGS. 52 and 53). The distal ends of the optical fibers 606 are connectorized at the ferrules 825 and disposed at a connection end 811 of the connector housing arrangement 810.

The example connector housing arrangement 810 holds the optical ferrules 825 at the connection end 811. Furcation fibers, which are optically coupled to the optical fibers 606 of the multi-fiber cable 605, enter the connector housing arrangement 810 at an anchor end 812, extend through a transition region 813, and terminate at the optical ferrules 825.

In some implementations, the connector housing arrangement 810 includes a front housing 817 and a coupling sleeve 830. The front housing 817 defines the connection end face 811, a ferrule mounting region 814, and the anchor end 812.

In certain implementations, the front housing 817 includes one or more keying members 804 extending rearwardly from the end face 811. The keying members 804 are shaped and sized to mate with keying passageways defined by a corresponding optical adapter and/or a mating optical connector. In certain implementations, the keying members 804 are offset from a centerline of the end face 811 to identify a preferred rotational orientation of the connector. In an example, the preferred rotational orientation is based on which optical ferrules 825 include pins and which optical ferrules 825 define pin holes. In another example, the preferred rotational orientation is based on tuning of the optical fibers within the ferrules 825.

In certain implementations, the anchor section 812 of the front housing 817 defines a fiber passage 815 at which the optical fibers 606 extend through the anchor section 812. The fiber passage 815 provides access to a transition region 813 at which individual optical fibers 606 separate out to be terminated at the optical ferrules 825. In examples, the anchor section 812 defines two fiber passages 815. A first of the fiber passages 815 leads to a first group of the optical ferrules 825 and a second of the fiber passages 815 leads to a second group of the optical ferrules 825. In examples, each fiber passage 815 is sized to receive multiple optical fibers 606. In examples, each fiber passage 815 is configured to receive one or more ribbons of optical fibers 606. In another example, each fiber passage 815 is configured to receive loose optical fibers 606.

In certain implementations, the anchor end 812 also includes strength member cavities 816a at which the strength members 697 of the furcation cable 695 are received. In examples, anchor boots 699 can be attached to the strength members 697 of the furcation cable 695 and laterally inserted into the cavities 816a. Interaction between the anchor boots 699 and retaining walls at the cavities 816a axially retain the strength members 697 against pulling out of the front housing 817. In certain examples, epoxy can be applied to the strength members 697 and/or anchor boots 699 at the strength member cavities 816a. In other examples, the strength members 697 can be otherwise held at the cavities 816a. In examples, the strength member cavities 816a do not connect to the transition region 813.

Figure 52:
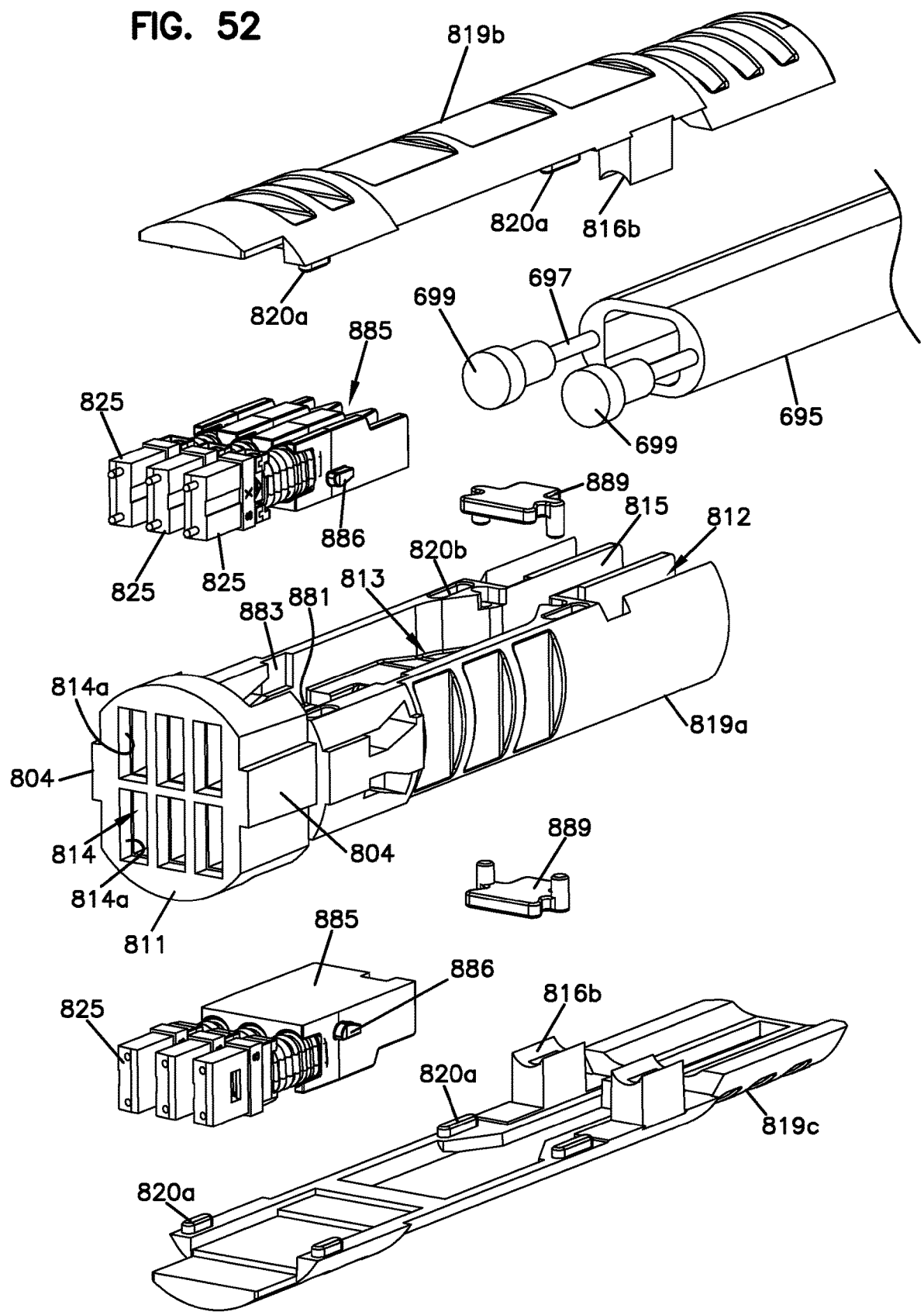
FIG. 52 is an exploded, front perspective view of a front housing and coupling sleeve of the connector housing arrangement of FIG. 50.
Figure 53:
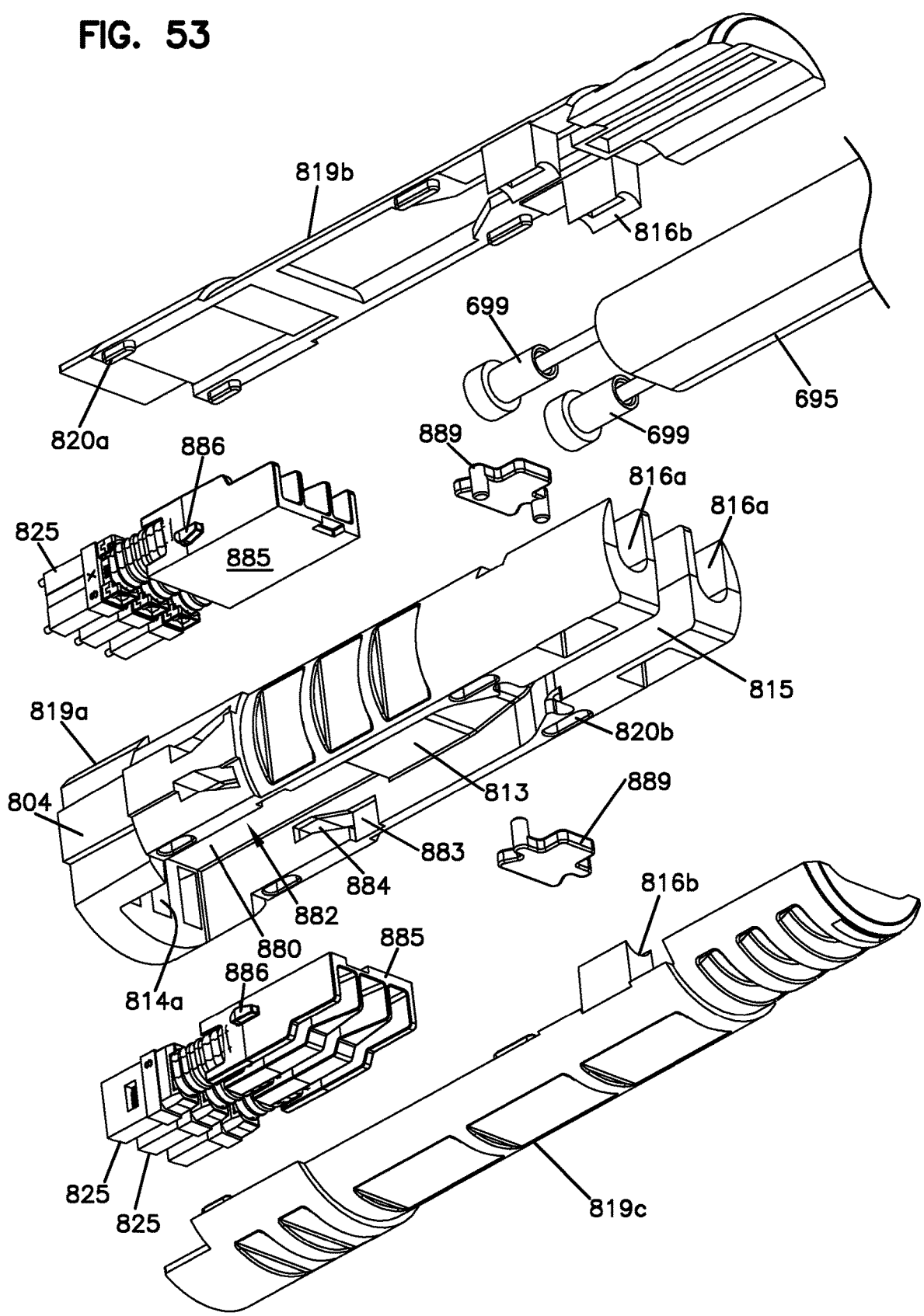
FIG. 53 is an exploded, rear perspective view of a front housing and coupling sleeve of the connector housing arrangement of FIG. 50.

In some implementations, the front housing 817 includes an integral housing. In other implementations, however, the front housing 817 includes at least a first housing section 819a and a second housing section 819b. In certain implementations, the front housing 817 includes a first housing section 819a, a second housing section 819b, and a third housing section 819c (FIG. 52). In certain examples, the connection end face 811 is defined fully by the first housing section 819a. In certain examples, the second and third housing sections 819b, 819c are substantially identical.

In some implementations, the connection end face 811 of the first housing section 819a defines one or more openings 814a at which the optical ferrules 825 are accessible. In certain examples, the first housing part 819a defines all of the openings 814a. In some implementations, the first housing section 819a is configured to receive the optical ferrules 825 and/or the anchor boots 699 of the furcation cable 695. In certain examples, the second and third housing sections 819b, 819c close cavities defined by the first housing section 819a to retain the optical ferrules 825 and/or the anchor boots 699.

In certain implementations, the first housing section 819a includes a divider 880 that separates the interior of the first housing section 819a into a first cavity 881 and a second cavity 882. Some of the optical ferrules 825 are disposed in the first cavity 881 and others of the optical ferrules 825 are disposed in the second cavity 882. The second housing section 819b closes the first cavity 881 and the third housing section 819c closes the second cavity 882. In certain examples, the second housing 819b includes surfaces 616b that closes the cavities 816a in which the anchor boots 699 are retained (see FIG. 52). In an example, the third housing section 819c also includes surfaces 616b closing the cavities 816a in which the anchor boots 699 are retained.

In certain implementations, the first housing section 819a defines a retention arrangement by which the optical ferrules 825 are at least temporarily retained prior to the second and third housing sections 819b, 819c being coupled to the first housing section 819a. For example, the optical ferrules 825 can be coupled to a retention mounts 885. Each retention mount 885 can function as a spring support for the ferrule springs (e.g., a coil spring, a leaf spring, etc.). Each retention mount 885 includes one or more tabs 886 that fit into guides defined in the first housing section 819a. For example, an entrance notch 883 can be defined in sidewalls of the first housing section 819a to receive the tabs 886. The entrance notches 883 can lead to channels 884 leading towards the divider 880. Interaction between the channels 884 and the tabs 886 maintains the optical ferrules 825 within the cavities 881, 882 until the second and third housing sections 819b, 819c can close the cavities 881, 882.

The second and third housing sections 819b, 819c can include alignment members to properly position the second and third housing sections 819b, 819c relative to the first housing section 819a. For example, the housing sections 819a, 819b, 819c can include mating tabs 820a and slots 820b. In the example shown, the second and third housing sections 819b, 819c include tabs 820a and the first housing section 819a defines the corresponding slots 820b. In certain examples, the housing sections 819a, 819b, 819c latch together. In certain examples, the housing sections 819a, 819b, 819c are held together by the coupling sleeve 830.

The front housing 817 is elongated between the connection end 811 and the anchor end 812. The coupling sleeve 830 is configured to extend around the front housing 817 over a majority of the length of the front housing 817. The interior surface of the coupling sleeve 830 generally follows the exterior surface of the front housing 817. The coupling sleeve 830 is sized to retain the housing sections 819a, 819b of the front housing 817 together when the coupling sleeve 830 is mounted about the front housing 817.

In some implementations, a front portion of the front housing 817 steps radially outwardly to define a rear-facing shoulder 821. An internal shoulder of the coupling sleeve 830 faces the rear-facing shoulder 821 when the coupling sleeve 830 is mounted about the front housing 817. The interaction between the rear-facing shoulder 821 and the internal shoulder inhibits further forward movement of the coupling sleeve 830 over the front housing 817. In certain implementations, a groove 823 is defined at a rear of the front housing 817 (see FIG. 51). The coupling sleeve 830 includes a hook 839 configured to mate with the groove 823 when the coupling sleeve 830 is mounted about the front housing 817. In an example, the hook 839 is inwardly flexible relative to the front housing 817. The interaction between the hook 839 and the groove 823 inhibits further rearward movement of the coupling sleeve 830 over the front housing 817.

In certain implementations, one or more flanges 802 extend forwardly of the connection end face 811 (see FIG. 50) when the connector housing arrangement 810 is assembled. In certain examples, the flanges 802 extend forwardly past the ferrules 825. In certain examples, the flanges 802 form an interrupted wall extending forwardly of the connection end face 811. For example, interruptions in the wall may provide access to the ferrules 825 for cleaning and/or polishing. In some implementations, the flanges 802 are integral with the front housing 817. In other implementations, the flanges 802 are integral with the coupling sleeve 830 (see FIG. 51).

In some implementations, the coupling sleeve 830 carries a gasket (e.g., an O-ring) 835 and includes an outwardly extending flange 834. In the example shown, the gasket 835 is disposed between the flange 834 and the connection end face 811. In other implementations, the gasket 835 can be mounted within the coupling sleeve 830 or over the front housing 817.

The connector housing arrangement 810 also is configured to seal to the furcation cable 695. In certain examples, the coupling sleeve 830 includes a reduced section 837 over which a portion of a strain-relief boot extends. In some implementations, the strain-relief boot provides side load strain relief to the furcation cable 695. In certain implementations, a heat recoverable sleeve 855 has a first portion extending over a jacket 698 of the furcation cable 695 and a second portion extend over the reduced section 837 of the coupling sleeve 830. In certain examples, the reduced section 837 of the coupling sleeve 830 can be textured (e.g., ribs, threads, bumps, etc.) to aid in axially retention of the heat recoverable sleeve 855.

The strain-relief boot is coupled to the coupling sleeve 830 (e.g., over the heat recoverable sleeve 855) and extends over a portion of the furcation cable 695. In certain examples, the reduced section 837 defines a groove or slot 838 into which a ledge or teeth of the strain-relief boot extend to hold the strain-relief boot to the coupling sleeve 830. In certain implementations, the coupling sleeve 830, the heat recoverable sleeve 855, and/or the strain-relief boot are shaped to match an outer periphery of the furcation cable 695. For example, in some implementations, the furcation cable 695 is a flat cable. In such cases, the coupling sleeve 830, the heat recoverable sleeve 855, and/or the strain-relief boot have a flattened profile corresponding to the furcation cable 695. In other implementations, the furcation cable 695 is a round cable.

A twist-to-lock fastener 840 is disposed over the coupling sleeve 830 to releasably secure the optical fiber connector arrangement 800 to a component (e.g., an optical adapter). In examples, the gasket 835 can be disposed on or in the twist-to-lock fastener 840 instead of or in addition to connector housing arrangement 810. In examples, the twist-to-lock fastener 840 included a threadable nut having an external threaded section 842 and a gripping section 845. When the connector arrangement 800 is plugged into a port of a component, the threaded section 842 of the twist-to-lock fastener 840 is engaged with an internal thread of the component. In other examples, the twist-to-lock fastener 840 can include a bayonet connection. Rotating the twist-to-lock fastener 840 relative to the component moves the twist-to-lock fastener 840 axially against the outwardly extending flange 834 of the coupling sleeve 830, thereby securing the connector arrangement 800 to the component.

Figure 54:
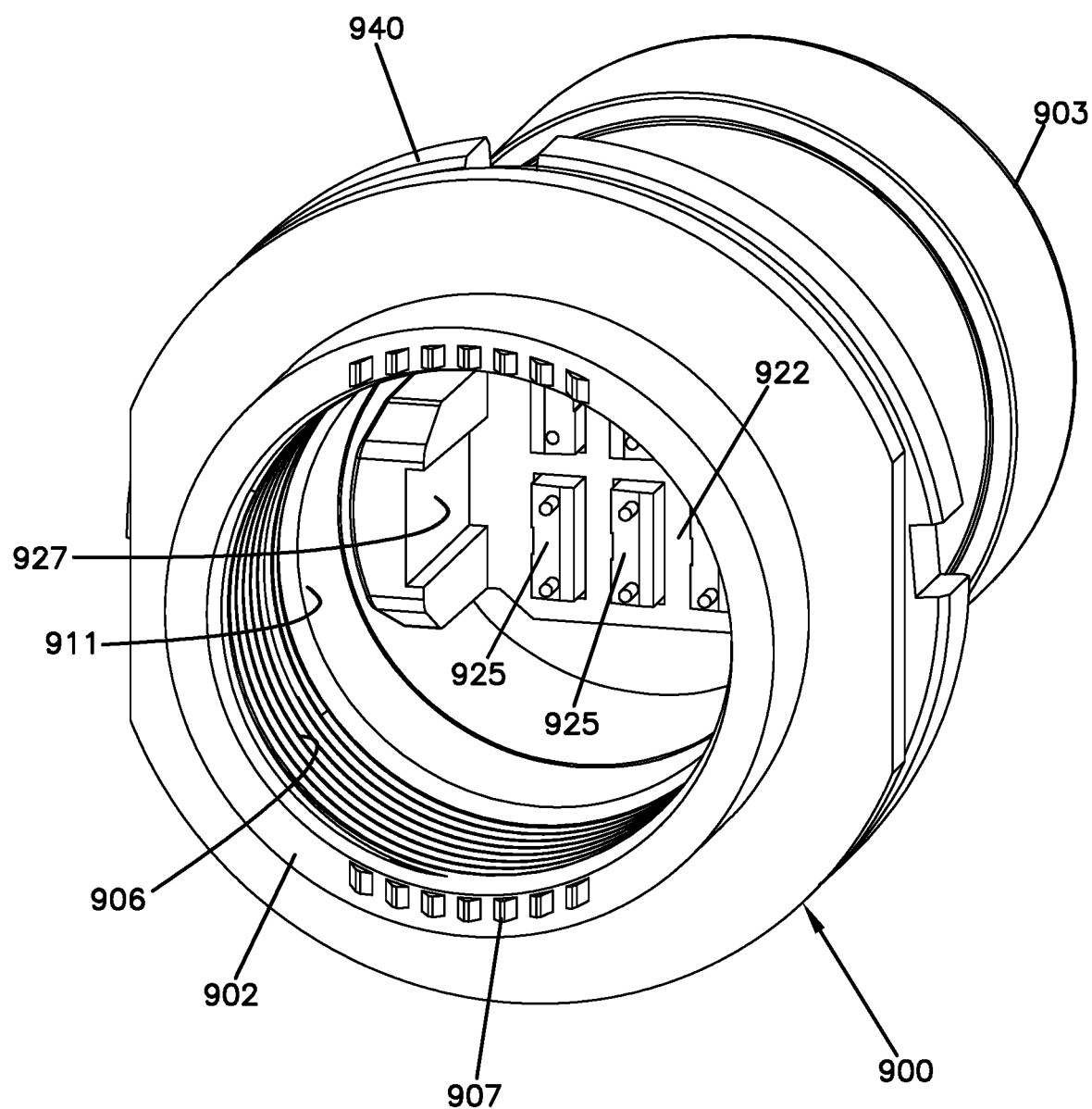
FIG. 54 is a perspective view of an example optical adapter suitable for use with the connector housing arrangement of FIG. 50.
Figure 55:
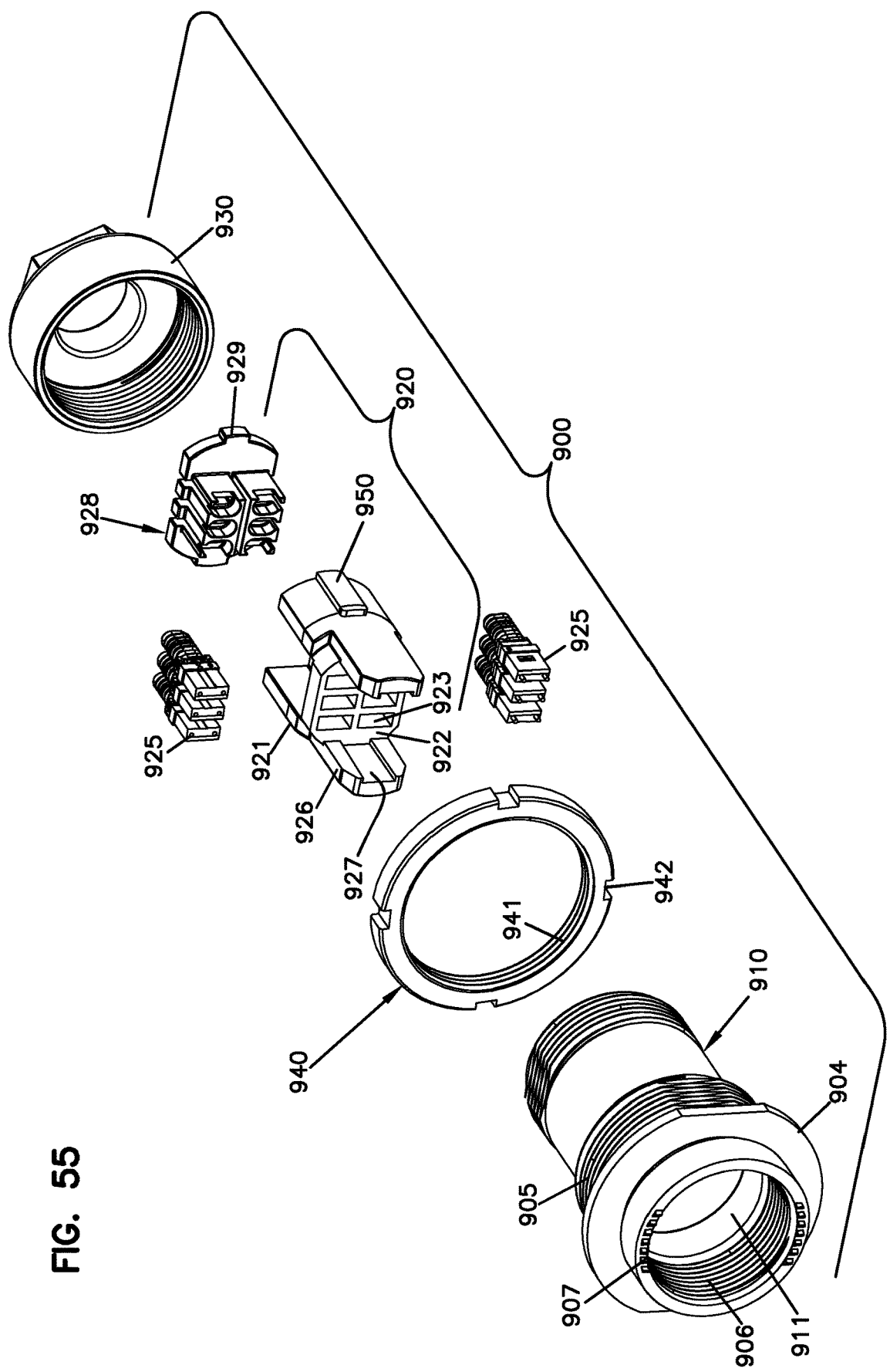
FIG. 55 is an exploded, front perspective view of the optical adapter of FIG. 54.
Figure 56:
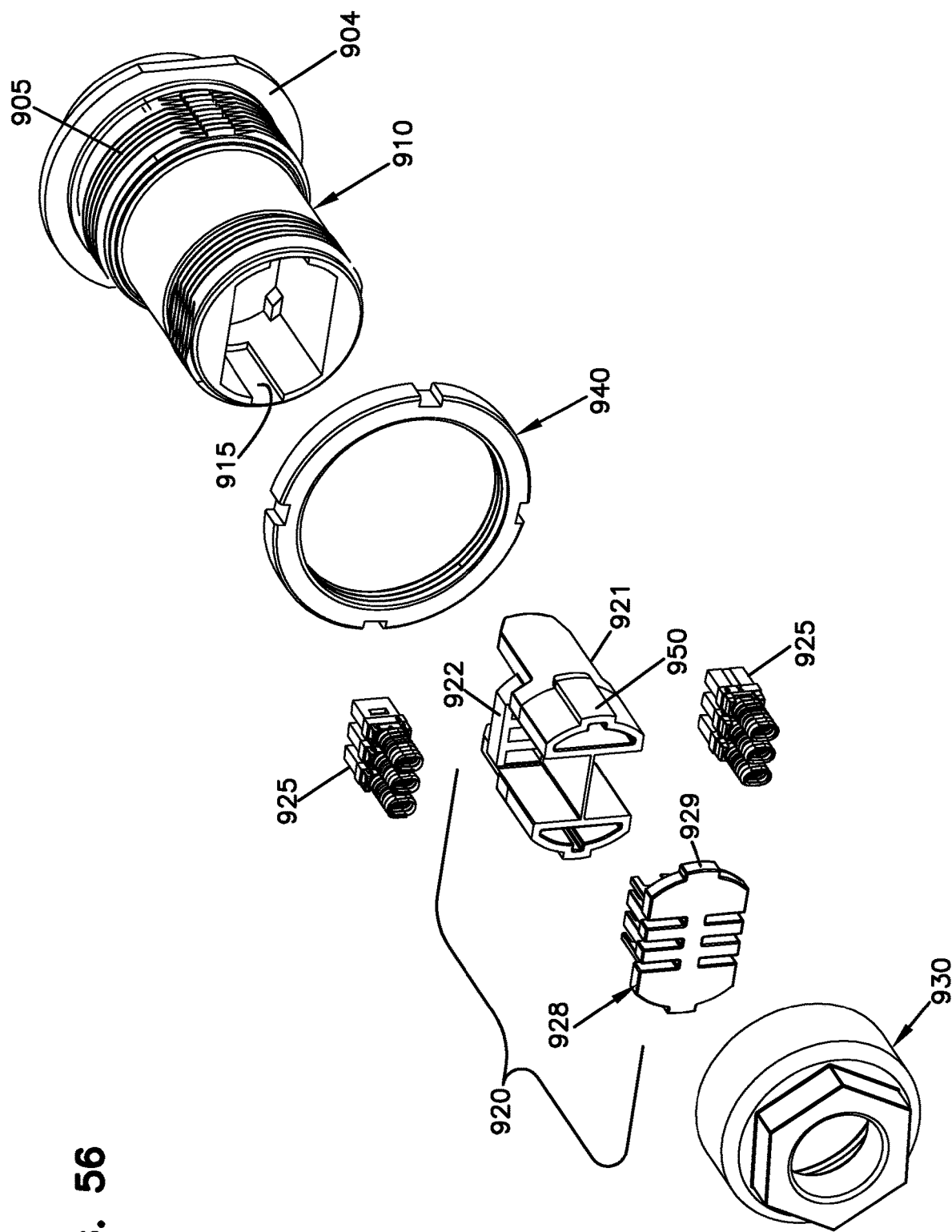
FIG. 56 is an exploded, rear perspective view of the optical adapter of FIG. 54.

FIGS. 54-56 illustrate an example optical adapter 900 defining a port at which the optical connector arrangement 800 can be received. In some implementations, the optical adapter 900 extends from a first end 902 to a second end 903. The first end 902 defines the port sized to receive the optical connector arrangement 800. In some implementations, the second end 903 is configured to support optical ferrules 925 that mate with the optical ferrules 825 of the connector arrangement 800. In other implementations, the second end 903 defines a second port that can receive an optical connector.

The adapter 900 includes a fastening feature 906 at the first end 902. The fastening feature 906 is configured to engage with the twist-to-lock fastener 840 of the connector arrangement 800 to hold the connector arrangement 800 at the adapter 900. In some implementations, the fastening feature 906 includes internal threading (see FIG. 54). In other implementations, the fastening features 906 include part of a bayonet connection. When the twist-to-lock fastener 840 of the connector arrangement 800 is engaged with the fastening feature 906 of the adapter 900, the optical ferrules 825, 925 optically couple together.

The adapter 900 also includes a sealing surface 911 against which the gasket 835 of the connector arrangement 800 presses when the connector arrangement 800 is disposed within the adapter 900. Accordingly, the front housing 817 of the connector arrangement 800 can be environmentally sealed within the adapter 900.

The adapter 900 includes a flange 904 that extends radially outwardly. The adapter 900 defines external threads 905 adjacent the flange 904. In certain implementations, the flange 904 is disposed between the fastening feature 906 and the external threads 905. A retaining ring 940 is configured to move axially along the adapter 901. For example, in one implementation, the retaining ring 940 has an internal thread 941 that engages the external threads 905 of the adapter 900. In certain examples, the retaining ring 940 defines external notches 942 that facilitate rotating the retaining ring 940. The retaining ring 940 cooperates with the flange 904 to secure a wall, panel, or other surface therebetween to mount the adapter 900 to the wall, panel, or other surface. In some implementations, the flange 904 is disposed at the first end 902 of the adapter 900. In other implementations, flange 904 is disposed closer to the second end 903 of the adapter 900. In still other implementations, the flange 904 is disposed at any intermediate position between the first and second ends 902, 903.

The adapter 900 is configured to retain a plurality of optical ferrules 925 in a predetermined configuration to mate with the optical ferrules 825 of the optical connector arrangement 800 when the optical connector arrangement 800 is received at the adapter port. As shown in FIGS. 55-56, the adapter 900 can include a first housing 910 and a second housing 930 that cooperate to retain the optical ferrules 925 therebetween. In certain examples, the first housing 910 defines the fastening feature 906. In certain examples, the first housing 910 defines the sealing surface 911. In certain examples, the first housing 910 defines the flange 904. In certain examples, the first housing 910 defines the fastening feature 906, the sealing surface 911, and the flange 904.

Figure 57:
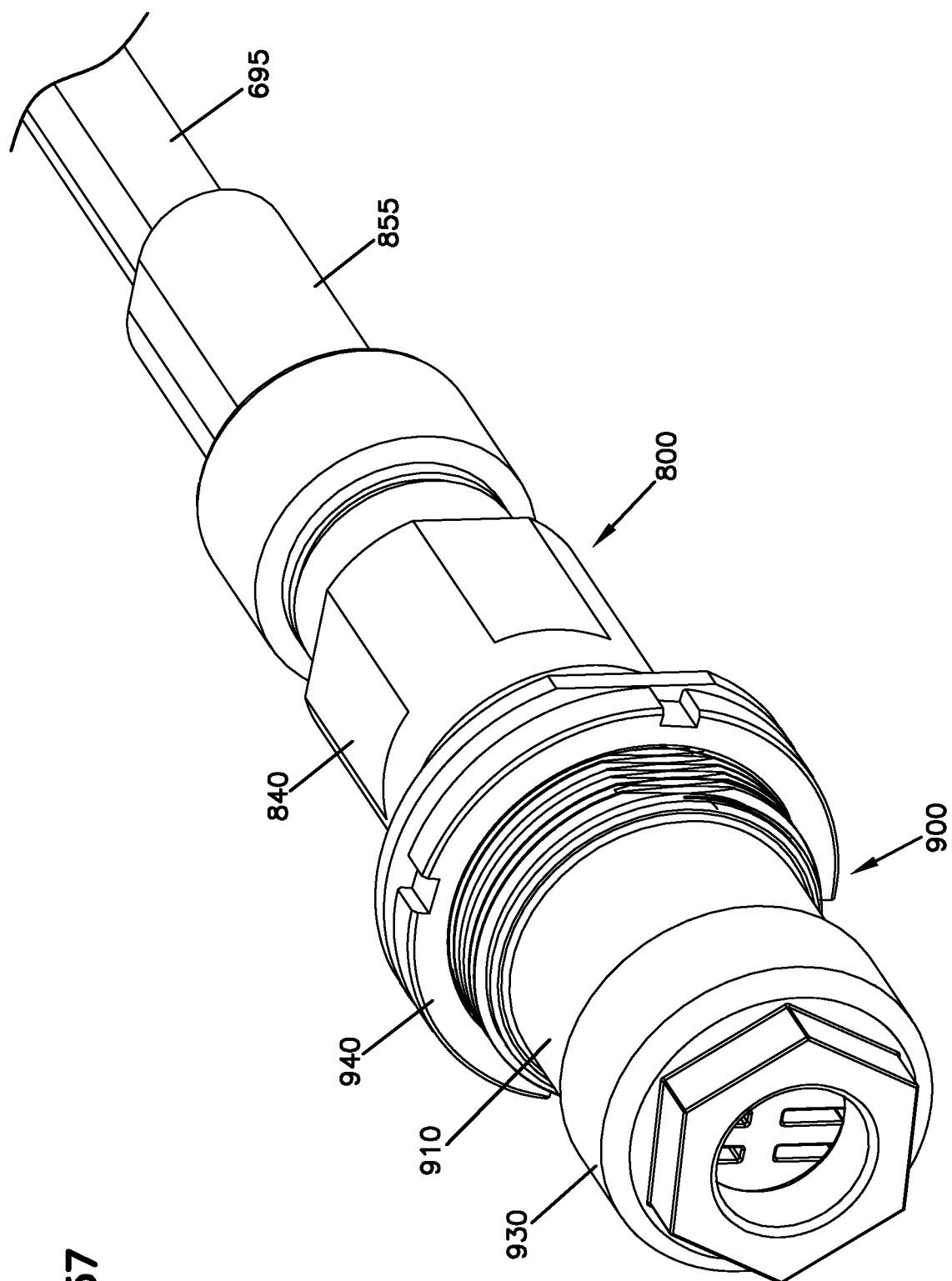
FIG. 57 is a perspective view of the connector housing arrangement of FIG. 50 received at a port of the optical adapter of FIG. 54.

As shown in FIGS. 56-57, the adapter housings 910, 930 are configured to receive a ferrule plug arrangement 920 that holds the optical ferrules 925. In certain implementations, the ferrule plug arrangement 920 includes a wall 922 that defines a plurality of openings or notches 923 sized to receive portions of the optical ferrules 925. The ferrule plug arrangement 920 also includes flanges 926 that extend forwardly of the optical ferrules 925. The flanges 926 define grooves 927 sized to receive the keying members 804 of the optical connector arrangement 800 to properly rotationally align the end face 811 of the optical connector arrangement 800 with the optical ferrules 925.

In certain implementations, the plug arrangement 920 is configured to be received at the first adapter housing 910 in a predetermined rotational position. For example, in certain implementations, the plug arrangement 920 includes rails 950 sized to fit in grooves 915 defined at a rear of the first adapter housing 910. The second adapter housing 930 couples to the first adapter housing 910 to sandwich the plug arrangement 920 therebetween. In certain examples, the second adapter housing 930 threads to the first adapter housing 910. In other examples, the second adapter housing 930 is latched, fastened by a bayonet, welded, or otherwise coupled to the first adapter housing 910.

In certain implementations, the ferrule plug arrangement 920 includes a first piece 921 and a second piece 928. The first piece 921 includes the wall 922 that defines the ferrule openings 925. In certain examples, the first piece 921 includes the flanges 926. In certain examples, the first piece 921 also includes the rails 950. In certain implementations, the second piece 928 holds the optical ferrules 925 at the first piece 921. For example, ferrule springs (e.g., coil springs, leaf springs, etc.) of the optical ferrules 925 may seat on the second piece 928 to maintain the optical ferrules 925 at the openings 923. In certain examples, the second piece 928 includes tabs 929 that align with the rails 950 of the first piece 921 when the first and second pieces 921, 928 are assembled.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cable assembly comprising:
a fiber take-up arrangement extending between a first end of the fiber take-up arrangement and a second end of the fiber take-up arrangement, the fiber take-up arrangement defining an excess fiber storage region;
a cable including an outer jacket surrounding an optical fiber, the cable being anchored to the fiber take-up arrangement, wherein excess length of the optical fiber is disposed at the excess fiber storage region of the fiber take-up arrangement, the optical fiber having a section that extends beyond the second end of the fiber take-up arrangement;
a plug connector terminating an end of the optical fiber of the cable; and
a furcation cable extending between a first end of the furcation cable and a second end of the furcation cable, the first end of the furcation cable being anchored to the fiber take-up arrangement, the second end of the furcation cable being anchored to the plug connector, the section of the optical fiber extending through the furcation cable to the plug connector, the plug connector being external of and spaced from the fiber take-up arrangement by the furcation cable, the furcation cable being more flexible than the cable.

2. The cable assembly of claim 1, wherein the fiber take-up arrangement includes a sealing arrangement that provides an environmental seal between the cable and the furcation cable.

3. The cable assembly of claim 1, wherein the fiber take-up arrangement includes a mandrel disposed at the excess fiber storage region.

4. The cable assembly of claim 1, wherein the furcation cable is a round cable.

5. The cable assembly of claim 1, wherein the furcation cable is a flat cable.

6. The cable assembly of claim 1, wherein the optical fiber is one of a plurality of optical fibers of the cable, wherein the plug connector terminates the plurality of optical fibers.

7. The cable assembly of claim 6, wherein the plug connector includes a multi-fiber ferrule that terminates at least some of the optical fibers.

8. The cable assembly of claim 7, wherein the plug connector includes a plurality of multi-fiber ferrules that terminate the optical fibers.

9. The cable assembly of claim 8, wherein the multi-fiber ferrules are disposed in multiple rows.

10. The cable assembly of claim 1, wherein the furcation cable includes strength members, and wherein the furcation cable is anchored to the fiber take-up arrangement and to the plug connector by the strength members.

11. The cable assembly of claim 10, wherein the strength members of the furcation cable include first anchor boots that are shaped to match cavities defined in the fiber take-up arrangement.

12. The cable assembly of claim 11, wherein the strength members of the furcation cable also include second anchor boots that are shaped to match cavities defined in the plug connector, the second anchor boots being disposed at an opposite side of the furcation cable from the first anchor boots.

13. The cable assembly of claim 1, wherein the cable includes at least seventy-two optical fibers.

14. The cable assembly of claim 13, wherein the cable includes at least ninety-six optical fibers.

15. The cable assembly of claim 14, wherein the cable includes at least 144 optical fibers.

16. The cable assembly of claim 1, further comprising a twist-to-lock fastener that rotatably mounts about the plug connector.

17. The cable assembly of claim 16, wherein the twist-to-lock fastener includes threads.

18. The cable assembly of claim 1, further comprising a seal carried by the plug connector that provides environmental sealing between the plug connector and a component at which the plug connector is received.

19. The cable assembly of claim 1, wherein the outer jacket of the cable extends into the first end of the fiber take-up arrangement and a jacket of the furcation cable extends into the second end of the fiber take-up arrangement.

20. The cable assembly of claim 1, wherein the fiber take-up arrangement aligns the cable with the furcation cable.

* * * * *